(12) United States Patent
Vankamamidi et al.

(10) Patent No.: US 12,204,457 B1
(45) Date of Patent: Jan. 21, 2025

(54) LOG-STRUCTURED ARCHITECTURE FOR METADATA

(71) Applicant: Dell Products L.P., Hopkinton, MA (US)

(72) Inventors: Vamsi K. Vankamamidi, Hopkinton, MA (US); Christopher Seibel, Walpole, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/456,861

(22) Filed: Aug. 28, 2023

(51) Int. Cl.
*G06F 12/1009* (2016.01)
*G06F 12/12* (2016.01)

(52) U.S. Cl.
CPC .......... *G06F 12/1009* (2013.01); *G06F 12/12* (2013.01)

(58) Field of Classification Search
CPC .............................. G06F 12/1009; G06F 12/12
See application file for complete search history.

(56) References Cited

U.S. PATENT DOCUMENTS

2017/0024140 A1* 1/2017 Shivanand .............. G06F 3/065

OTHER PUBLICATIONS

U.S. Appl. No. 17/239,021, filed Apr. 23, 2021, "System and Method for Implementing Mapper Metadata as a Log-Structured System," Vamsi K. Vankamamidi, et al.
U.S. Appl. No. 17/866,912, filed Jul. 18, 2022, "Techniques for Efficient Address Translation Using Metadata With Mixed Mapping Schemes," Vladimir SHVEIDEL, et al.

* cited by examiner

*Primary Examiner* — Gurtej Bansal
(74) *Attorney, Agent, or Firm* — Muirhead and Saturnelli, LLC

(57) ABSTRACT

In at least one embodiment, processing can include: recording, in a metadata (MD) log, a metadata (MD) update to a MD page having a logical address LA1; flushing MD updates, including the MD update, from the MD log; applying at least the MD update to the MD page to generate an updated version; storing the updated version of the MD page at a storage location PA2 different from a first location of the MD page prior to updating; recording, in a translation table (TT) log, a TT update that updates entry E1 of a TT to map LA1 of the MD page to PA2 rather than the first location; flushing TT updates from the TT log; applying at least the TT update to the TT to generate an updated version; and storing the updated TT version at a storage location different from a prior location of the TT prior to updating.

19 Claims, 27 Drawing Sheets

LOG-STRUCTURED ARCHITECTURE FOR METADATA

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: recording a first metadata (MD) update in a MD log, wherein the first MD update updates a first MD page having a first logical address LA1 in a first address space, wherein a translation table (TT) maps logical addresses of MD pages to corresponding current physical addresses or storage locations on non-volatile storage where current versions of MD pages are stored; flushing a first set of one or more MD updates, including the first MD update, from the MD log; responsive to said flushing the first set of one or more MD updates from the MD log, performing first processing including: applying at least the first MD update to a first version of the first MD page to generate a second version of the first MD page, wherein the first version of the first MD page is stored at a first physical address or storage location PA1 on non-volatile storage; storing the second version of the first MD page at a second physical address or storage location PA2 on non-volatile storage, wherein PA1 is different from PA2; recording, in a TT log, a first TT update to a first mapping entry E1 of the TT, wherein the first TT update updates E1 of the TT to map a first logical address LA1 of the first MD page to PA2 rather than PA1; flushing a second set of one or more TT updates, including the first TT update, from the TT log; and responsive to said flushing the second set of one or more TT updates from the TT log, performing second processing including: applying at least the first TT update to a first version of the TT to generate a second version of the TT, wherein the first version of the TT is stored at a third physical address or storage location PA3; and storing the second version of the TT at a fourth physical address or storage location PA4 that is different from PA3.

In at least one embodiment, PA1 can be included in a first physical large block (PLB) of non-volatile storage and PA2 can be included in a second PLB of non-volatile storage, wherein a first PLB descriptor DESC1 can describe content stored in the first PLB and a second PLB descriptor DESC2 can describe content stored in the second PLB. DESC1 and DESC2 can be included in a descriptor section of a first storage tier, and wherein the first processing can include recording a first descriptor update in a first log associated with the first tier. The first descriptor update can specify to update DESC2 to indicate that the second version of the first MD page is stored at PA2 of PLB2. The first storage tier can further include a boot tier that includes information used in connection with booting a system. The boot tier can include first information identifying physical storage locations in a MD tier of non-volatile storage where one or more types of metadata are stored. Processing can include: recording a boot tier update in the first log, wherein the boot tier update indicates to update a first item stored in the boot tier; flushing a plurality of boot tier updates from the first log and applying the plurality of boot tier updates to a first version of the boot tier to generate a second version of the boot tier; and storing the second version of the boot tier at a new physical address or storage location that is different from a corresponding physical address or storage location of the first version of the boot tier.

In at least one embodiment, processing can include: flushing a third set of one or more descriptor updates, including the first descriptor update, from the first log; and responsive to said flushing the third set of one or more descriptor updates from the first log, performing third processing. The third processing can include: applying the first descriptor update to a first version of DESC2 to generate a second version of DESC2, wherein the first version of DESC2 is stored at a fifth physical address or storage location PA5; and storing the second version of DESC2 at a sixth physical address or storage location PA6 that is different from PA5. The second processing can further include recording a second descriptor update in the first log associated with the first tier, wherein the second descriptor update can specify to update DESC1 to indicate that the first PLB corresponding to DESC1 no longer stores a current version of the first MD page. The second descriptor update of the first log can indicate to decrement a reference count of the second descriptor to reflect that the first version of the first MD page as stored in the first PLB is no longer valid content. The third set of descriptor updates can further include the second descriptor update, and wherein said third processing performed responsive to said flushing the third set of descriptor updates can further include: applying the second descriptor update to a first version of DESC1 to generate a second version of DESC1, wherein the first version of DESC1 is stored at a seventh physical address or storage location PA7; and storing the second version of DESC1 at an eighth physical address or storage location PA8 that is different from PA7.

In at least one embodiment, the first MD page is included in a chain of MD pages of mapping information used to map a first user logical address to a corresponding storage location where current content C1 of the first user logical address is stored on non-volatile storage, wherein the first user logical address can denote a target logical address identifying a storage object and an offset in the storage object. The chain of MD pages can include a top MD page, a mid MD page, a leaf MD page, and a VLB (virtual layer block) page. The first MD page can be any of a top MD page, a mid MD page, and a leaf MD page, and wherein the TT can be a MD TT used for mapping logical addresses of top, mid and leaf MD pages to corresponding physical addresses or storage locations on non-volatile storage where current versions of top, mid and leaf MD pages are stored. The first MD page can be a VLB page, and wherein the TT can be a VLB TT used for mapping logical addresses of VLB pages to corresponding current physical addresses or storage locations on non-volatile storage where current versions of VLB pages are stored. Processing can include: receiving a write operation that writes the current content C1 to the first user logical address; and determining, in accordance with the write operation, one or more MD updates to one or more MD pages included in the chain of MD pages, wherein the one or more MD updates determined in accordance with the write operation can include the first MD update to the first MD page.

In at least one embodiment, flushing the first set of one or more MD updates from the MD log can be performed in response to an occurrence of a first trigger condition that is any one of a defined set of trigger conditions. The defined set of trigger conditions can include one or more of: a time-based trigger condition that indicates to flush the MD log responsive to a specified amount of time elapsing since a most recent prior time that the MD log was flushed, and a trigger condition that indicates flush the MD log responsive to the MD log having at least a threshold number of recorded updates. Flushing the second set of one or more TT updates from the TT log can be performed in response to an occurrence of a first trigger condition that is any one of a defined set of trigger conditions. The defined set of trigger conditions can include one or more of: a time-based trigger condition that indicates to flush the TT log responsive to a specified amount of time elapsing since a most recent prior time that the TT log was flushed, and a trigger condition that indicates flush the TT log responsive to the TT log having at least a threshold number of recorded updates.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
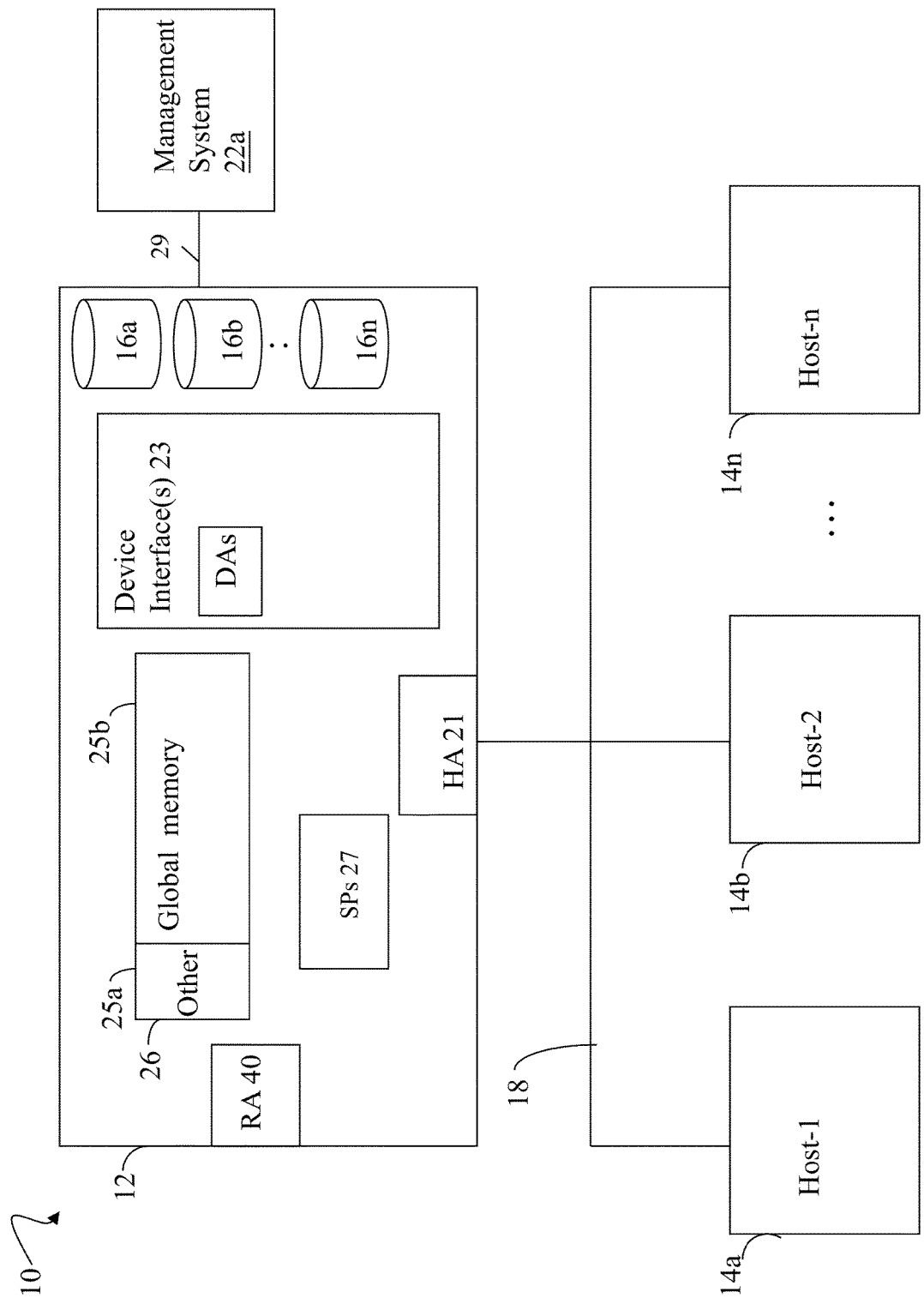
FIG. 1 is an example of components that may be included in a system in accordance with the techniques of the present disclosure.

A data storage system can use a log for recording user or client updates, and can also use a metadata log for recording updates to metadata pages. The metadata (MD) pages can be used in connection with chains of mapping information that map logical addresses to storage locations including content stored at the logical addresses.

An entry from the log of user or client updates (sometimes referred to as the UD (user data) log) can be an update, such as a client write I/O, to a logical address (e.g., LUN or logical device and LBA or logical block address) which writes content to a UD page. Flushing the entry from the UD log can include writing the updated UD page to a backend storage location on non-volatile storage (e.g., BE (back end) PD (physical storage device) location). Additionally, flushing the entry from the UD log can include updating the corresponding MD pages which map the logical address to its corresponding BE PD location including the content stored at the logical address. In at least one existing system, the mapping information including MD pages can thus be updated. For example, such updating of the mapping information can include updating a chain of MD pages used in connection with mapping the logical address to the BE PD location including the content stored at the logical address.

In at least one existing implementation, updating the corresponding mapping information and MD pages can include loading all the MD pages into the cache if any such MD pages are not already in cache. The MD pages of the mapping information can be characterized as a chain forming an access sequence including a top MD page, a mid MD page, a leaf MD page, and a VLB (virtual or virtualized layer block) page, where each page in the foregoing sequence is accessed serially and also in the strict sequential order of the sequence.

The data storage system can maintain the user data or client data as a log structured system (LSS) which can be characterized by typically not performing in place updates which overwrite existing content. In the LSS for user data, flushing one or more UD log entries of updates to a UD page stored at an existing physical storage location (e.g., on BE PDs) can include determining an updated version of the UD page and storing the updated version of the UD page at a new physical storage location that is different from the existing physical storage location. Thus, the physical storage location of the UD page (as stored persistently on the BE PDs) can move or change each time an updated version of the UD page is written to the BE PDs, where such updated version of the UD page can be the result of flushing one or more entries from the UD log which update the same UD page, and then persistently storing the updated version of the UD page on the BE PDs.

The MD pages used in connection with mapping information as noted above can be stored persistently using in-place updates or overwrites such that processing overwrites the existing version of a MD page as stored at a physical storage location on the BE PDs with an updated version of the MD page. The physical storage location (e.g., on BE PDs) of each MD page can thus remain static or fixed so that in-place updates overwrite the same existing persistent physical storage location of the MD page. With mapping information including a chain of MD pages that reference each other using such physical storage locations, such in-place updates or overwrites of MD pages can be desirable where each MD page remains in the same physical storage location on BE storage.

As an alternative, the persistent or non-volatile physical storage, such as on the BE PDs, used for storing the MD pages can be maintained as a LSS in a manner similar to the LSS storing user data or content. With a LSS for MD pages, an updated MD page can be determined as a result of applying one or more entries of the metadata log which update the MD page. A current version of the MD page (before applying the updates) can be stored at an existing physical storage location on non-volatile persistent storage (e.g., on BE PDs). The updated version of the MD page can be determined and then rewritten or stored at a new physical storage location that is different from the existing physical storage location. Thus, with a LSS for metadata, the physical storage location or address of the MD page can move or change each time an updated version of the MD page is written to the BE PDs, where such updated version of the MD page can be the result of flushing one or more entries from the metadata log which update the same MD page, and then persistently storing the updated version of the MD page at the new physical storage location on the BE PDs.

Persistent physical storage for a MD page can be allocated at a physical address from the BE PDs. In at least one embodiment in accordance with the techniques of the present disclosure providing for storing updated MD pages at new physical storage locations rather than performing overwriting or in-place updates, logical addresses of MD pages can be used to reference the MD pages as opposed to referencing MD pages, and entries thereof, using physical storage locations or addresses. In at least one embodiment, the logical address of a MD page can be an indirect pointer or indirect address of the corresponding physical storage location or address of the persistently stored MD page. In at least one embodiment, a logical address of a MD page can be mapped to the physical address or storage location on the BE PDs where the MD page is stored. Thus, as the MD page is updated and its corresponding physical storage location changes over time, the logical address of the MD page can remain the same and the physical storage location or address on the BE PDs storing the persisted MD page can be allowed to change. When the logical address of the MD page is used to reference the MD page from the BE PDs, the logical address of the MD page can be translated or mapped to its current physical storage location on the BE PDs. Thus, designing an LSS for storing the MD pages can generally include some form of dynamic translation of logical to physical addresses or locations for the MD pages.

In at least one embodiment in accordance with the techniques of the present disclosure, a translation table (TT) can be used to map or translate a logical address of a MD page to its current physical storage location or address such as on BE PDs providing non-volatile storage. In at least one embodiment, as the physical storage location of a MD page changes from a first physical storage location or address PA1 to a second physical storage or address PA2, the TT used to map the MD page's logical address to the new physical storage location can also be updated. In at least one embodiment, the TT can be updated to reference the new physical storage location PA2 of the MD page rather than the prior physical storage location PA1. In at least one embodiment, the logical addresses of the MD pages can remain the same even though the physical addresses or storage locations of persistently stored versions of the MD pages can change as the MD pages are updated and rewritten to new physical addresses or storage locations in accordance with the LSS.

In at least one system not using the techniques of the present disclosure, the TT itself can be stored on non-volatile storage such as the BE PDs, where the TT can be subject to in-place updates or overwrites. In such a system not in accordance with the techniques of the present disclosure, the TT is not managed as an LSS. In at least one embodiment, one or more TTs can be characterized as another form of MD used in connection with the LSS for MD pages including top, mid, leaf MD pages and also including VLB (virtual or virtualized layer block) pages of mapping information.

Accordingly, described in the following paragraphs are techniques of the present disclosure which include managing and maintaining TTs as a LSS. In at least one embodiment, updates to a TT can be stored in a TT log in a manner similar to the metadata log used for recording updates to metadata pages. Updates to the TT can be flushed from the TT log, and then applied to a current persistent copy of the TT stored on non-volatile storage to generate an updated version of the TT. The updated version of the TT can then be stored persistently on non-volatile storage in a new storage location that is different from the existing storage location of the current persistent copy of the TT (as just prior to updating). Thus in at least one embodiment, flushing the TT updates of the TT log can include rewriting or storing the entire TT persistently at the new storage location. In at least one embodiment, multiple instances of the most recent consecutive versions of the TT can be maintained on non-volatile storage. In this manner in such an embodiment, each time the TT log is flushed, the oldest version of the multiple persisted TT copies or instances can be replaced with a most recent version of the TT.

In this manner, the techniques of the disclosure in at least one embodiment provide a LSS approach for use with various types of metadata further including the TT itself.

In at least one embodiment, pages of different types of metadata can be stored in units such as physical large blocks or PLBs. The types of metadata can include, for example, top, mid and leaf MD pages, VLB pages and/or other types of metadata. In at least one embodiment, multiple types of MD can be segregated into metadata type-specific PLBs such that a single PLB can include content of only one type of MD. In at least one embodiment, each PLB of metadata can have a corresponding descriptor generally describing pages of contents or data stored in the PLB. In at least one embodiment, descriptors corresponding to PLBs of metadata can be included in a new boot tier or NBT. The NBT can also include a boot tier. When storing an updated version of a metadata page P1 in a new storage location of a target PLB in accordance with a LSS in at least one embodiment, a descriptor corresponding to the target PLB can also be updated to describe P1 now stored in the target PLB. In at least one embodiment, updates to such PLB descriptors of the NBT can also be made in accordance with a LSS where the PLB descriptor updates are recorded in the NBT log. In at least one embodiment, updates made to the boot tier (BT) can also be recorded in the NBT. Updates recorded in the NBT log can be subsequently flushed or destaged resulting in updates to the BT and/or PLB descriptors of metadata PLBs. In at least one embodiment, the updated BT and/or updated section of PLB descriptors of metadata PLBs can be written out in log-structured manner in accordance with a LSS.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
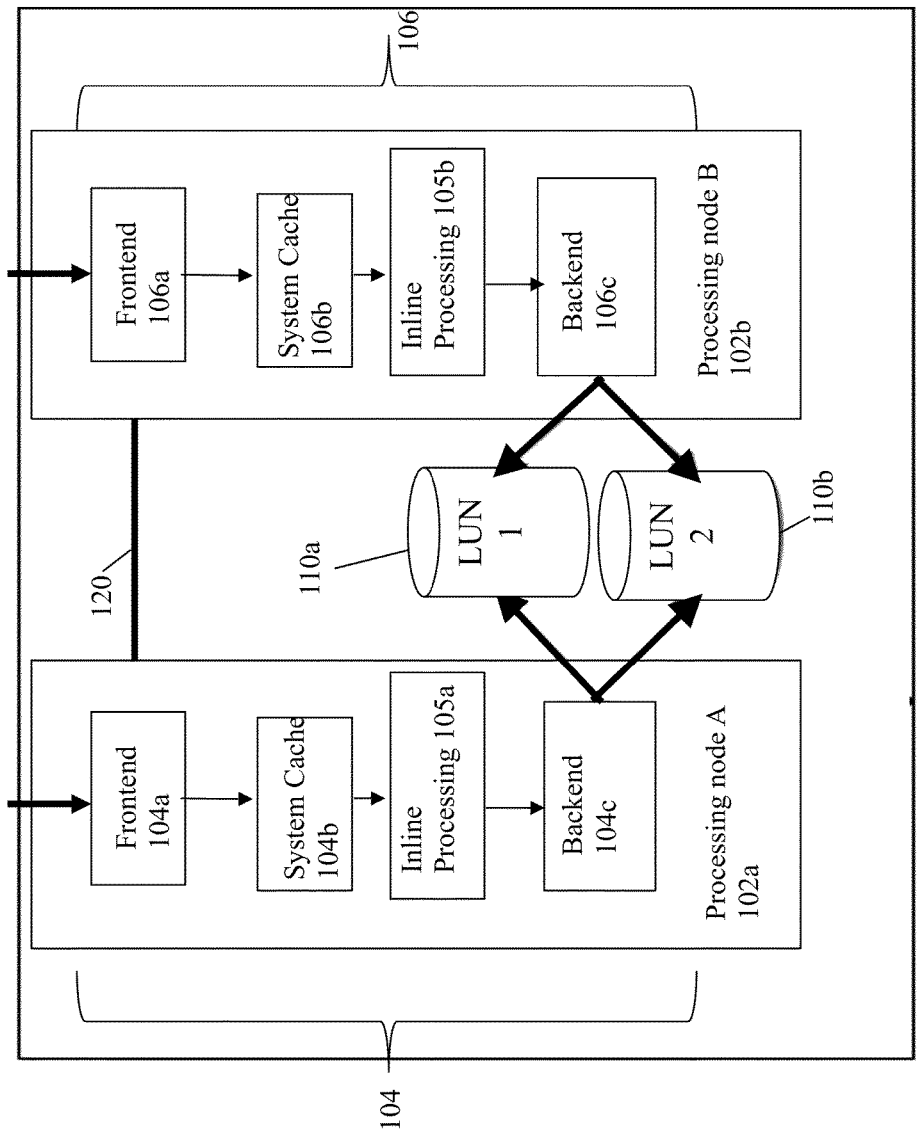
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
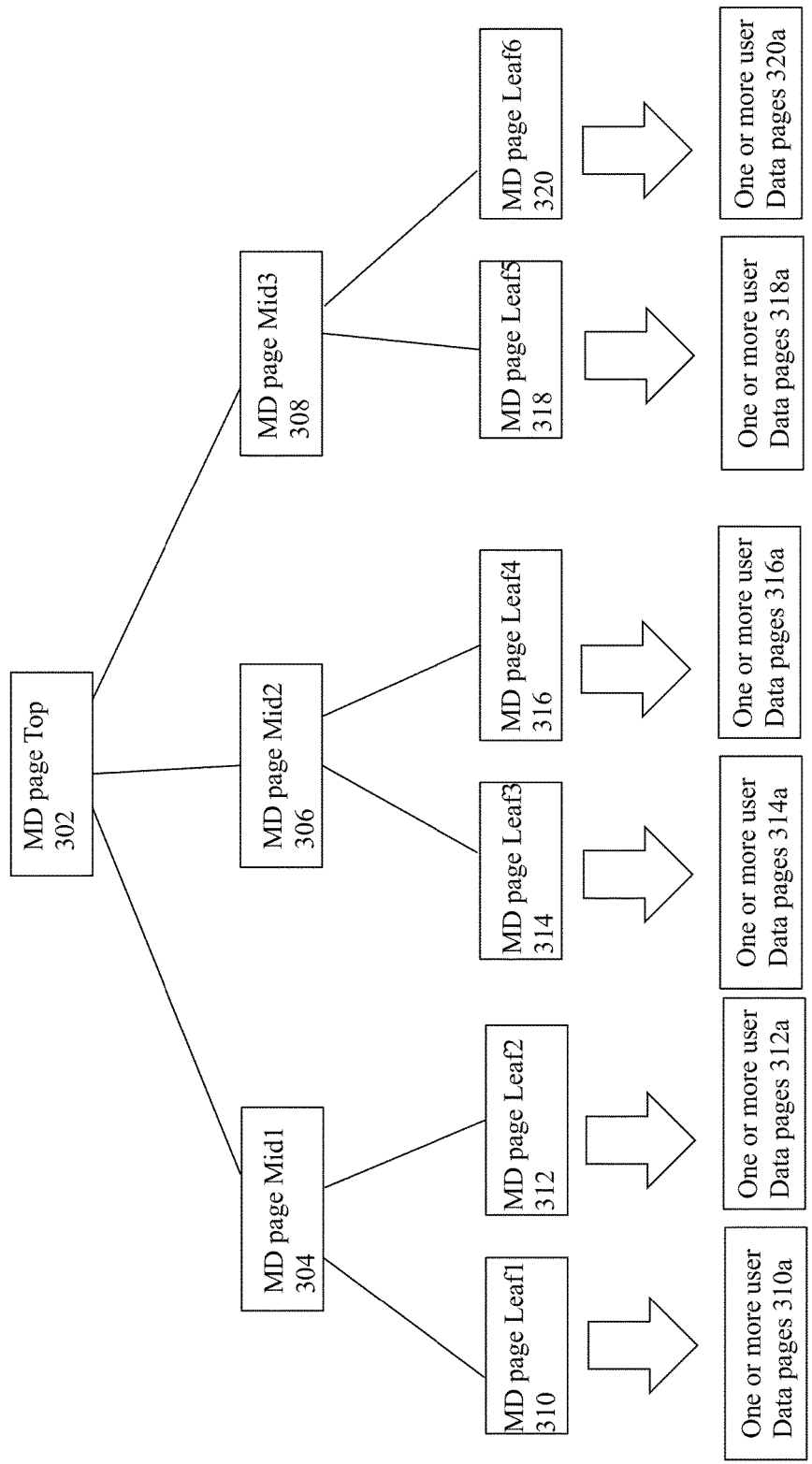
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on nonvolatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
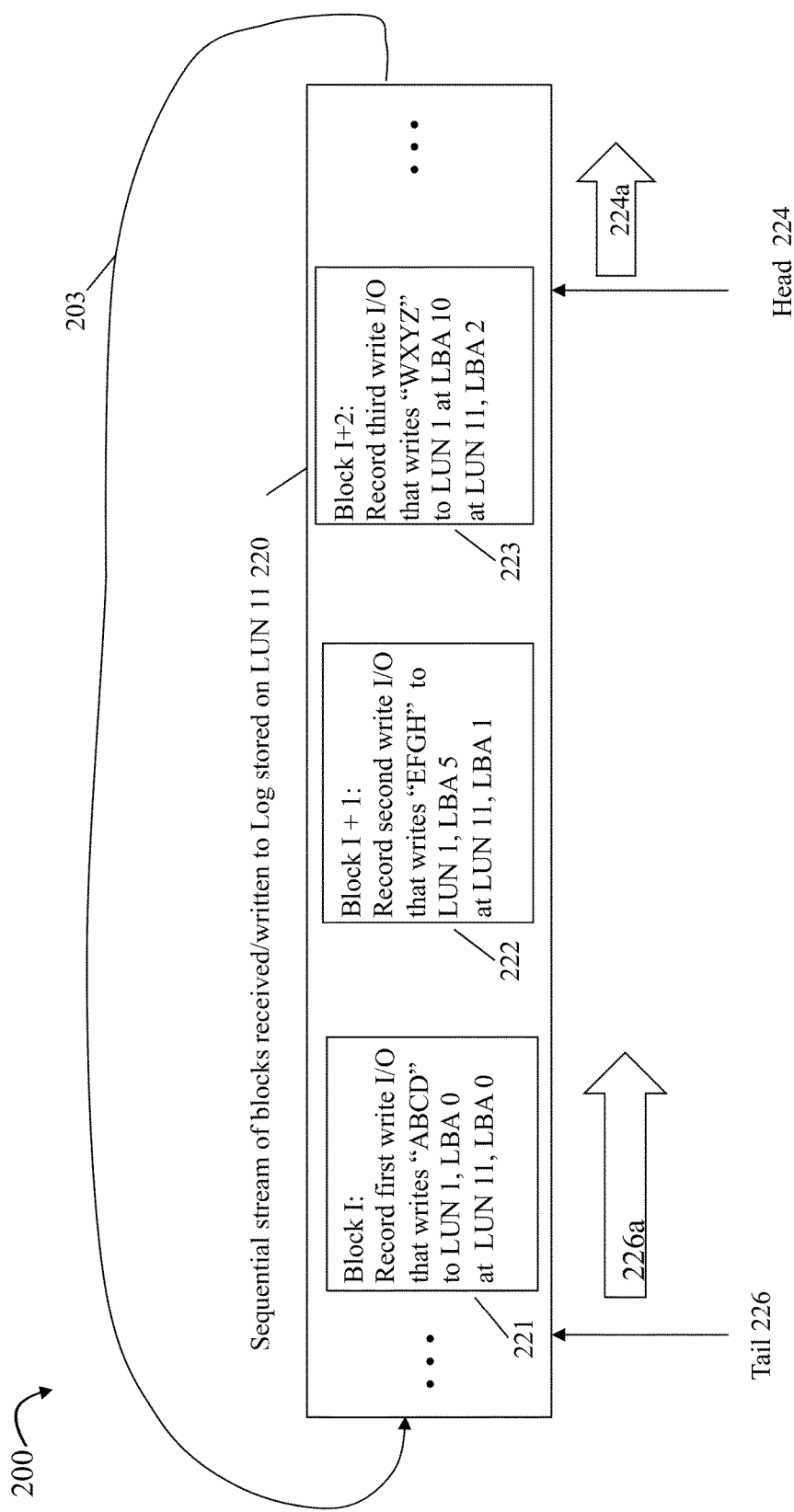
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation.

The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
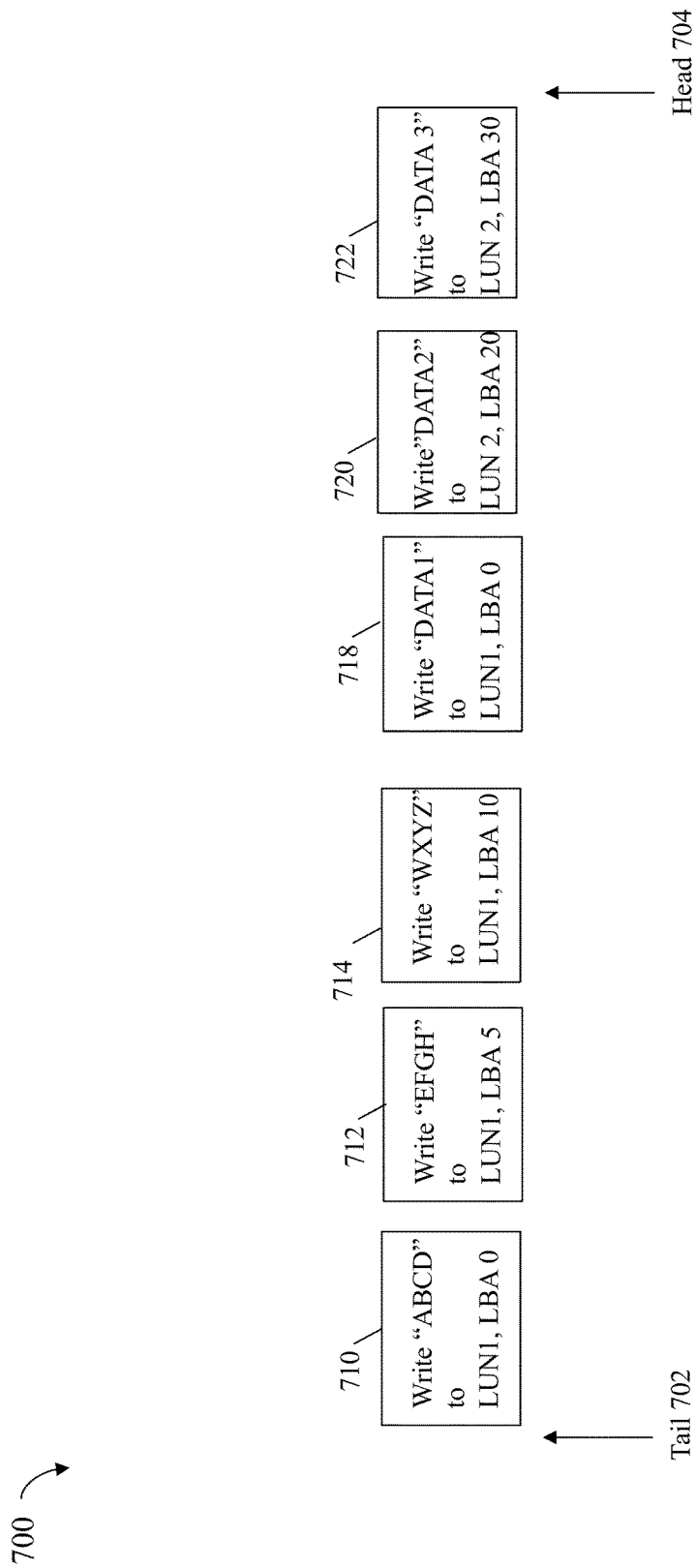

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
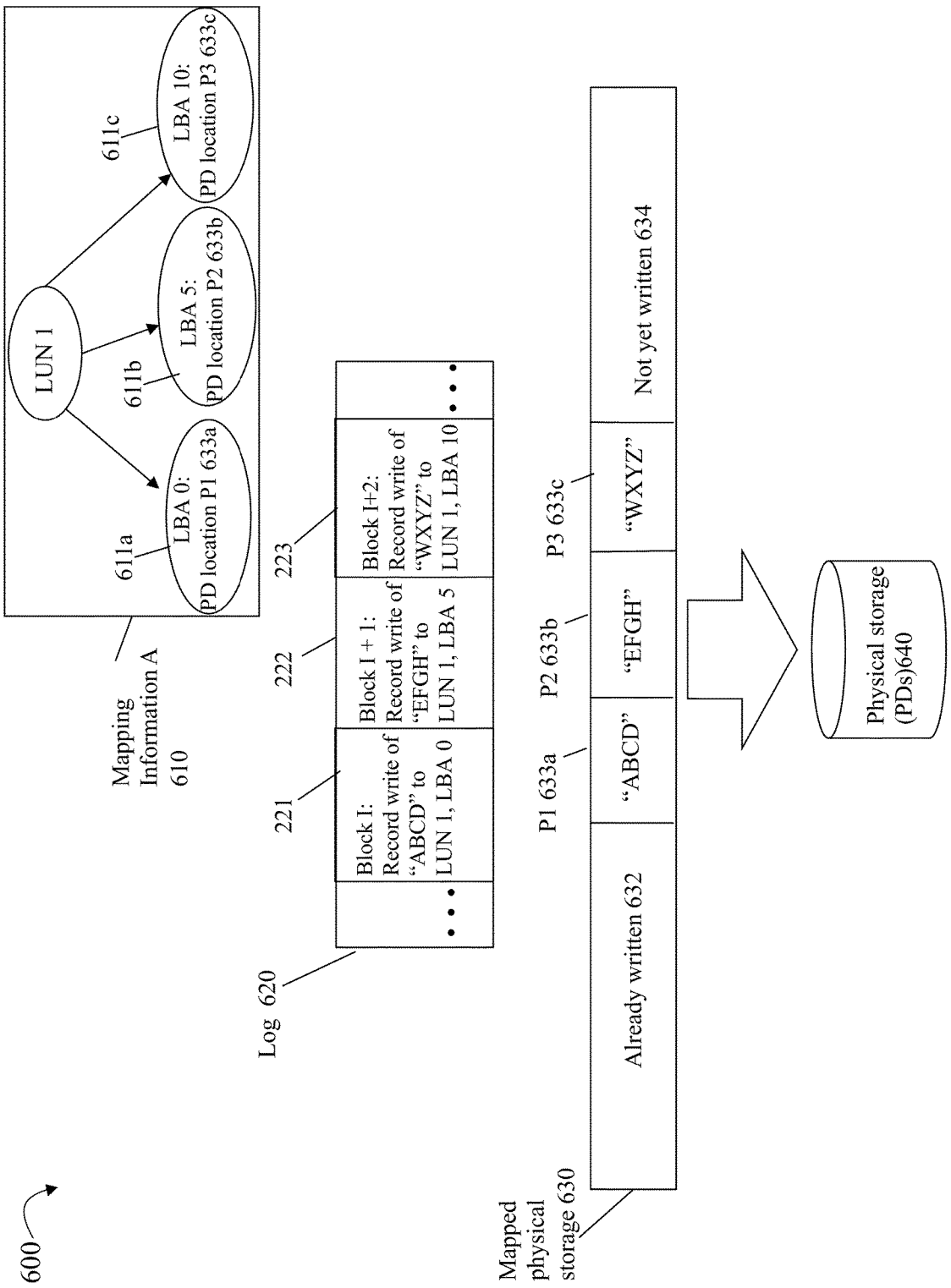

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels-a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
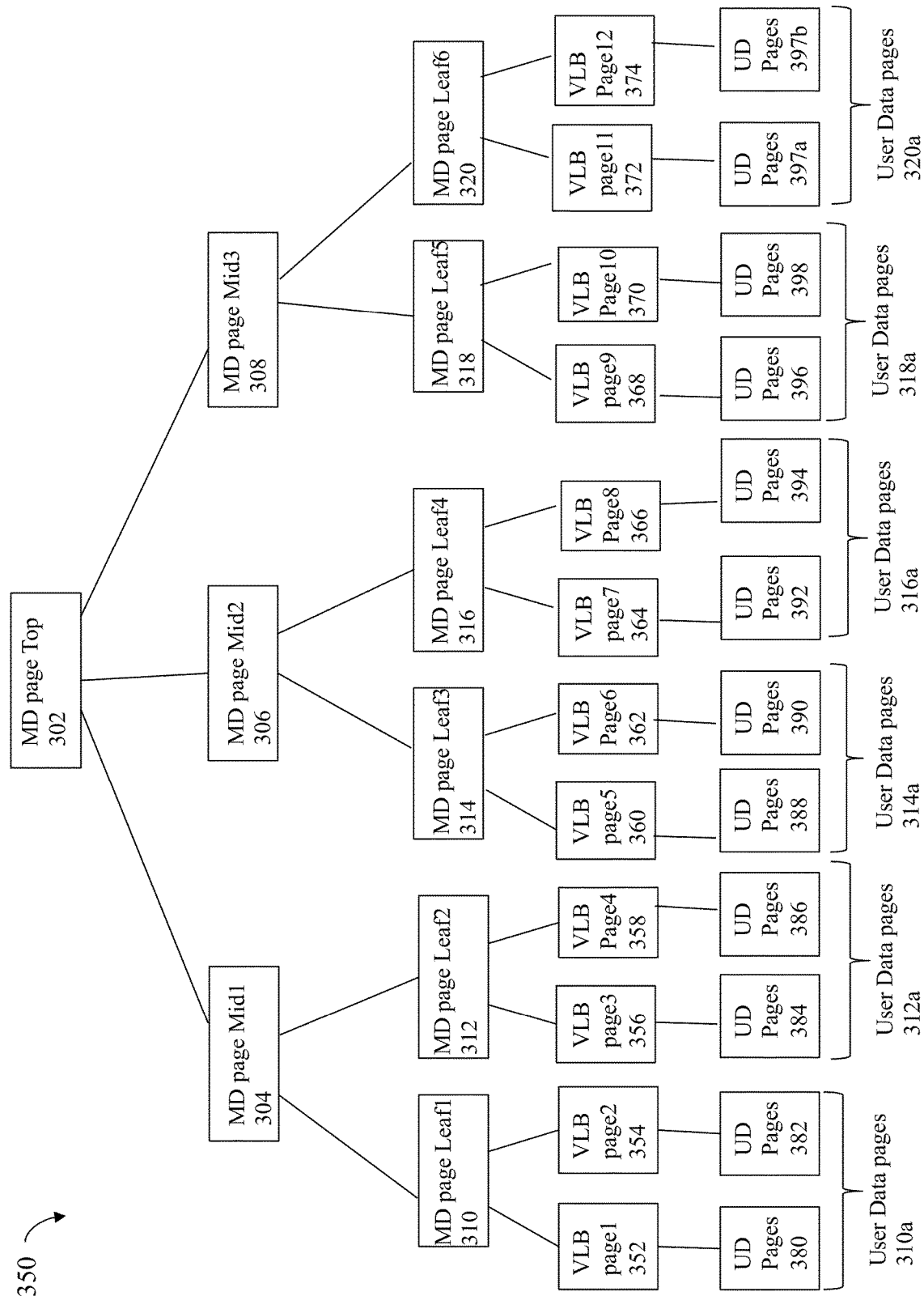

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
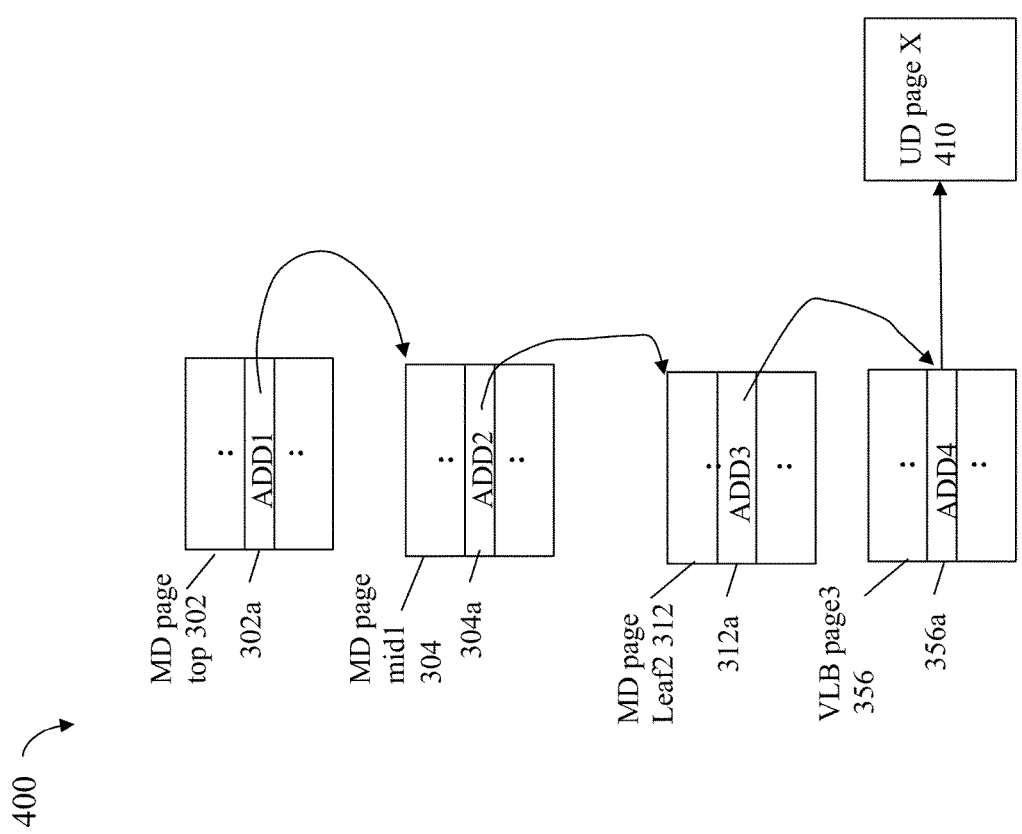

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 400, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a. In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
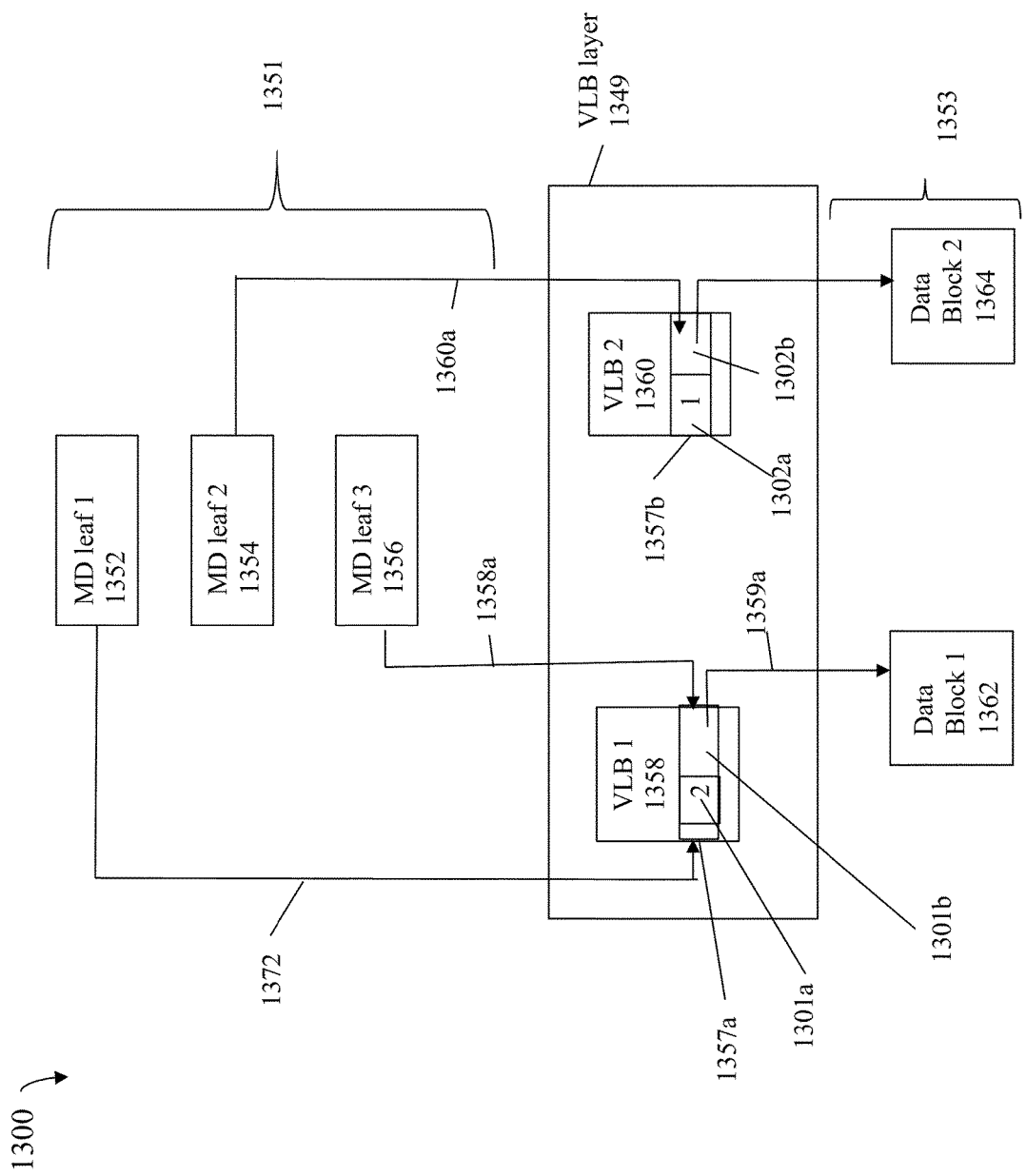

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

The reference count 1301a can be initialized to 1 when a first or initial instance of the associated data block 1362 is stored. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

The reference count 1302a can be initialized to 1 when a first or initial instance of the associated data block 1364 is stored. In this example, the reference 1302a is 1 indicating that there is 1 instance of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data. In particular, the MD leaf 1354 references or points (1360a) to the VLB entry 1357b associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing in at least one embodiment, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6). In at least one embodiment, the LI can denote or can be the logical address, offset or location of the MD page.

In at least one embodiment, the logical address, offset or location of the MD page can also be or denote the physical address, location or offset of the MD page as stored persistently on non-volatile storage, such as of the BE PDs of the data storage system.

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 or 64 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 7:
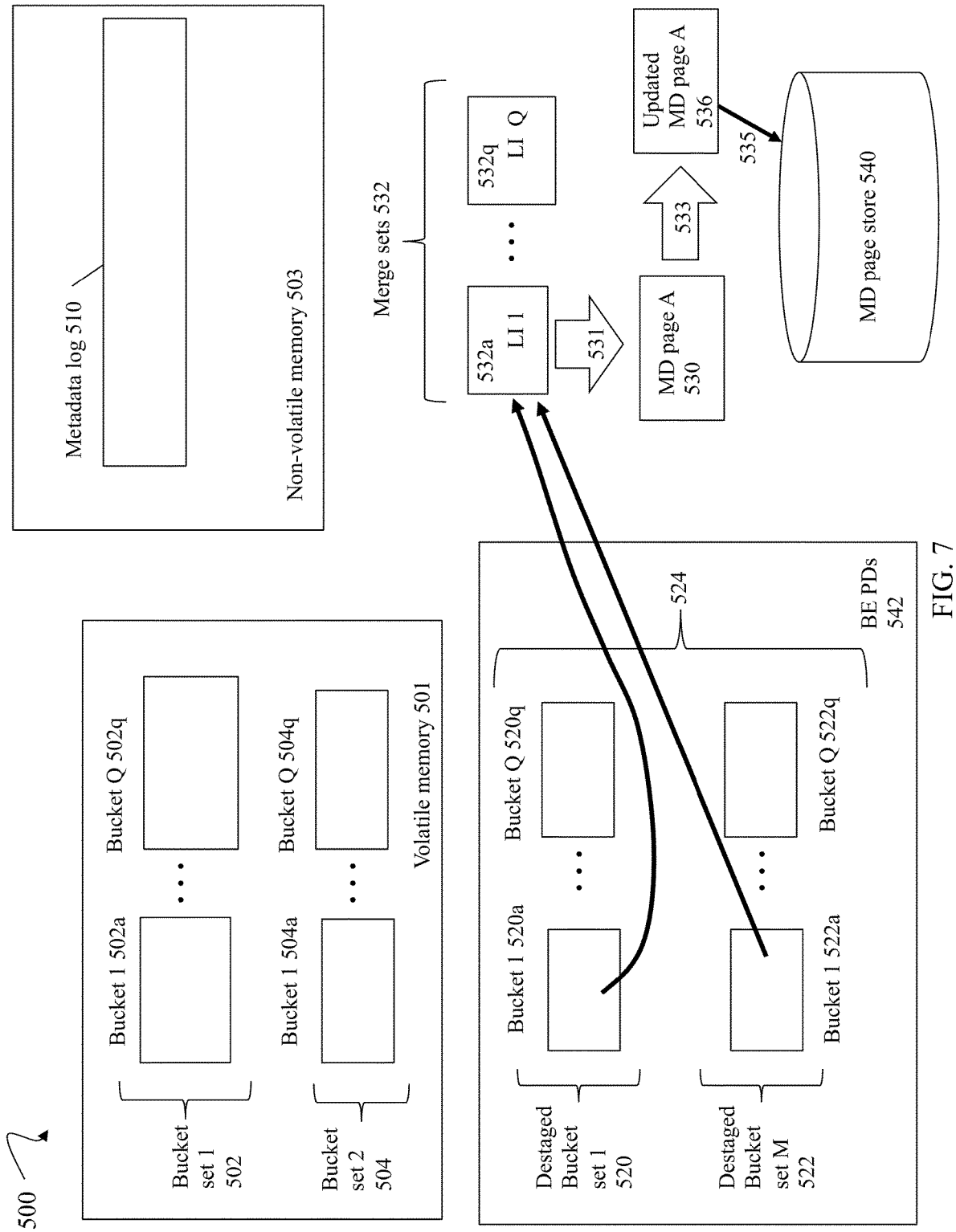
FIGS. 7, 8, 10, 11A, 11B, 11C, 13A, 13B, 14, 15, 17, 18A, 18B and 19 are examples illustrating structures and data flows in at least one embodiment in accordance with the techniques of the present disclosure.

Referring to FIG. 7, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging, frozen, or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HVI of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an L1 that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520a of the destaged bucket set 1 520 can include metadata updates for the MD page A as noted above. The bucket (e.g., 520a) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520a, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging can aggregate and combine the metadata updates for the MD page A 530 from the first buckets (e.g., 520a, 522a) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530. Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532a-q based on the L1 of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

It should be noted that destaging the in-memory metadata log can generally be performed in a single phase or other suitable manner. For example, destaging the metadata log can be performed by processing and merging bucket sets without intermediate storage on the BE PDs. Rather, destaging the metadata log can include determining the merge sets using destaged bucket sets and merge sets stored in volatile memory.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, 6 and 7, the reference count associated with a data block can be included in an entry of a VLB page associated with the data block. For example with reference to FIG. 6, the VLB entry 1357a includes a field 1301a with the reference count=2 for the associated data block 1362; and the VLB entry 1357b includes a field 1301a with the reference count=1 for the associated data block 1364.

The reference count such as of the VLB entries 1357a, 1357b, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection (GC) can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating MD of any of the top, mid, leaf, and VLB metadata pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, leaf MD page and VLB page, where each MD page in the sequence can be accessed serially and also in the strict consecutive order of the sequence since a first page of the sequence can reference a next consecutive page, or location thereof, in the sequence.

Consistent with other discussion herein, data storage systems have components whose responsibility is to map the user-visible logical address space to the internal physical address space, and implement various features such as, for example, snapshots, data compression, data deduplication, and the like. Such mapping and features may rely on different types of metadata to be implemented. This metadata can be typically stored persistently as, for example, 4K blocks of physical storage where different MD pages can reference each other by their physical block-addresses. In at least one embodiment, each MD page when allocated can be assigned a unique physical storage address, offset or location on non-volatile storage where the MD page is persisted. In a model or system using physical addresses or locations without corresponding logical addresses, there is generally no flexibility to move a MD page from an existing physical location to a new physical location since all MD pages referencing the to-be-moved MD page would have to be found and their references would need to be updated to reference the new physical location. Put another way, in at least one system not using the techniques of the present disclosure, the chain or MD pages of mapping information can include pages of metadata that reference other pages of metadata by their physical storage locations or addresses. As a result, metadata can be typically implemented as an in-place over-write system. In such a system, MD pages can remain in the same physical locations where updates to the MD pages are performed in-place and overwrite the same existing physical location. In such a system where MD pages can reference each other by their corresponding physical storage locations or addresses, if an updated version to a MD page is rewritten to a new physical location, all references to the MD page by other MD pages would also have to undesirably be updated to refer to the new physical location. Thus, the MD pages can be persistently stored at fixed physical addresses such as on non-volatile BE PDs of the storage system. The BE PDs used to store the metadata using overwrites or in-place updates can be configured as RAID-level storage of one or more RAID groups. For performance reasons, metadata may have to be stored in a mirrored RAID configuration, such as a RAID-1 configuration, which has a small write performance cost for such in-place updates in comparison to an alternative parity-based RAID configuration such as RAID-5 or RAID-6. However, although the mirrored RAID configuration for the metadata may have less write performance costs as compared to parity-based RAID configurations, the mirrored RAID configuration can generally result in excessive use of storage capacity in comparison to the RAID parity-based configurations. Additionally, because of MD pages referencing each other by physical addresses or physical storage locations, defragmentation and reclaiming of capacity allocated to metadata may become an intractable problem. Furthermore, in systems where the BE PDs or storage tier used to store the metadata are SSDs (solid state drives) such as flash-based storage, continually updating by overwriting to the same SSDs can result in exceeding a maximum number of allowed daily writes (writes per day or WPD) thereby leading to SSD wear out. The SSDs such as flash-based storage can be optimized for use in LSSs where writes to a logical storage object, such as a MD page, are written to a new physical location each time the MD page is updated. Thus, in systems where the MD pages are persistently stored on non-volatile SSDs as the BE PDs, the SSDs can implement an internal LSS where it can be further advantageous to implement a LSS of the metadata at the system level to further facilitate minimizing write amplification and reducing SSD wear.

Based on the foregoing, there exists motivation to implement the persistent metadata storage, such as on one or more storage tiers of the BE PDs, as a LSS which does not perform in place metadata updates and does not update an existing MD page stored at a physical address or location by overwriting current content of the physical storage address or location of the MD page with the new or updated content. Rather, in a LSS, updates to the metadata can be performed by writing the updated version of a MD page to a new physical location each time the MD page is updated.

However, use of a LSS metadata system where each updated version of a MD page is written to a new physical location creates new challenges. Since the MD pages can reference one another, it can be impractical and undesirable to have the MD pages reference each other by their physical storage locations since, for example, storing an updated version of a first MD page to a new physical location would require updating all other referencing MD pages to now refer to the new physical location. As a result, MD pages can reference each other using logical addresses which can then be mapped by an intervening layer or mechanism to corresponding physical addresses or physical locations. In at least one embodiment, the logical addresses of the MD pages, including top, mid, leaf and VLB metadata pages, can be indirect pointers or addresses that indirectly reference the physical storage addresses and locations of the MD pages through the intervening layer or mechanism. The intervening layer or mechanism can maintain a new type of mapping that, for MD pages, translates a logical address of a MD page to its current corresponding physical address or location. In this manner, a first MD page can reference a second MD page, or entry thereof, using a logical address of the second MD page. The new type of mapping can use a translation table, sometimes generally referred to herein as a TT, to map the logical address of the second MD page to its corresponding current physical location. When the second MD page is updated so that the updated version is stored at a new physical location, the TT can be updated to reference the new physical location of the second MD page and where the first MD page can continue to reference the second MD page using the logical address that is mapped, by the TT, to the new physical location. In at least one embodiment, each MD page can be assigned a logical address included in the TT where the logical addresses of the MD pages can remain fixed or the same for the lifetime of the MD pages, and where the physical storage locations or addresses of persistently stored copies of the MD paged can change over time as updated versions of the MD pages can be continually rewritten to new physical storage locations or addresses. The TT can translate a logical address, offset or location (LPA) of a MD page to its corresponding physical address, offset or location (PPA).

In at least one embodiment, as updated MD pages are stored in new physical addresses or storage locations over time, corresponding TT updates can be made to the TT to reflect the current physical address or storage location of MD pages at various points in time. In at least one embodiment, TT updates to the TT can also be managed and handled in accordance with a LSS where the TT itself can be characterized generally as another type of metadata.

In at least one embodiment, pages of metadata can be persistently stored in storage units denoted as PLBs (physical large blocks) in a metadata (MD) tier of non-volatile storage. Each PLB of metadata can have a corresponding PLB descriptor that generally describes content or data stored in the corresponding PLB. As a metadata page is updated and stored in a new physical address or storage location of a target PLB in accordance with a LSS, the target PLB's corresponding descriptors can also be updated to reflect the metadata page now stored in the target PLB. In at least one embodiment, such updates to a descriptor of the target PLB of metadata can also be managed and handled in accordance with an LSS.

The foregoing and other details regarding the techniques of the present disclosure are described in the following paragraphs.

Figure 8:
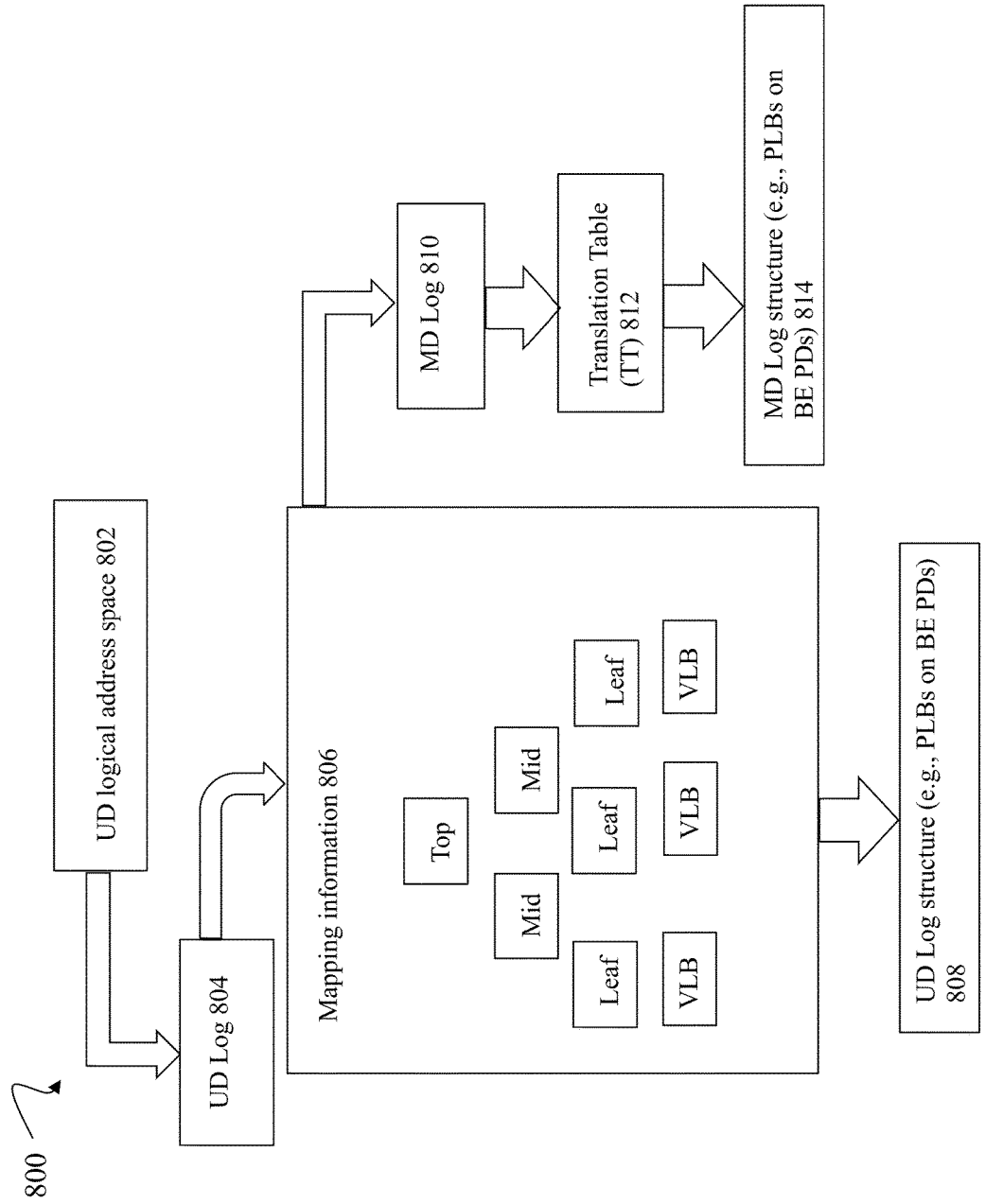

Referring to FIG. 8, shown is an example 800 illustrating components of a log structured MD architecture in at least one embodiment in accordance with the techniques of the present disclosure.

The example 800 provides a component level view of functionality regarding log structured mapping metadata can be include components in at least one embodiment in accordance with the techniques of the present disclosure. The example 800 includes UD logical address space 802, UD log 804, mapping information 806, UD log structure 808, MD log 810, translation table (TT) 812, and MD log structure 814. The UD log structure 808 can denote BE non-volatile storage, such as on BE PDs of the storage system, that persistently stores UD or content, for example, written by write operations. In at least one embodiment, the logs 804 and 810 can be persistently stored on a form of non-volatile storage such as on BE PDs. In at least one embodiment, the UD log structure 808 and the MD log structure 814 can have corresponding log structures as described elsewhere herein (e.g., such as in connection with FIGS. 2B-2D). In at least one embodiment consistent with other discussion herein, content persisted to each of the log structures 808, 814 can be written to consecutive sequential storage locations in an ongoing manner. In at least one embodiment, storage of 814 can be included a physical storage portion or tier sometimes referred to herein as the MD tier. In prior descriptions such as in connection with FIG. 7, the MD page store 540 can correspond to the MD tier.

As an example, assume a write W1 writes content C1 to a target logical address LA1 included in the UD logical address space 802. Consistent with other discussion herein in at least one embodiment, the write W1 can be recorded persistently in the UD log 804. At a later point in time, the recorded write W1 can be flushed from the UD log 804, where such flushing can include creating and/or updating one or more corresponding MD pages of the mapping information 806 used to map LA1 to a physical storage location PA1 included in a new physical storage location of a physical large block (PLB) of storage of the UD log structure 808. Updates made to a page of MD (e.g., MD top, mid, or leaf, or a VLB page) included in the mapping information 806 can be stored persistently in entries of the MD log 810. Consistent with discussion herein, such metadata updates stored in the MD log 810 can be made, for example, in connection with flushing the recorded write W1 from the UD log 804. Recorded metadata updates of the MD log 810 can also be flushed or destaged. As a result of the metadata updates to a page of MD M1 that are flushed from the MD log 810, an updated version of the metadata page M1 can be generated and stored at a new physical storage location PA2 on a PLB of the MD log structure 814. Additionally, corresponding information of the TT 812 can be updated to now map a logical address of M1 to its new storage location PA2.

As another example, assume a subsequent read R1 requests to read content C1 from the UD logical address LA1 (e.g., where LA1 can be included in the UD logical address space 802). In at least one embodiment, the existing mapping information 806 used to map LA1 to PA2 where C1 is stored can be used to service R1. Logical addresses of pages of metadata (including top, mid, leaf and VLB metadata pages of the mapping information 806) can be used and referenced. For example, a MD top page can reference MD mid pages using their corresponding logical addresses; a MD leaf page can reference addresses of VLB pages using their corresponding logical addresses; and the like. Put another way, pages of metadata of mapping information 806 can reference other pages of metadata in accordance with their logical addresses. The TT 812 can operate to translate a logical address of a MD page, such as the logical address L1 of MD page M1, to a corresponding physical address or location of the MD page, such as physical address PA1 of MD page M1, in the MD log structure 814.

In at least one embodiment, metadata pages can also be stored in volatile in-memory cache for faster access where the metadata page M1, if stored in the cache, can be accessed from the cache using M1's logical address L1. If M1 is not in cache when requested for reading such as when processing the read R1, a read cache miss results. Read cache miss processing in this example can include reading the MD page M1 from persistent storage, such as from its current physical storage location PA2 in the MD log structure 814.

To access a physical storage location of a metadata page in the MD log structure 814, the TT 812 can be used. In this manner in at least one embodiment read cache miss processing with respect to a metadata page that is not in cache, such as a volatile cache, can use the TT 812 to map the logical address L1 of the MD page M1 to its corresponding storage location PA2 in the MD log structure 814.

The element 812 can generally denote use of one or more TTs. In at least one embodiment as discussed in more detail elsewhere herein, two TTs can be represented by the element 812 including: a first TT, MD TT, used for mapping or translating top, mid, and leaf MD pages; and a second TT, VLB TT, used for mapping or translating VLB pages. Thus although examples herein for illustration purposes can include the foregoing two TTs, an embodiment can alternatively use a single TT, or more generally, any suitable number of TTs including the same information.

Figure 9:
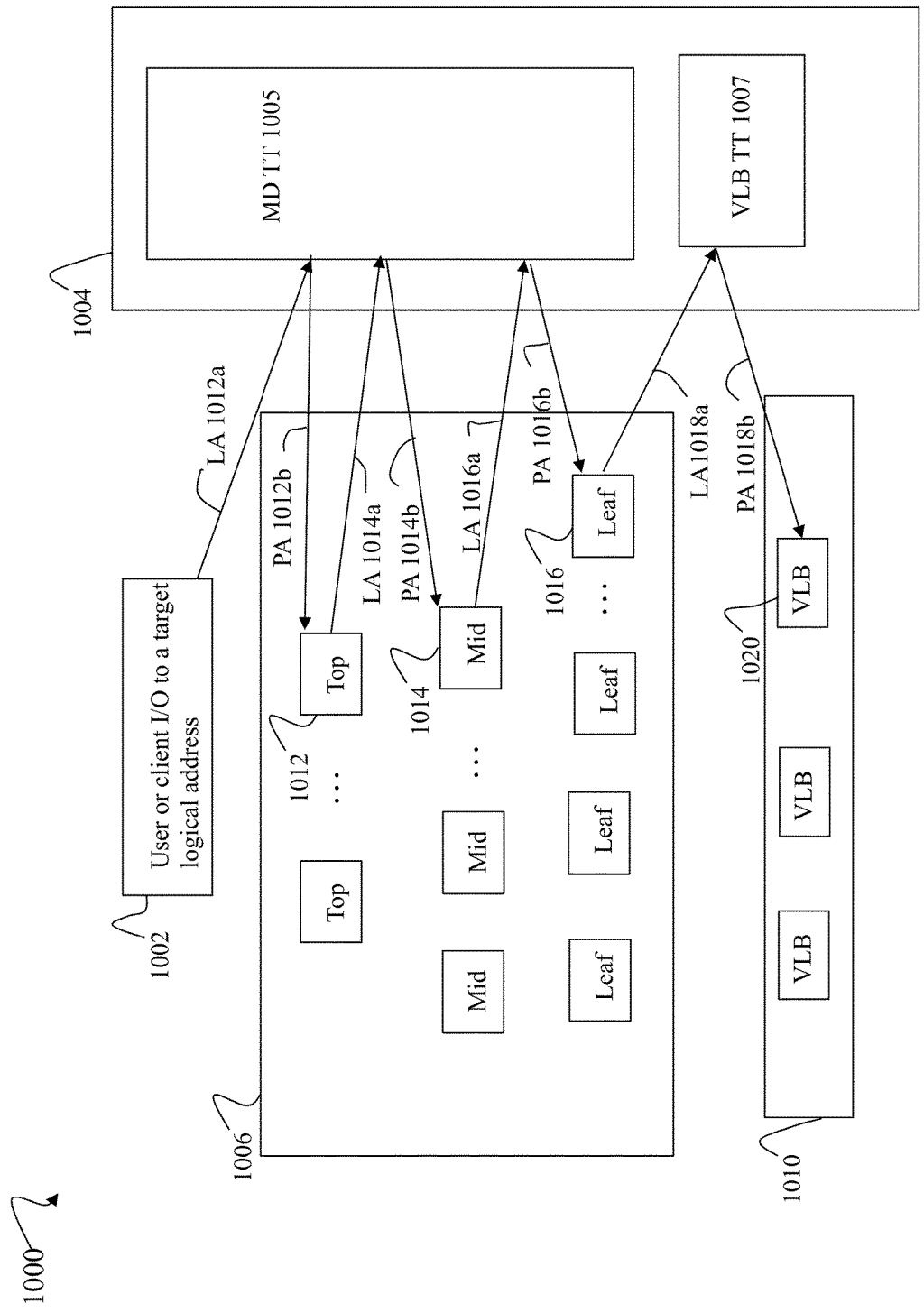
FIG. 9 is an example of illustrating logical to physical address translation of metadata pages included in a chain of mapping information.

Referring to FIG. 9, shown is an example 1000 illustrating further use of TTs in at least one embodiment in accordance with the techniques of the present disclosure.

In at least one embodiment, the elements 1004, 1006 and 1010 can denote different portions of non-volatile storage. The portion 1004 can persistently store the MD TT 1005 and the VLB TT 1007. The portion 1006 can persistently store top, mid and leaf MD pages. The portion 1010 can persistently store VLB pages. Element 1002 can denote a user or client I/O that includes a target logical address UD1 of the UD logical address space 802.

In at least one embodiment, TTs 1005, 1007 can include entries each mapping a logical address LA of a page of metadata to a corresponding physical address PA. To map an LA of a MD page to the corresponding PA where the MD page is persistently stored in the MD tier, processing can read the PA from a TT entry or element with the index LA, which can be represented as PA=TT [LA]. In at least one embodiment, the TTs 1005, 1007 can be structures maintained as set of MD pages of a new MD page type, such as a new type "TT".

In the example 1000, the element 1006 represents the non-volatile physical storage of the log structured system for persistently storing top, mid and leaf MD pages. The element 1010 represents a portion of the non-volatile storage used for persistently storing the VLB pages also considered metadata in at least one embodiment. The elements 1006 and 1010 can correspond to portions of the MD log structure 814 of example 800 and the MD page store 540 of FIG. 7 in at least one embodiment. Generally, the storage of 1004, 1006 and 1010 can be non-volatile storage, for example, of the MD tier that can include BE PDs of the storage system. The storage 1006 can be configured for storing a MD page to a new physical storage location each time the MD page is updated. The storage 1010 can be configured for storing a VLB page to a new physical storage location each time the VLB page is updated.

In at least one embodiment, the TTs 1005, 1007 can be accessed through cache (e.g., volatile memory) like other metadata pages. Consistent with discussion elsewhere herein in at least one embodiment, using the mapping information 806 of MD pages to map a user data or client target logical address to its corresponding physical location storing the content of the target logical address can require the mapping information of MD pages to be in cache. The mapping information can be characterized as forming a chain of MD pages including a top MD page, a mid MD page, a leaf MD page and a VLB page. A cached copy of a metadata page of the chain can be accessed in the cache based on its corresponding LA. If one of the MD pages of the mapping information is not stored in such as when servicing a read that reads the content from the target logical address, a cache miss results thereby triggering processing that loads the MD page from its current physical location on the non-volatile storage of 1006, 1010 into the cache for use in servicing the read. The TTs 1005, 1007 can be used to map a logical address or LA of a metadata page to its corresponding physical address or persistent storage location PA in connection with a cache miss of the MD page. The TTs 1005, 1007 can be cached in order to be used in connection with the foregoing mapping of LAs to corresponding PAs for metadata pages (e.g., top, mid, leaf and VLB pages) of the chain of mapping information.

For example, consider a read I/O 1002 to read data from a UD target logical address UD1. For the UD target logical address UD1, the logical address LA 1012a of the MD top page 1012 can be determined. If the MD top page 1012 is not in cache, cache miss processing can be performed where 1) the LA 1012a is then mapped by the MD TT 1005 to its corresponding physical address PA 1012b identifying the physical address or storage location of the MD top page 1012 in 1006; and then 2) the MD top page 1012 is loaded from its PA in 1006 into the cache and used to obtain the logical address LA 1014a of the next MD page, the mid MD page 1014, in the chain. Otherwise, if the MD top page 1012 is already in cache, the cached copy thereof can be used to obtain the LA 1014a of the next page, the mid MD page 1014, in the chain.

Processing can determine whether or not the mid MD page 1014 is in cache. If the mid MD page 1014 is not in cache, cache miss processing can be performed where 1) the LA 1014a is then mapped by the MD 1005 to its corresponding physical address PA 1014b identifying the physical address or storage location of the MD mid page 1014 in 1006; and then 2) the MD mid page 1014 is loaded from its PA in 1006 into the cache and used to obtain the LA 1016a of the next MD page, the MF leaf page 1016, in the chain. Otherwise if the MD mid page 1014 is already in cache, the cached copy thereof can be used to obtain the logical address LA 1016a of the MD leaf page 1016.

Processing can determine whether or not the MD leaf page 1016 is in cache. If the MD leaf page 1016 is not cache, cache miss processing can be performed where 1) the LA 1016a is then mapped by the MD TT 1005 to its corresponding physical address PA 1016b identifying the physical address or storage location of the MD leaf page 1016 in 1006; and then 2) the MD leaf page 1016 is loaded from its PA 1016b in 1006 into the cache and used to obtain the logical address LA 1018a to the VLB 1020 in the chain.

Processing can determine whether or not the VLB page 1020 is in cache. If the VLB page 1020 is not in cache, cache miss processing can be performed where 1) the LA 1018a is mapped by the VLB TT 1007 to its corresponding physical address PA 1018b identifying the physical address or storage location of the VLB page 1020; and then 2) the VLB page 1020 is loaded from its PA 1018b into cache and used to obtain the physical storage location where the requested content C1 for the target logical address UD1 is stored.

In connection with the foregoing, if a MD page of the mapping information chain is in the cache, the associated cache miss processing and thus associated TT mapping can be omitted. When a MD page, such as a top, mid or leaf MD page, is updated, the updated version of the page can be written to a new physical location, new PA, in the storage 1006. Additionally, when the MD page is updated and written to a new physical address PA, corresponding mapping information in the MD TT 1005 is also updated. In particular, the entry of the MD TT 1005 for the MD page is updated to now reference the new PA (e.g., MD TT 1005 is updated to map the MD page's fixed logical address to the new PA). When a VLB is updated, the updated version of the page can be written to a new physical location, new PA, in the storage 1010. Additionally, when the VLB page is updated and written to a new PA, corresponding mapping information in the VLB TT 1007 is also updated. In particular, the entry of the VLB TT 1007 for the VLB page is updated to now reference the new PA (e.g., the VLB TT 1007 is updated to map the VLB page's fixed logical address to the new PA).

Figure 10:
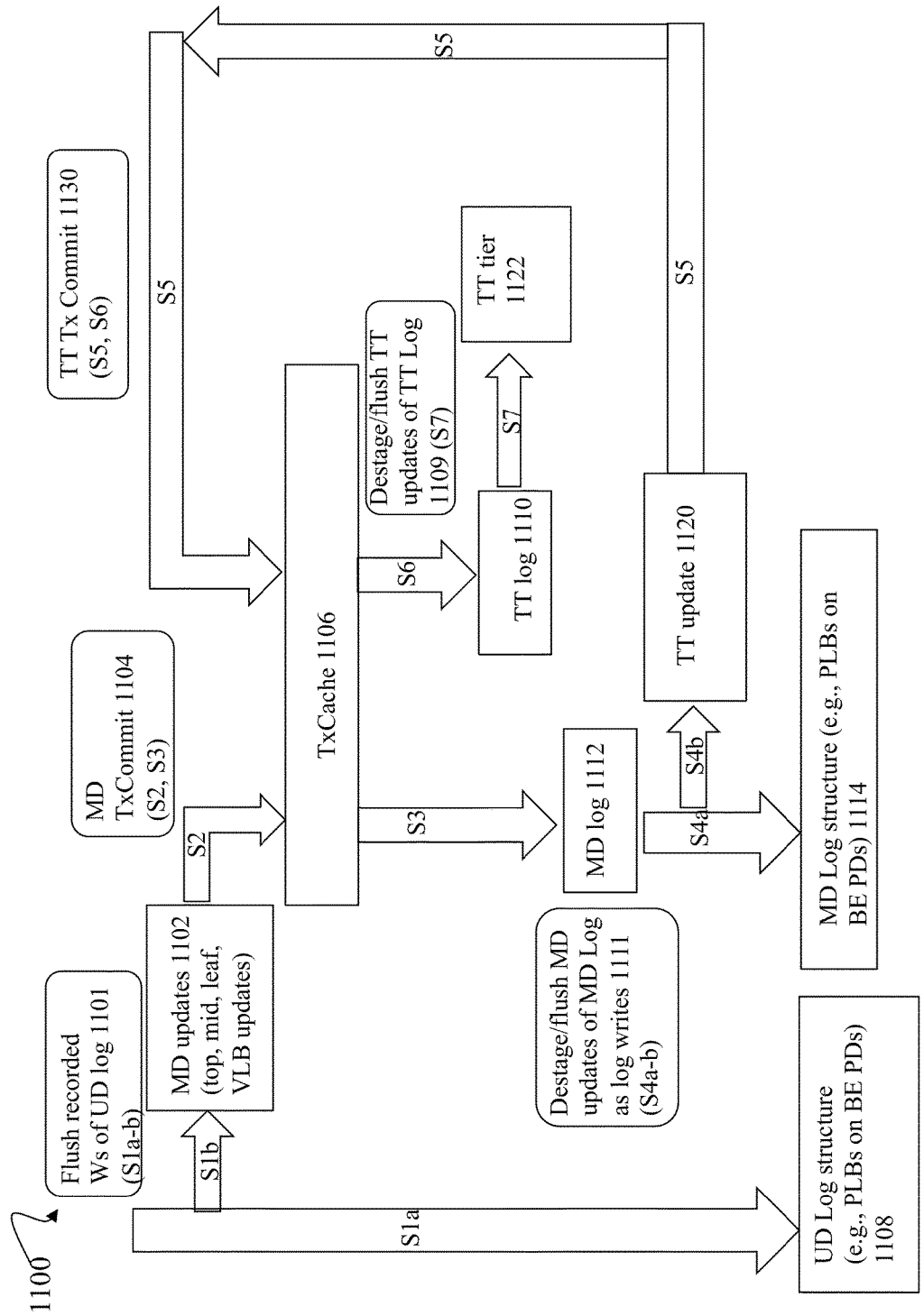

Referring to FIG. 10, shown is an example 1100 illustrating various processing or workflows in at least one embodiment in accordance with the techniques of the present disclosure.

The example 1100 includes a flush workflow or processing 1101 when flushing writes Ws as recorded in the UD log. Consistent with other discussion herein, flushing a recorded write W1 from the UD log (e.g., element 804 of the example 800), where W1 writes content C1 to UD logical address UD1, can include flows S1a-b. S1a can denote storing the written content C1 at a physical address of location PA1 in the UD log structure 1108 in a PLB of storage on the MD tier (e.g., stored on BE PDs). S1b can denote creating and/or updating one or more metadata pages of mapping information used to map UD1 to PA1, where PA1 currently includes the content C1 stored at UD1. Thus, S1b can include performing MD updates 1102 denoting top, mid, mid, leaf and/or VLB page updates. The MD updates 1102 (resulting from flushing the recorded write W1 from the UD log) can be included in a MD Tx (transaction) commit operation, workflow or processing 1104 where the MD updates 1102 to one or more pages are committed in the flow S2 to the Tx Cache 1106 and committed in the flow S3 to the MD log 1112. In at least one embodiment, the Tx Cache 1106 can denote a volatile memory cache. In at least one embodiment, the Tx Cache 1106 can include an in-memory or volatile memory copy of the MD log 1112, where the MD log 1112 can denote the persisted copy of the MD log stored on non-volatile storage.

In a manner similar to flushing entries of the UD log, recorded MD updates included in entries of the MD log 1112 (and also the in-memory copy in Tx Cache 1106) can be destaged or flushed as represented by element 1111. Destaging or flushing MD updates of the MD log as log writes 1111 can result in performing processing denoted by the flows S4a-b. S4a can denote applying one or more MD updates to a MD page to generate an updated version of the MD page, where the updated version of the MD page can be stored persistently at a new physical storage location of the MD log structure 1114. S4b can denote a TT update 1120 that needs to be made to a TT, where the TT update 1120 is in accordance with the new physical storage location. In particular in at least one embodiment, the TT update 1120 can include updating the TT to map the existing logical address of the updated MD page to the new physical storage location. In at least one embodiment, there can be a corresponding unique entry in the TT for each top, mid, leaf and VLB page of metadata such that each MD page updated results in updating the MD page's corresponding mapping entry of the TT with the MD page's new physical storage location or address.

One or more TT updates 1120 can be included in a TT Tx Commit operation, workflow or processing 1130, where the TT updates are committed in the flow S5 to the in-memory copy of the TT log as can be stored in the Tx Cache 1106, and committed in the flow S6 to the TT log 1110. In at least one embodiment, the Tx Cache 1106 can include an in-memory or volatile memory copy of the TT log 1110, where the TT log 1110 can denote the persisted copy of the TT log stored on non-volatile storage. The element 1109 can denote the workflow, processing or operation of destaging or flushing (in the flow S7) the TT updates from the TT log to a TT tier 1122. As discussed in more detail elsewhere herein in at least one embodiment, the TT tier can denote non-volatile storage storing persisted copies of the two most recent versions of the TT. In at least one embodiment, one or more TT updates can be applied to a current version of the TT to generate an updated version of the TT. The updated version of the TT can be a complete instance of the TT that is persisted to the TT tier. In at least one embodiment, the two most recent versions of the TT can be stored in the TT tier such that each time a new complete instance of the TT is destaged, it can replace the older of the two persisted TT instances of the TT tier 1122.

In at least one embodiment, the TT tier 1122 can also be log-based or have an associated log structure in that generally the multiple TT instances stored in the TT tier 1122 can be written sequentially. In particular, each TT instance can be written sequentially to the TT tier 1122. Additionally in at least one embodiment, the multiple TT instances stored in the TT tier 1122 can be logically sequential with respect to one another in accordance other discussion herein (e.g., such as in connection with FIGS. 2A-D). Furthermore, each time a new or updated version of a TT is written to the TT tier in accordance with the LSS, the new or updated version can be written to a new storage location that is different from an existing storage location or address storing the TT version prior to updating.

In at least one embodiment, multiple changes to the TT can be accumulated in the TT log. Subsequently, the multiple changes or updates to the TT can then be applied to a current or most recent version of the TT as stored in the TT tier to generate an updated version of the TT. The updated version of the entire TT can then be written out to the TT tier, such as replacing the older or oldest persisted version of the TT stored on the TT tier. Thus in at least one embodiment, the TT tier can generally persistently store multiple complete instances of the TT where such persisted instances can denote logically consecutive versions of the TT. In at least one embodiment as discussed in more detail herein, the most recent two versions of the TT can be persisted to the TT tier. However more generally any suitable number of complete copies of versions of the TT can be stored in the TT tier. In at least one embodiment, the updated version of the TT can be written sequentially and stored to a new location in the TT tier, thereby replacing the oldest persistent TT version of the TT tier.

In at least one embodiment, each instance of the TT can be relatively small in size which is the reason why the entire TT can be written out each time there is a set of updates or changes applied to the TT without adversely impacting performance of the system.

In at least one embodiment, the most current version of the entire TT can be stored in volatile memory such as in cache. The most current version of the TT can include the most recent persisted version of the TT stored in the TT tier with all TT updates of the TT log applied. In the event of a system failure or other event such as a reboot causing loss of the in-memory or cached copy of the most current version of the TT, the most current version of the TT can be restored as a result of reapplying the TT updates of the persisted TT log 1110 to the most recent persisted version of the TT stored in the TT tier 1122.

Figure 11A:
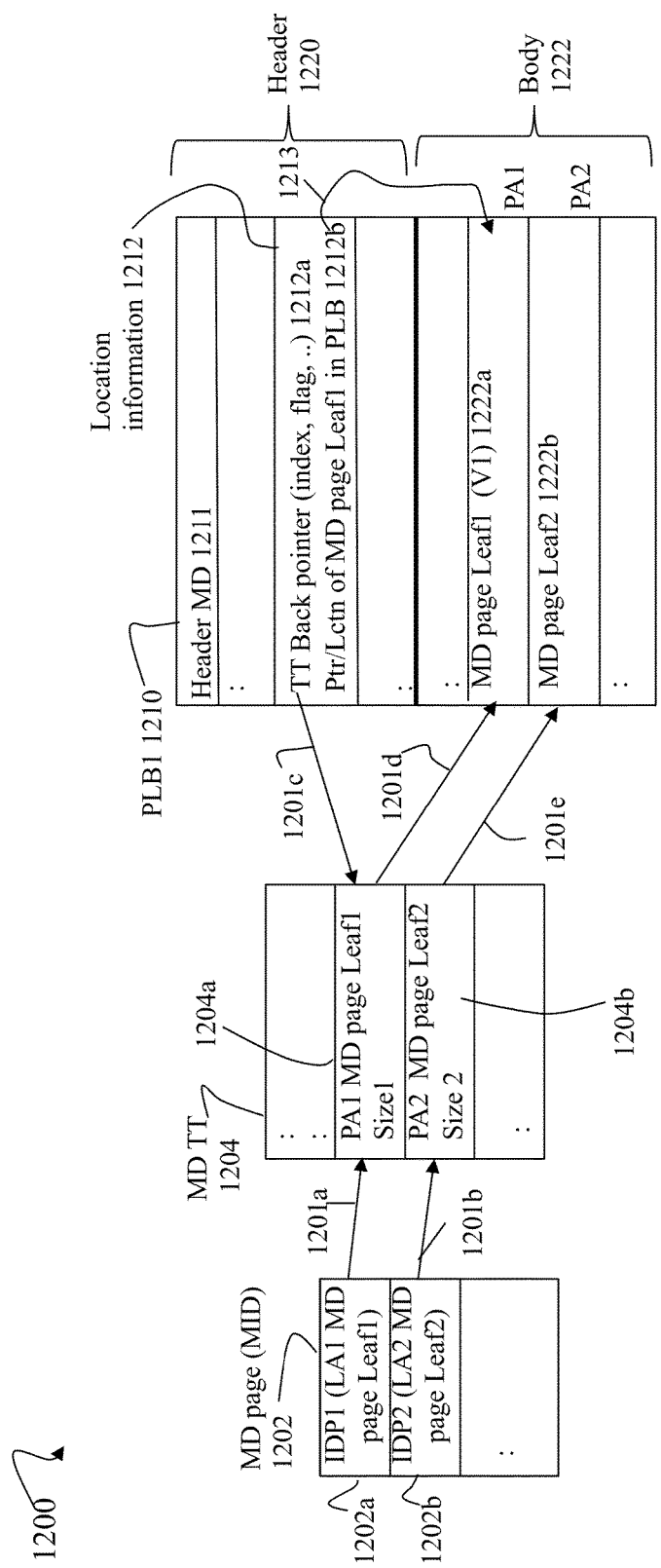

Referring to FIG. 11A, shown is an example 1200 providing further detail regarding a TT in at least one embodiment in accordance with the techniques of the present disclosure. The example 1200 illustrates use of the MD TT that, as noted elsewhere herein in at least one embodiment, can be used to map or translate logical addresses of top, mid and leaf MD pages to their corresponding physical storage locations or addresses. The VLB TT can be similarly used to map or translate logical addresses of VLB pages to their corresponding physical storage locations or addresses.

The example 1200 illustrates use of the MD TT 1204 for mapping or translating logical addresses of MD leaf pages included in the MD MID page 1202. More generally, the MD TT 1204 can be used with similarly translating or mapping logical addresses of any top, mid and leaf MD pages.

The logical addresses of MD pages and VLB pages can be used to locate such pages in both cache as well as on disk (e.g., persistent storage of BE PDs). In at least one embodiment, the logical addresses of the metadata pages, such as top, mid, leaf and VLB pages can be fixed for the life of the pages. In at least one embodiment, logical addresses of a first group of metadata pages including top, mid and leaf MD pages can be logical addresses in a MD address space (MDAS). In at least one embodiment, a second group of metadata pages can include VLB pages where logical addresses of the VLB pages can be logical addresses in a VLB address space (VLBAS) that is separate from the MDAS. It should be noted that in various contexts herein, MD or metadata can be used to generally denote any type of metadata page such as top, mid, leaf and VLB pages, and in other contexts can refer to particular types of the metadata pages such as top, mid and leaf MD pages without including VLB pages.

In at least one embodiment, logical addresses of top, mid and leaf MD pages can directly map to a mapping entry or index in the MD TT; and logical addresses of VLB pages can directly map to a mapping entry or index in the VLB TT. Each mapping entry of the MD TT can specify the current physical address or location of a MD page within a PLB of the MD physical space (MDPS) of the MD log structure (that is included in the larger MD tier). Each mapping entry of the VLB TT can specify the current physical address or location of a VLB page within a PLB of the VLB physical space (VLBPS) of the TT tier (that is included in the larger MD tier). In at least one embodiment, each PLB of the MD log structure and TT tier can include additional information used primarily for recovery, where such additional information can generally describe the location of the pages within the PLB as well as the location of corresponding mapping entries for such pages in an associated TT. In at least one embodiment, each PLB can also have an associated PLB descriptor using in management of the physical capacity and state of the PLB.

The example 1200 illustrates the mapping of logical addresses of the MDAS to the MDPS using the MD TT. As noted above, logical addresses of the VLBAS to the VLBPS can also be similarly mapped using the VLB TT that can include information similar to the MD TT 1204 but for VLB pages rather than top, mid and leaf MD pages.

As described elsewhere herein, for example, such as in connection with FIGS. 3, 4, 5 and 6, a first MD page, such as a MD MID page, can include multiple entries where each such entry can include a pointer, address, reference, offset, or index to a MD leaf page. In at least one implementation not in accordance with the techniques of the present disclosure, the foregoing pointer or address of a MD MID page entry can directly reference the MD leaf page, where the pointer or address can be the physical address or location of the MD leaf page as stored on BE non-volatile storage. Thus, if the referenced MD leaf page is stored in a new physical location, the entry of the MD MID page must be updated also to include the new physical location or address.

In contrast to the foregoing in at least one embodiment in accordance with the techniques of the present disclosure, the entry of the MD MID page can generally include a logical address LA of a MD leaf page that is mapped or translated by the MD TT 1204 to the physical storage location or address PA of the MD leaf page as stored in a PLB of the MD log structure of the MD tier.

The example 1200 includes the MD MID page 1202, MD TT 1204, and PLB 1 1210. The PLB 1 1210 can be included in the MD log structure of the MD tier. The MD MID page 1202 can include entries each storing a logical address LA of a MD leaf page. In at least one embodiment, the LA of the MD leaf page can be mapped to a corresponding entry E1 in the MD TT 1204, where E1 further maps the LA of the MD leaf page to the physical storage location or address PA of the MD leaf page in the PLB 1210. In at least one embodiment, the LA of the MD leaf page can be used as an IDP or indirect pointer or address to the physical location or address PA of the MD leaf page. In at least one embodiment, the LA of the MD leaf page can be an index, offset or location of the mapping entry E1 of the MD TT 1204 that maps LA to its corresponding PA storing the MD leaf page.

In the example 1200, the MD MID page 1202 includes entry 1202a with IDP1 that can denote the logical address LA1 of MD page Leaf1; and includes entry 1202b with IDP2 that can denote the logical address LA2 of MD page Leaf2. IDP1 or LA1 of entry 1202a can point, reference or map directly (1201a) to the entry 1204a of the MD TT 1204, and IDP2 or LA2 of entry 1202b can point, reference or map directly (1201b) to the entry 1204b of the MD TT 1204. In at least one embodiment, the IDP1 or LA1 of entry 1202a can be the index or offset I1 of the mapping entry 1204a of the MD TT 1204; and the IDP2 or LA2 of the entry 1202b can be index or offset I2 of the mapping entry 1204b of the MD TT 1204.

In at least one embodiment, each entry of the MD TT 1204 can include the current physical location or address of a MD page along with a size of the MD page as stored in a PLB. The size of each entry of the MD TT 1204 can be used to support compression of a MD page stored in the PLB, where the size can denote the variable size of the stored compressed MD page. In at least one embodiment, compression can also be optionally applied. In the example 1200, the entry 1204a of the MD TT 1204 includes the physical address or location PA1 of the MD page Leaf1 and its corresponding size, size1, as stored in the PLB 1210. The entry 1204b of the MD TT 1204 includes the physical address or location PA2 of the MD page Leaf2 and its corresponding size, size2, as stored in the PLB 1210.

It should be noted that the example 1200 includes location information 1212 illustrated for MD page Leaf1 1222a. In this example although not specifically illustrated, the header MD 1211 also includes a second set of location information for MD page leaf2 1222b similar to the location information 1212 specifically illustrated for MD page leaf1 1222a. For example, the foregoing second set of location information of the header MD 1211 corresponding to the MD page leaf2 122b includes a second TT back pointer to 1204a, and also a second pointer to the MD page leaf2 122b within the body 1222.

The entry 1204a includes PA1 that can be the physical address or location in the PLB 1210 of MD page leaf 1 1222a. Generally, PA1 of the entry 1204a can directly point to or reference (1201d) the physical storage location of MD page leaf1 1222a.

The entry 1204b includes PA2 that can be the physical address or location in the PLB 1210 of MD page leaf 2 1222b. Generally, PA2 of the entry 1204b can directly point to or reference (1201e) the physical storage location of MD page leaf2 1222b.

It should be noted that although in at least one embodiment, the logical address LA of a MD page can directly point to its corresponding mapping entry of the MD TT 1204, there can generally be one or more layers of addressing and pointers between a MD page such as 1202 and the MD TT 1204. In in a similar manner, it should be noted that although in at least one embodiment, each mapping entry of the MD TT 1204 can directly point to or include the physical address or location of a corresponding MD page, there can generally be one or more layers of addressing and pointers between each mapping entry of the MD TT 1204 and corresponding physical storage locations or addresses of persistently stored MD pages.

The PLB 1210 can be included in the MDPAS of the MD log structure. The PLB 1210 can include a header 1220 and a body 1222. The header 1220 can include header MD 1211 and location information 1212 for each MD page stored in the PLB 1210. In this example, the location information 1212 provides additional information regarding the MD page leaf1 1222a that is stored in the PLB 1210. More generally, the header 1220 can similarly include a set of location information 1212 for each of the MD pages, such as MD page leaf2 1222b, stored in the PLB 1210. The location information 1212 for the MD leaf page 1 1222a can include fields 1212a-b. The field 1212a can be a TT back pointer 1212a that denotes a pointer, address or location of the mapping entry 1204a of the MD TT corresponding to the MD leaf page 1 1222a. The TT back pointer 1212a can point to (1201c) the mapping entry 1204a of the MD TT 1204, where the entry 1204a is used in mapping the logical address IDP1/LA1 of MD leaf page 1 to its current physical address or location PA1. The field 1212b can point to or reference (1213) the physical storage location PA1 of the current version V1 of the MD page leaf1 1222a as stored in the PLB 1210. The field 1212b can be a pointer, address or location of the MD page leaf1 1222a as stored at PA1 in the PLB 1210.

When updates to a MD page are flushed from the MD log, such updates can be applied to a current version V1 of the MD page as persistently stored in the MD log structure to generate an updated version V2 of the MD page. In accordance with an LSS, the updated version V2 of the MD page can then be persistently stored as the most recent copy of the MD page of the MD log structure, where the updated version V2 of the MD page can be stored at a new physical storage location or address that is different from the existing physical storage location or address of V1 of the MD page. Thus, as a MD page is updated and then persistently stored as part of flushing or destaging the MD log, the physical storage location or address of the MD page will change and the changed physical storage location or address can be noted in the appropriate TT, such as the MD TT for top, mid and leaf MD pages and similarly in the VLB TT for VLB pages. In at least one embodiment, the logical addresses of the MD pages and the VLB pages can remain the same even though the physical storage locations or addresses of such MD pages as stored in the MD log structure can change.

Figure 11B:
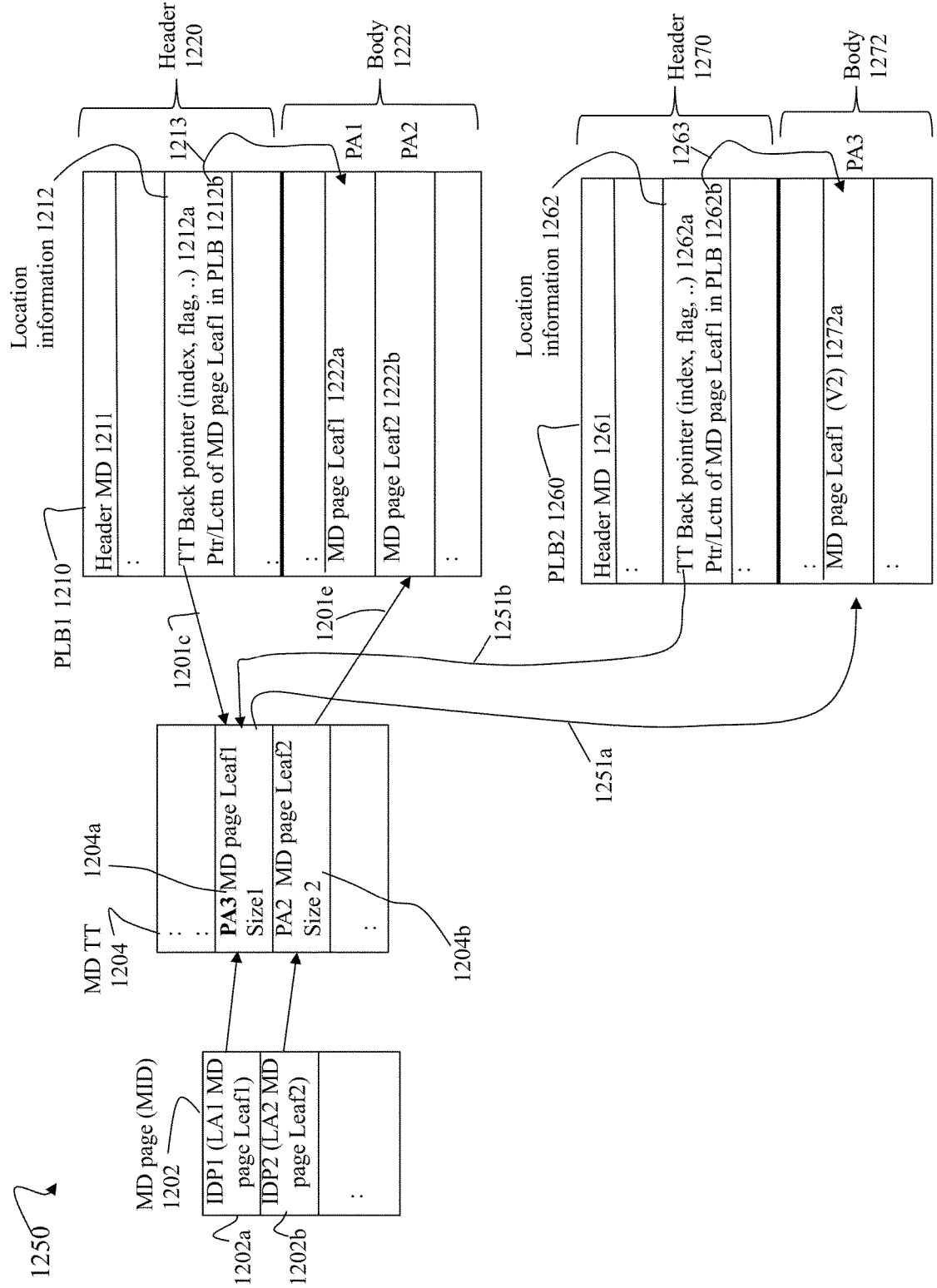

The example 1200 illustrates a state of the various structures at a first point in time T1 when MD page leaf 1 is denoted as having a current version V1 stored in the PLB 1210. At a second point in time T2 subsequent to T1, MD page leaf 1 V1 can be updated to subsequent current version V2, where the updated version V2 of MD page leaf1 can be written to a new physical address or location, PA3, of another PLB, PLB2 as illustrated in the example 1250 of FIG. 11B. MD page leaf 1 V1 can be updated to the current version V2 as a result of flushing or destaging a set of MD updates from the MD log and applying those aggregated updates to V1 of MD page leaf1. Thus the example 1250 can illustrate the state of the system at time T2 after such updates are applied to MD page leaf1 V1 to generate MD page leaf1 V2 that is stored at a new physical address or location PA3.

The example 1250 includes structures similarly numbered as in the example 1200 with differences discussed in more detail below. As noted above, the MD page leaf1 can be updated to V2 that is stored at PA3 of PLB2 1260. In response to storing the most current version V2 of MD page leaf1 at the new location PA3, the corresponding mapping entry 1204a of the MD TT 1204 can be updated to point to (1251a) or reference the new location PA3 rather than the prior location PA1 storing the prior version V1 of MD page leaf1.

The PLB2 1260 can include a header 1270 and a body 1272. The header 1270 can include header MD 1261, and location information for each MD page stored in the PLB 1260. In this example 1250, the header 1270 can include location information 1262 for the MD page leaf 1 (V2) 1272a stored at PA3 of the PLB 1260. The location information 1262 can include fields 1262a-b. The field 1262a can include a TT back pointer that denotes a pointer, address or location of the mapping entry 1204a of the MD TT corresponding to the MD leaf page 1 1272a. The TT back pointer 1262a can point to (1251b) the mapping entry 1204a of the MD TT 1204, where the entry 1204a is used in mapping the logical address IDP1/LA1 of MD leaf page 1 to its current physical address or location PA3. The field 1262b can point to or reference (1263) the physical storage location PA3 of the current version V2 of the MD page leaf1 1272a as stored in the PLB 1260. The field 1262b can be a pointer, address or location of the current version V1 of the MD page leaf1 1272a as stored at PA3 in the PLB 1260.

Referring back to the examples 1200 and 1250, the MD TT 1204 can denote a current version of the MD TT 1204 as stored in memory, such as volatile memory of a cache such as the Tx cache. Consistent with other discussion herein, flushing updates from the MD log that update MD page leaf1 from V1 to V2 and result in storing MD page leaf1 V2 at the new current physical address or location PA3 also trigger a corresponding update U12 to the MD TT being stored in the TT log. U12 can identify, for example, that update or change to the entry 1204a to identify the PA3 (rather than PA1) as the current physical storage location or address for MD page leaf1.

Figure 11C:
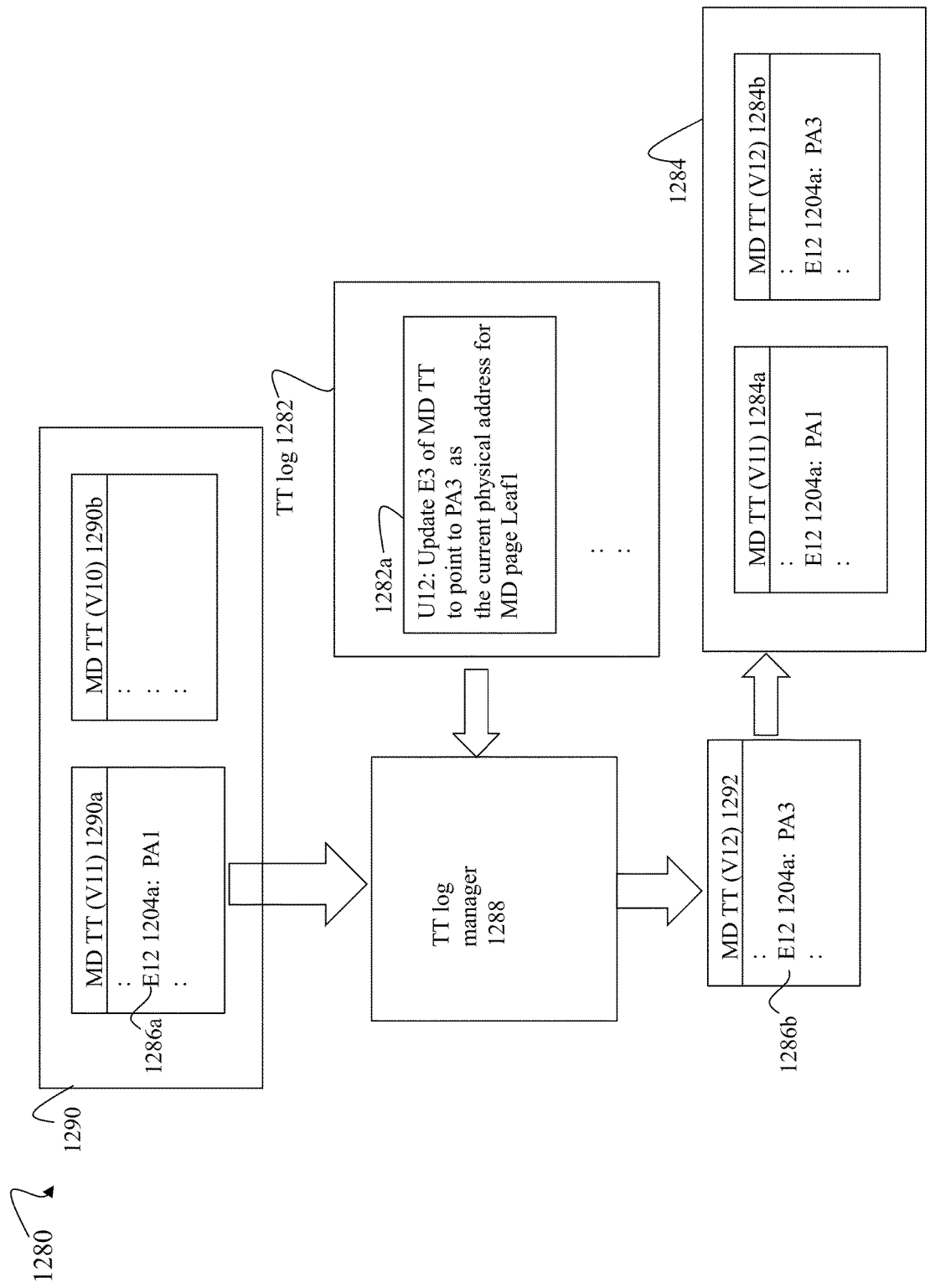

Referring to FIG. 11C, shown is an example 1280 illustrating in further detail use of the TT log in connection with the foregoing update U12 for the MD TT in at least one embodiment.

Additionally at the second point in time T2 as illustrated in the example 1280 of FIG. 11C, an update U12 for the entry E12 1204a identifying PA3 as the current physical address or location of current version of the MD page Leaf1 can be recorded in the TT log. At a later point in time T3 subsequent to T2, U12 can be flushed from the TT log and applied to the most recent persistent copy of the MD TT.

To further illustrate the foregoing, reference is made to the example 1280 that includes element 1290 representing the two most recently persistently stored copies 1290a-b of the MD TT. In particular, element 1290a denotes the most recent persisted version V11 of the MD TT and element 1290b denotes the older persisted version V10 of the MD TT. In at least one embodiment, management of the persisted versions of the TTs, including the VLB TT and the MD TT, can be performed by a TT log manager component 1288. At various points in time and responsive to the occurrence of one or more trigger conditions, the TT log manager 1288 can apply updates from the TT log 1282 to the most recent persisted copies of the VLB TT and MD TT to generate updated versions of the VLB TT and MD TT, where such updated versions can replace the older/oldest persisted copies of the VLB TT and MD TT. The example 1280 illustrates application of MD TT updates but similar processing can be performed in connection with application of VLB TT updates as also discussed elsewhere herein in more detail.

The TT log manager 1288 can receive inputs including the most recent persisted version of the MD TT, MD TT V11 1290a, and updates from the TT log 1282. The updates of the TT log 1282 can include update U12 1282*a*. In at least one embodiment, the update U12 1282*a* can be recorded as an entry in the TT log 1282 in a manner similar to that as described herein in connection with the MD log (e.g., as in connection with FIG. 7 elsewhere herein). The TT log manager can apply the update U12 1282*a* to the entry E12 1204*a* of the MD TT (V11) 1290*a* to generate an updated MD TT (V12) 1292. In this example, V11 of the entry E12 1286*a* of 1290*a* is updated to V12 of the entry E12 1286*b* of 1292. In particular, the MD TT (V12) 1292 can correspond to the in-memory version of 1204 of the example 1250. The MD TT (V12) 1292 can be persistently stored and can replace the older/oldest version V10 1290*b*. Element 1284 includes the two most recent versions V11 and V12 1284*a-b* of the MD TT as persistently stored in the MD tier by the TT log manager.

In the example 1280, 1290 denotes the two persisted versions 1290*a-b* of the MD TT before the TT log manager applied the above-noted updates and 1284 denotes the two persistent versions 1284*a-b* of the MD TT after the TT log manager applied the above-noted updates. As can be observed by comparing 1290 and 1284, the oldest version V10 1290*b* of 1290 is replaced with the updated version V12 1284*b*, and element 1290*a* and 1284*a* correspond to the same version V11 of the MD TT not replaced in connection with applying the updates of the TT log 1282.

Although only a single update is illustrated in connection with the example 1280, more generally, the TT log 1282 can be flushed or destaged where multiple updates of the TT log 1282 can be applied to both the most recently persistent version of the VLB TT and the MD TT.

Consistent with discussion herein in at least one embodiment, element 1292 can denote an updated version of the MD TT that can correspond to the current in-memory version of the MD TT, such as can be stored in a volatile memory cache (e.g., TxCache 1106). More generally in at least one embodiment, at any point in time, the current most up to date version of the MD TT can be constructed by reading the most recent persisted version of the MD TT from the MD tier and applying the MD TT updates of the TT log; and the current most up to date version of the VLB TT can be constructed by reading the most recent persisted version of the VLB TT from the MD tier and applying the VLB TT updates of the TT log.

The foregoing use of TTs, such as the MD TT for mapping logical addresses of top mid and leaf MD pages to corresponding current physical storage addresses or locations of such pages, can be generalized and applied for use in connection with any other type of suitable metadata such as VLB pages. Consistent with other discussion herein in at least one embodiment, VLBs can have their own logical address space, VLBAS, as well as corresponding VLB TT and VLBPS of the MD tier.

In at least one embodiment, the MD tier can be a parity protected tier that supports log structure writes. In at least one embodiment, the MD tier can include BE non-volatile PDs configured into RAID 5 or RAID 6 groups of PDs. In at least one embodiment, content can be stored in the persistent MD tier in PLBs where pages of metadata can be grouped and written into PLB structures that are, for example, each 2 MBs in size. As metadata is updated, the updated version of the metadata can be stored in a new location thereby producing holes invalid or unused storage portions in the PLBs storing the old or prior metadata version. In at least one embodiment, the overall utilization of storage in each PLB storing valid content can be tracked and used for garbage collection to compact PLBs (e.g., copy valid content from multiple partially filled source PLBs to a single target PLB to thereby free the multiple source PLBs).

In at least one embodiment, metadata can be compressed as it is persistently stored. In at least one embodiment, a single MD tier can generally include all metadata physical storage (e.g., include MDPS as well as VLBPS). However in at least one embodiment, storage within the MD tier can be segregated by type at the PLB or other suitable storage unit level. For example, the MD tier can include the first group of metadata pages of types top, mid and leaf MD pages, where pages of the first group can be persistently stored in a first portion of the MD tier sometimes referred to herein as the MDPS. The MD tier can also include the second group of metadata pages of type VLB where pages of the second group can be persistently stored in a second portion of the MD tier sometimes referred to herein as the VLBPS.

Figure 12:
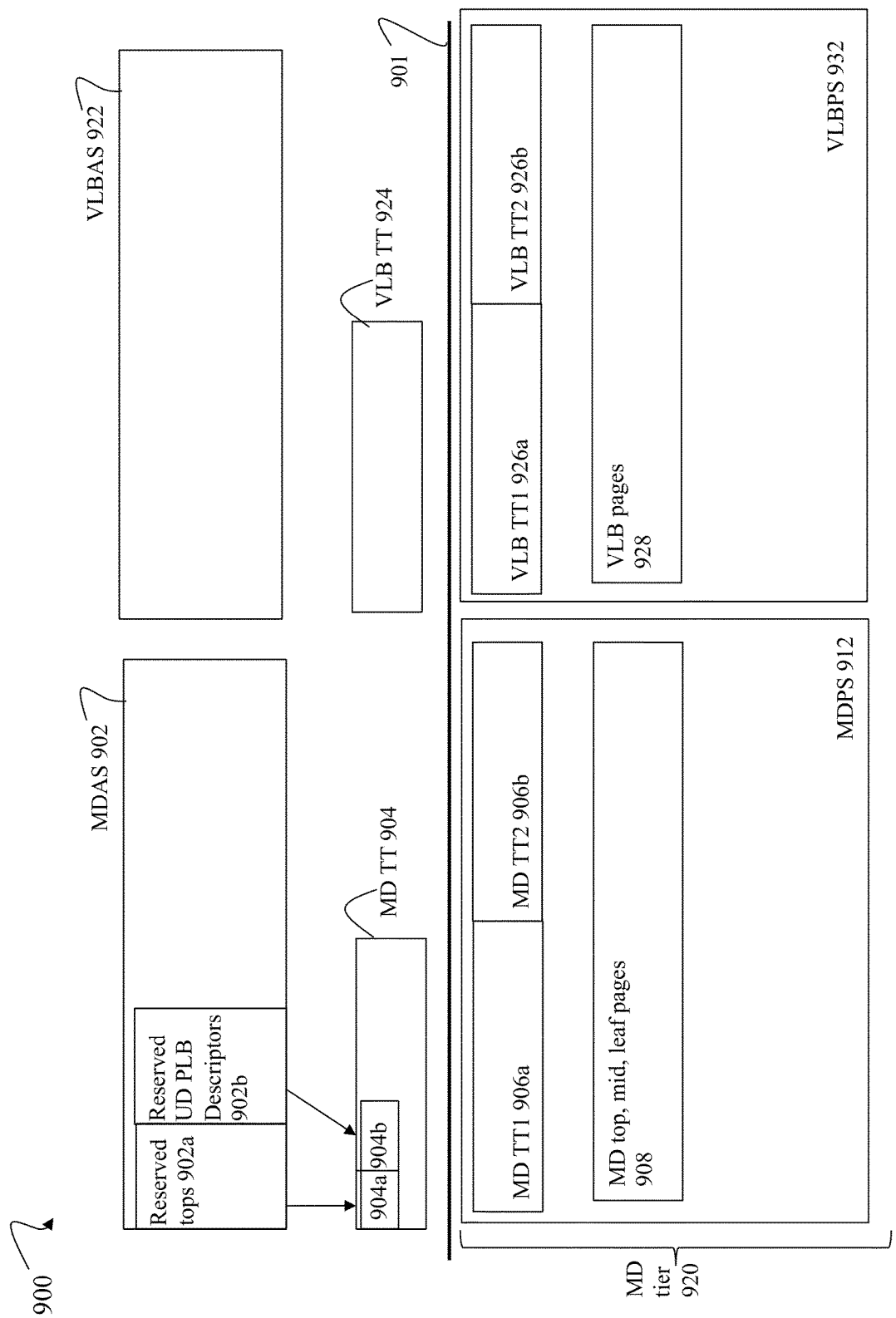
FIG. 12 is an example illustrating various logical and physical address spaces in at least one embodiment in accordance with the techniques of the present disclosure.

Referring to FIG. 12, shown is an example 900 illustrating the various in-memory logical address spaces and physical storage spaces in at least one embodiment in accordance with the techniques of the present disclosure.

The example 900 includes line 901 where components above the line 901 can denote the logical in-memory representations and where components below the line 901 can denote corresponding physical storage areas of the MD tier 920.

The in-memory logical representations can include the MDAS 902, MD TT 904, VLBs 922 and VLB TT 924.

In at least one embodiment consistent with other discussion herein, the mapping information of metadata pages can be partitioned into a first portion or group of metadata types including MD top, mid and leaf pages; and a second portion of a single metadata type including VLB pages. Generally although both VLB pages and MD top, mid and leaf pages can be considered metadata, in the example 900, the MDAS 902 and its associated MD TT 904 can represent logical in-memory representations related to the first group of MD pages; and the VLBAS 922 and its associated VLBTT 924 can represent logical in-memory representations related to the second group of VLB pages.

In at least one embodiment, other types of MD pages than those discussed specifically herein can used by other services and can be included generally in the MD tier 920. For example in at least one embodiment another type of MD page can be used to track free MD pages such as within the MD tier. In at least one embodiment, other supported types of MD than those specifically discussed herein can be included in the MDPS 912 and can be mapped or translated by the MD TT 904.

The MD tier 920 can include the MDPS 912 and the VLBPS 932. The MDPS 912 can include MD TT1 906*a*, MD TT2 906*b*, and top, mid and leaf MD pages 908 of the MD log structure 1114. The MD pages 908 can be stored in accordance with a log-based structure as described elsewhere herein in connection with the MD log structure 1114 of the example 1100. The VLBPS 932 can include the VLB TT1 926*a*, VLB TT2 926*b* and VLB pages 928 of the MD log structure 1114 of the example 1100. The VLB pages 928 can be stored in accordance with a log-based structure as described elsewhere herein in connection with the MD log structure 1114 of the example 1100.

Elements 906*a-b* can denote the two physical storage areas storing the most recently persisted two instances of MDTTs included in the MD tier 920. To illustrate, at a first point in time T11, MD TT1 906*a* can denote a first version V1 of a persisted MD TT and MD TT2 906*b* can denote a second version V2 of a persisted MD TT, where V2 can denote a more recent version than V1. At a second point in time T2 subsequent to T1, accumulated updates of the MD TT can be flushed from the TT log 1110 and applied to the most recent persisted version V2 of MD TT 906*b* to generate MD TT V3, where MD TT V3 can then replace the oldest/ older persisted version V1 of 906*a*. At a third point in time T3 subsequent to T2, accumulated updates of the MD TT can again be flushed from the TT log 1110 and applied to the most recent persisted version V3 of MD TT 906*a* to generate MD TT V4, where MD TT V4 can then replace the current oldest/older persisted version V2 of 906*b*. Thus, at each of the foregoing points in time T2 and T3, the most persisted version can serve as a "source" to which flushed MD TT updates of the TT log are applied to generate a further updated version of the MD TT that is then stored at a "target" or "destination" physical storage location replacing the oldest/older persisted version of the MD TT. At consecutive points in time when MD TT updates are flushed and applied as noted above, the roles of "source" and "target" with respect to the physical storage locations of 906*a-b* can switch.

Elements 926*a-b* can denote the two physical storage areas storing the most recently persisted two instances of VLBTTs included in the MD tier 920. To illustrate, at a first point in time T11, VLB TT1 926*a* can denote a first version V1 of a persisted VLB TT and VLB TT2 926*b* can denote a second version V2 of a persisted MD VLB, where V2 can denote a more recent version than V1. At a second point in time T2 subsequent to T1, accumulated updates of the VLB TT can be flushed from the TT log 1110 and applied to the most recent persisted version V2 of VLB TT 926*b* to generate VLB TT V3, where VLB TT V3 can then replace the oldest/older persisted version V1 of 926*a*. At a third point in time T3 subsequent to T2, accumulated updates of the VLB TT can again be flushed from the TT log 1110 and applied to the most recent persisted version V3 of VLB TT 926*a* to generate VLB TT V4, where VLB TT V4 can then replace the current oldest/older persisted version V2 of 926*b*. Thus, at each of the foregoing points in time T2 and T3, the most persisted version can serve as a "source" to which flushed VLB TT updates of the TT log are applied to generate a further updated version of the VLB TT that is then stored at a "target" or "destination" physical storage location replacing the oldest/older persisted version of the VLB TT. At consecutive points in time when VLB TT updates are flushed and applied as noted above, the roles of "source" and "target" with respect to the physical storage locations of 926*a-b* can switch.

In at least one embodiment, the elements 902, 904, and 906*a-b* can grow, or generally vary, with the number of pages in 908; and the elements 922, 924 and 926*a*0*b* can grow, or generally vary, with the number of pages in 928.

In at least one embodiment, the MD top, mid, leaf pages 908 and VLB pages 928 can be stored in a single log structure as denoted by the MD log structure 1114 (e.g., the example 1100 of FIG. 10) where metadata can be stored in PLBs by the various metadata types. For example in at least one embodiment, pages of the metadata types top, mid and leaf 908 can be stored in the same PLB but not with VLB pages; and VLB pages 928 can be stored in the same PLB but not with pages of types top, mid and leaf. Such segregation at the PLB level can vary with embodiment based, at least in part, on the types of metadata, associated uses, expected frequency of updates, and the like.

In at least one embodiment, a portion of the MD TT 904 can be statically allocated and reserved for well-known metadata addresses such as reserved MD top pages and reserved UD PLB descriptors. Element 902*a* can denote the logical addresses of the reserved MD top pages that are mapped by corresponding entries 904*a* of the MD TT 904. Element 902*b* can denote the logical addresses of reserved UD PLB descriptors that are mapped by corresponding entries 904*b* of the MD TT 904. In at least one embodiment, each PLB of UD (e.g., such as included in the UD log structure 1108 of FIG. 10) can have an associated PLB descriptor with a corresponding MDAS logical address where the PLB descriptor can be included in the MD tier 920 (e.g., MDPS 912).

It should be noted that the example 900 and related discussion herein generally illustrates an embodiment including two address spaces, the MDAS 902 and the VLBAS 922, along with two types of TTs, the MD TT and the VLB TT. More generally, depending on the types of metadata, an embodiment in accordance with the techniques of the present disclosure can also include one or more additional address spaces and corresponding TTs both associated, respectively, with one or more additional types of metadata that can be included in an embodiment.

Figure 13A:
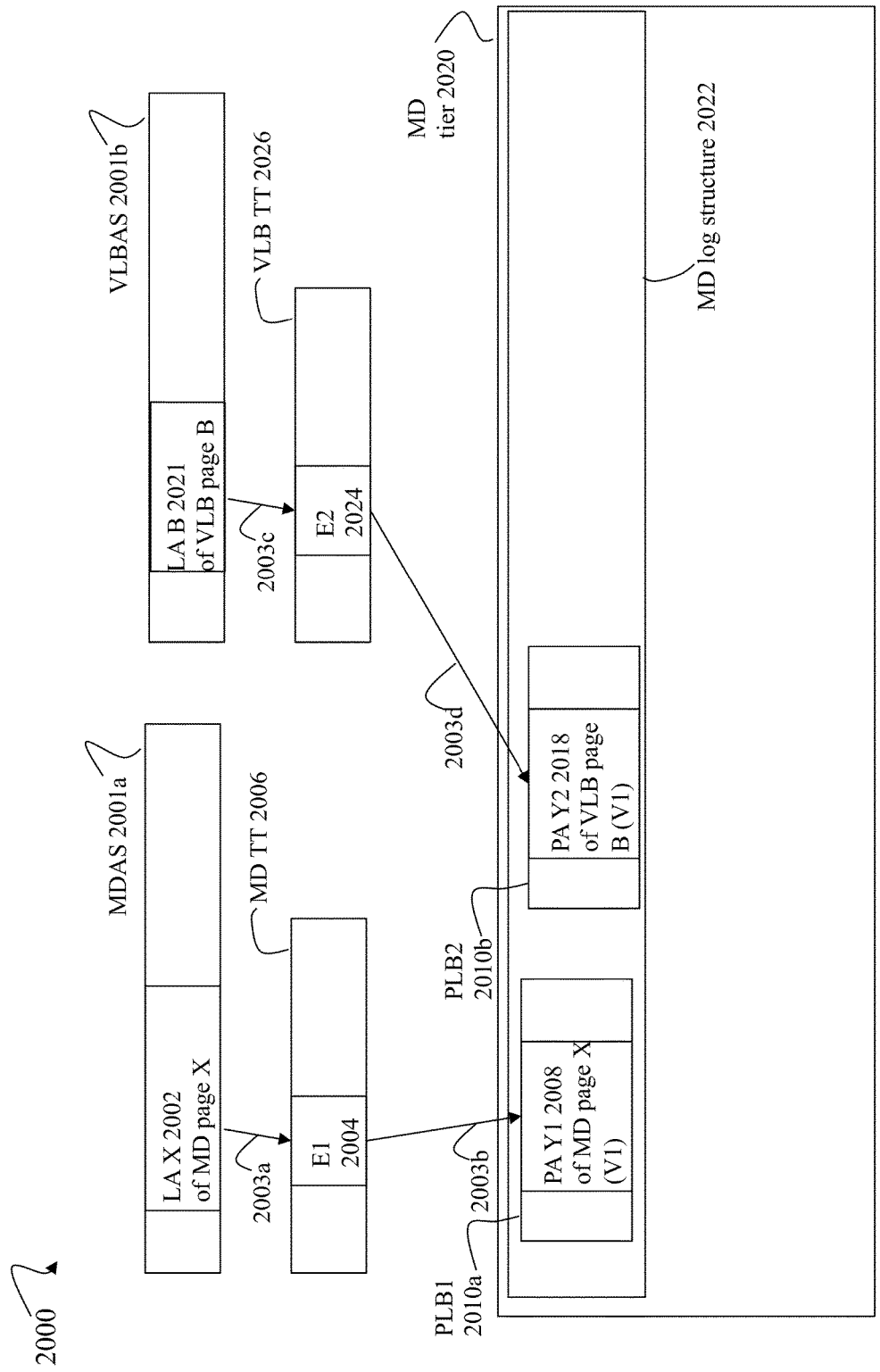
Figure 13B:
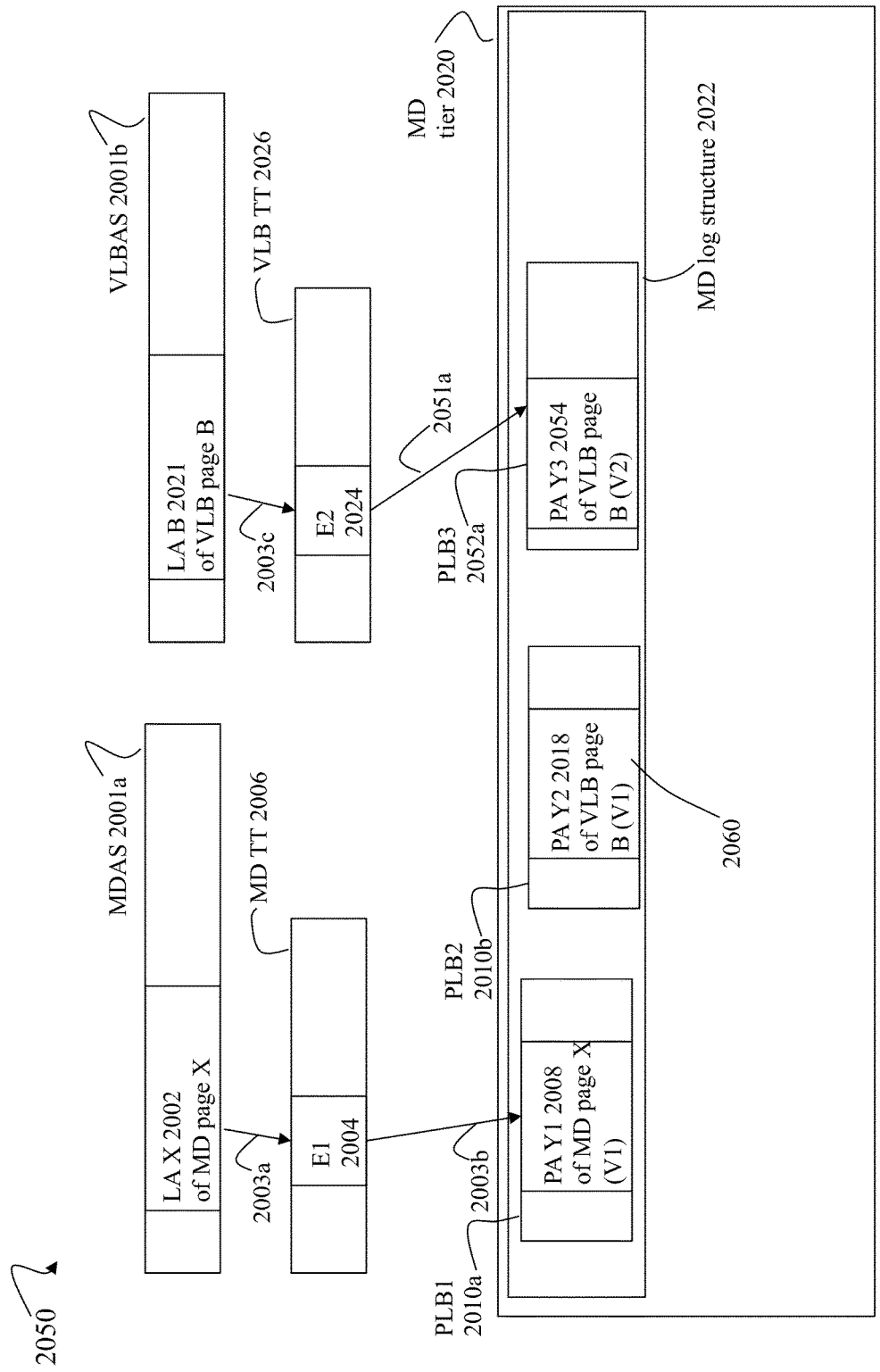

Referring to FIGS. 13A and 13B, shown are examples illustrating in more detail use of the MD TT and VLB TT in at least one embodiment in accordance with the techniques of the present disclosure.

FIG. 13A is an example 2000 that illustrates the state of structures and storage of the system at a first point in time T1; and FIG. 13B is an example 2050 that illustrates the state of the structures and storage of the system at a second point in time T2 subsequent to T1.

With reference to FIG. 13A, the example 2000 includes MDAS 2001*a*, MD TT 2006, VLBAS 2001*b* and VLB TT 2026. Elements 2001*a-b* denote the logical address spaces that are mapped, respectively, by the TTs 2006, 2026, to corresponding physical storage addresses or locations in the MD log structures 2022 of the MD tier 2020.

Consistent with other discussion herein, the TTs 2006, 2026 can be characterized as providing a layer of indirection between logical addresses, respectively, of 2001*a-b* and corresponding physical addresses or locations stored in the MD log structure 2022 of the MD tier 2020.

In the example 2000, the MDAS 2001*a* can include logical address LAX 2002 of MD page X that is mapped (2003*a*) to a corresponding entry E1 2004 of MD TT 2006 that is further mapped (2003*b*) to a corresponding current physical address or location PA Y1 2008 currently storing V1 of MD page X. PA Y1 2008 can be included in PLB 2010*a* of the MD log structure 2022.

In the example 2000, the VLBAS 2001*b* can include logical address LA B 2021 of VLB page B that is mapped (2003*c*) to a corresponding entry E2 2024 of VLB TT 2026 that is further mapped (2003*d*) to a corresponding current physical address or location PA Y2 2018 currently storing V1 of VLB page B. PA Y2 2018 can be included in PLB 2010*b* of the MD log structure 2022.

In at least one embodiment, the VLB TT 2026 can denote the in-memory current version of the VLB TT at time T1 that can represent a combination of the VLB TT updates as currently stored in the TT log and applied to the most recent persisted copy or version of the VLB TT of the MD tier.

At the second point in time T2 subsequent to T1, updates to VLB page B can be flushed from the MD log and applied to the current persistently stored version V1 of VLB page B as stored at PA Y2 2018 of PLB 2 2010*b* to generate an updated version, VLB page B V2. As illustrated in the example 2050 of FIG. 13B, the VLB page B V2 can be stored at a new physical address or location PA Y3 2054 of the PLB3 2052*a* of the MD log structure 2022. Accordingly, the entry E2 2024 of the VLB TT 2026 can be updated to now point or reference (2051*a*) the new physical address or location PA Y3 2054 (rather than point to or reference PA Y2 2018).

Figure 14:
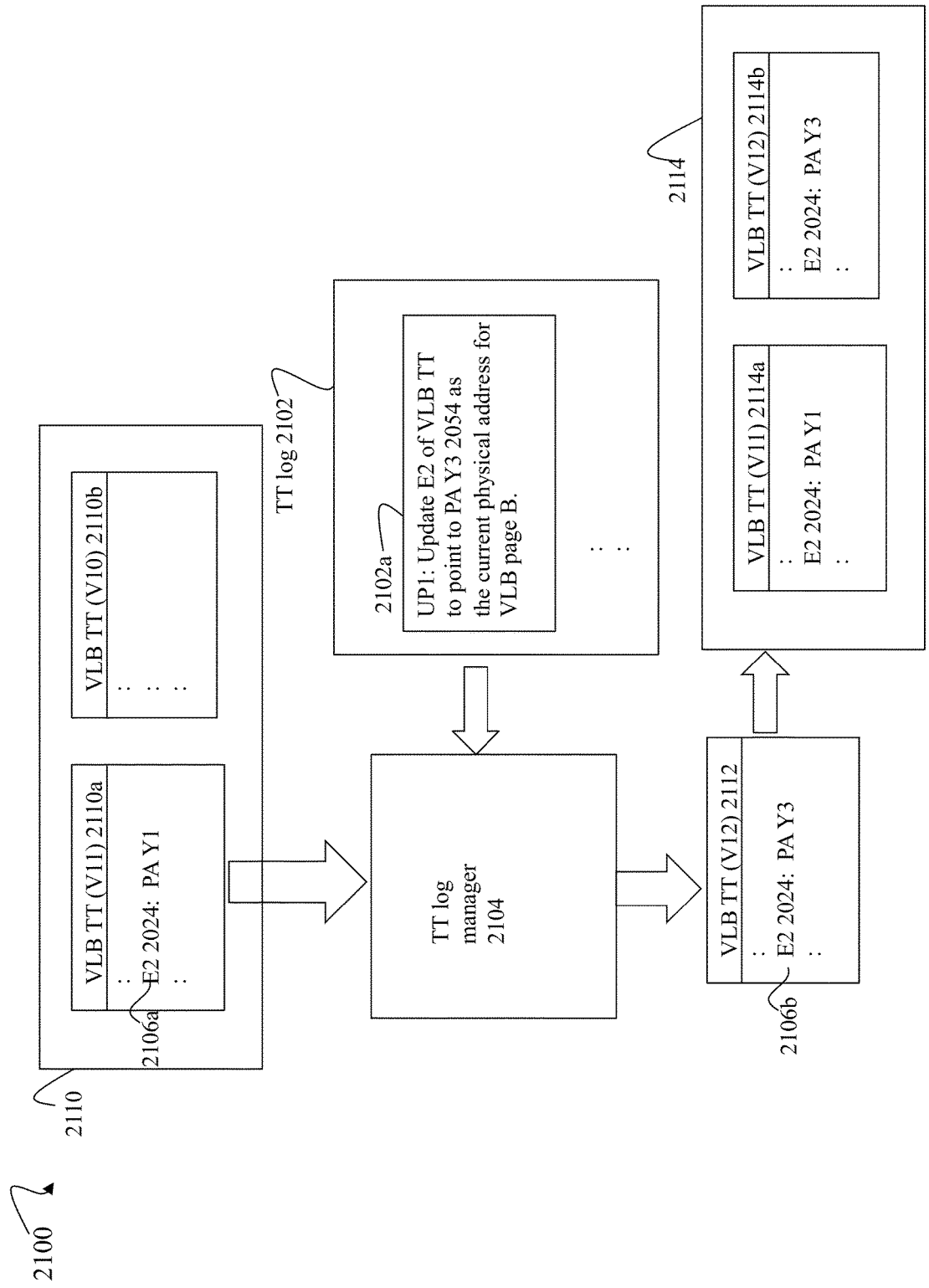

Additionally at the second point in time T2 as illustrated in the example 2100 of FIG. 14, an update UP1 for the entry E2 2024 identifying PA Y3 2054 as the current physical address or location of current VLB page B V2 can be recorded in the TT log. At a later point in time T3 subsequent to T2, UP1 can be flushed from the TT log and applied to the most recent persistent copy of the VLB TT.

To further illustrate the foregoing, reference is made to the example 2100 that includes element 2110 representing the two most recently persistently stored copies 2110*a-b* of the VLB TT. In particular, element 2110*a* denotes the most recent persisted version V11 of the VLB TT and element 2110*b* denotes the older persisted version V10 of the VLB TT. In at least one embodiment, management of the persisted versions of the TTs, including the VLB TT and the MD TT, can be performed by a TT log manager component 2104. At various points in time and responsive to the occurrence of one or more trigger conditions, the TT log manager 2104 can apply updates from the TT log to the most recent persisted copies of the VLB TT and MD TT to generate updated versions of the VLB TT and MD TT, where such updated versions can replace the older/oldest persisted copies of the VLB TT and MD TT. The example 2100 illustrates application of VLB TT updates but similar processing can be performed in connection with application of MD TT updates. The TT log manager 2104 can receive inputs including the most recent persisted version of the VLB TT, VLB TT V11 2110*a*, and updates from the TT log 2102. The updates of the TT log 2102 can include update UP1 2102*a*. In at least one embodiment, the update UP1 2102*a* can be recorded as an entry in the TT log 2102 in a manner similar to that as described herein in connection with the MD log (e.g., as in connection with FIG. 7 elsewhere herein). The TT log manager 2104 can apply the update UP1 2102*a* to the entry E2 2106*a* of the VLB TT (V11) 2110*a* to generate an updated VLB TT (V12) 2112. In this example, V11 of the entry E2 2106*a* of 2110*a* is updated to V12 of the entry E2 2106*b* of 2112. In particular, the VLB TT (V12) 2112 can correspond to the in-memory version of 2026 of the example 2050. The VLB TT (V12) 2112 can be persistently stored and can replace the older/oldest version V10 2110*b*. Element 2114 includes the two most recent versions V11 and V12 2114*a-b* of the VLB TT as persistently stored in the MD tier by the TT log manager.

In the example 2100, 2110 denotes the two persisted versions 2110*a-b* of the VLB TT before the TT log manager applied the above-noted updates and 2114 denotes the two persistent versions 2114*a-b* of the VLB TT after the TT log manager applied the above-noted updates. As can be observed by comparing 2110 with 2114, the oldest version V10 2110*b* of 2110 is replaced with the updated version V12 2114*b*, and element 2110*a* and 2114*a* correspond to the same version V11 of the VLB TT not replaced in connection with applying the updates of the TT log 2102.

Although only a single update is illustrated in connection with the example 2100, more generally, the TT log 2102 can be flushed or destaged where multiple updates of the TT log 2102 can be applied to both the most recently persistent version of the VLB TT and the MD TT.

Consistent with discussion herein in at least one embodiment, element 2112 can denote an updated version of the VLB TT that can correspond to the current in-memory version of the VLB TT, such as can be stored in a volatile memory cache (e.g., TxCache 1106). More generally in at least one embodiment, at any point in time, the current most up to date version of the VLB TT can be constructed by reading the most recent persisted version of the VLB TT from the MD tier and applying the VLB TT updates of the TT log; and the current most up to date version of the MD TT can be constructed by reading the most recent persisted version of the MD TT from the MD tier and applying the MD TT updates of the TT log.

Consistent with discussion above, and with reference back to FIG. 7, in the following paragraphs the non-volatile metadata log 510 or the persisted metadata log or journal may also be referred to as an RDL or raw persisted or non-volatile MD data log; and a single bucket set, such as each of 502 and 504, of the volatile in-memory metadata log, may also be referred to an HBSB (hash-based sorted buckets). Thus, consistent with discussion above such as with reference back to FIG. 7, each node can have an active HBSB, such as bucket set 502, and an inactive or destaging HBSB, such as bucket set 504. A pair of HBSBs including an active bucket set and an inactive or destaging bucket set, may in some contexts also be referred to collectively as the in-memory or volatile memory MD logs or instances. Thus, as shown in FIG. 7, a storage node can write copies of delta updates as tuples to both the active in-memory MD log and also the RDL. The RDL can persistently store the respective tuples, deltas or MD updates in a time order sequence such as from older to newest. In contrast, MD updates, deltas or tuples stored in an in-memory MD log local to a storage node can be organized in a different manner to facilitate efficient and quick retrieval organized in hash buckets as discussed elsewhere herein. Within an HBSB, each hash bucket including MD updates for a single corresponding MD page, the MD updates, deltas or tuples can be organized in a time order sequence based on when the MD updates are received at the storage node.

Figure 15:
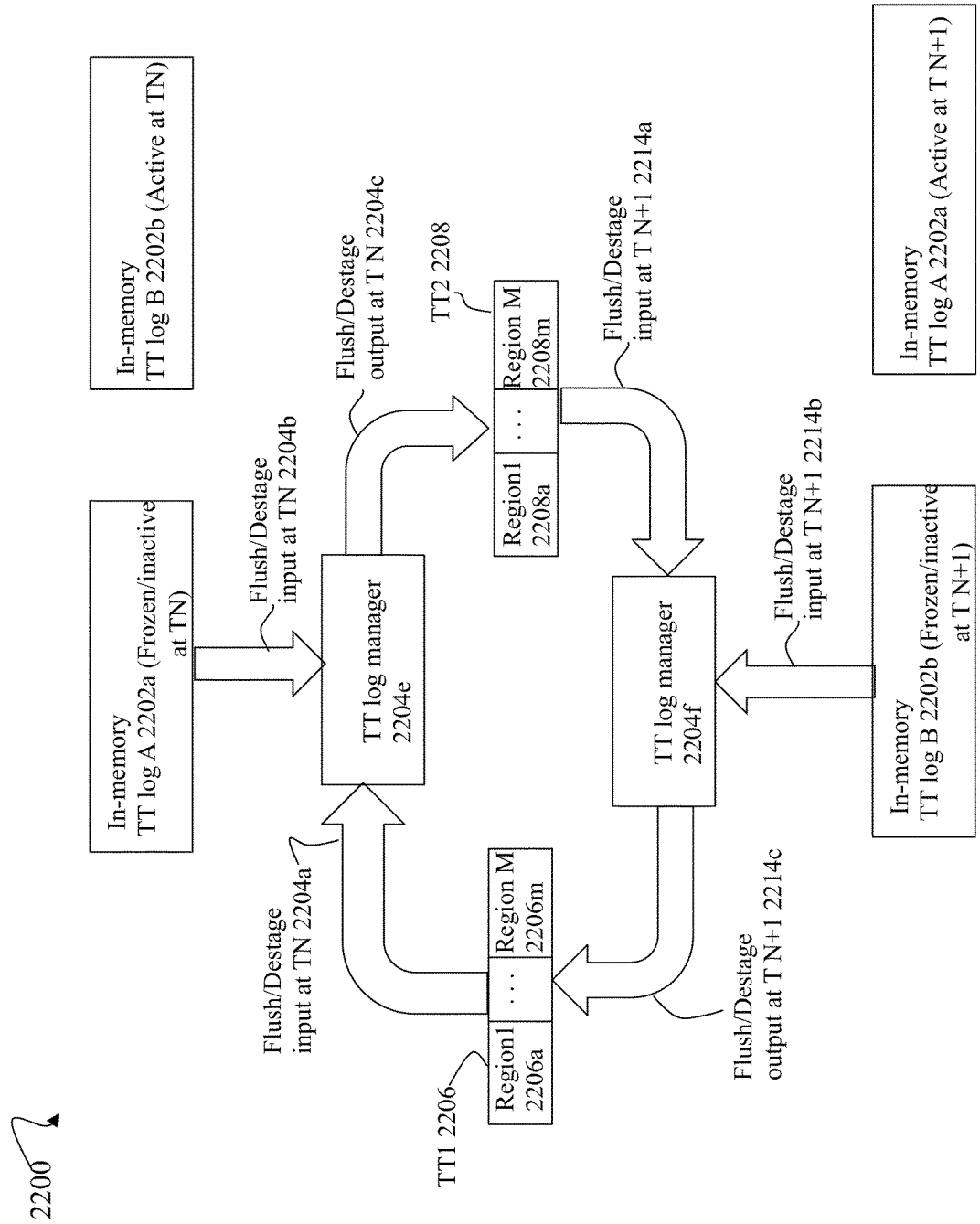

Referring to FIG. 15, shown is an example 2200 illustrating in more detail management, layout and destaging or flushing in connection with TT logs in at least one embodiment in accordance with the techniques of the present disclosure.

In at least one embodiment, TT logs can be stored both in-memory (e.g., in a volatile memory cache such as in the form of HBSBs) and on persistent non-volatile storage (e.g., NVRAM such as an RDL). In at least one embodiment, two instances of the in-memory TT log (e.g., active and frozen or inactive HBSBs) can be used in a manner similar to that as described elsewhere in connection with the MD log such as, for example, in connection with FIG. 7. The TTs 2206, 2208 in the example 2200 can generally denote the persisted two TTs that can refer to two versions of VLB TTs or two versions of MD TTs.

The example 2200 includes in-memory TT logs 2202*a-b* that can be used in connection with destaging or flushing. At any point in time, a first of the TT logs 2202*a-b* can be frozen or inactive and the other remaining one can be active, where entries of the frozen TT log instance can be in the process of being flushed or destaged and where TT updates are recorded in the active TT log instance (but not the frozen instance).

The example 2200 also includes two persisted instances of two versions of the TT 2206, 2208. At a point in time N when the TT log 2202*a* is flushed or destaged, TT1 2206 can denote the most recent persisted version with respect to 2206 and 2208, and TT2 2208 can denote the oldest persisted version with respect to 2206 and 2208.

In the example 2200, TT log manager 2204e and TT log manager 2204f can both denote the same instance of the TT log manager but at two different respective points in time, N and N+1, discussed below. In particular, TT log manager 2204e can denote the TT log manager described below in connection with processing performed when flushing the currently active instances of TT logs 2202a at time N; and TT log manager 2204f can denote the TT log manager described below in connection with processing performed when flushing the current active instance of TT log 2202b at time N+1.

At the point in time N, the TT log manager 2204e can receive as a first input 2204a the current most recent persisted version TT1 2206 and as a second input 2204b updates as stored in the frozen TT log A 2202a. As an output 2204c at time N, the TT log manager 2204e can generate an updated version of the TT that is stored at the target location 2208. At time N, TT updates can be recorded in the active TT log B 2202b while the frozen TT log A 2202a is being flushed or destaged. In at least one embodiment, the TT log manager 2204e can process TT updates recorded in frozen TT log A 2202a in a sequential consecutive region by region basis. In at least one embodiment, the TT1 2206 can be partitioned into logically sequentially consecutively stored regions 1-M. Each of the foregoing M regions of 2206 can include a particular sequential consecutively stored portion of mapping entries used for mapping corresponding metadata pages. During flushing or destaging of the frozen TT log A 2202a at time N in at least one embodiment, the TT log manager 2204e can process updates of the TT log 2202a related to mapping entries of region 1 by reading the current persistently stored version of region 1 2206a, applying the relevant updates of the frozen TT log A 2202a to mapping entries of region 1 2206a to generate an updated version of region 1, and then outputting or writing the updated version of region 1 to a corresponding target location 2208a. In a similar manner, subsequently sequential regions of 2206 can be processed consecutively in accordance with their logically consecutive ordering within TT 2206. In at least one embodiment, the updated regions 1-M can be written out in sequential consecutive logical order to their respective corresponding target regions 2208a-M.

At a point in time N+1 subsequent to time N, the roles of the in-memory TT logs 2202a-b can be switched where the in-memory TT log A 2202a transitions from frozen to active; and the in-memory TT log B 2202b transitions from active to frozen or inactive.

In at least one embodiment, such switching of roles between active and frozen or inactive can occur in response to any one of a defined number of trigger conditions that can include a time-based trigger and/or a fullness trigger. For example in at least one embodiment, transitioning a TT log from the active to frozen state can occur when the active TT log reaches a specified threshold level of fullness such as when the active TT log includes a threshold number of entries or updates. In at least one embodiment, transitioning a TT log from active to frozen can occur after a maximum amount of time has elapsed since the particular TT log instance has been active. Put another way, the foregoing maximum amount of time can be a time-based trigger ensuring that each active TT log does not accumulate updates for more than the maximum amount of time without being flushed or destaged.

More generally, in at least one embodiment, any log discussed herein (e.g., MD log, TT log, and/or NBT (new boot tier) log discussed elsewhere herein) can use any suitable ones of time-based triggers, fullness-based triggers and/or a threshold number of logged updates/changes to trigger flushing a particular log.

In the example 2200 at the time N+1, the in-memory TT log B 2202b is now the frozen or inactive instance being flushed, and the in-memory TT log A 2202a is now the active instance to which TT updates are recorded. At time N+1, the TT version stored in 2208 is now considered the most recent persisted TT version with respect to 2206 and 2208; and the TT version stored in 2206 is now considered the older/oldest TT version with respect to 2206 and 2208.

At the time N+1, the TT log manager 2204f can receive as a first input 2214a the current most recent persisted version TT2 2208 and as a second input 2214b updates as stored in the frozen TT log B 2202b. As an output 2214c at time N+1, the TT log manager 2204f can generate an updated version of the TT that is stored at the target location 2206 thereby replacing the current oldest/older persisted TT version 2206. At time N+1, TT updates can be recorded in the active TT log A 2202a while the frozen TT log B 2202b is being flushed or destaged. In at least one embodiment, the TT log manager 2204f can process TT updates recorded in frozen TT log B 2202b in a sequential consecutive region by region basis as discussed above in connection with time N with respect to 2206.

In at least one embodiment, the TT 2208 can be partitioned into logically sequentially consecutively stored regions 1-M. Each of the foregoing M regions of 2208 can include a particular sequential consecutively stored portion of mapping entries used for mapping corresponding metadata pages. During flushing or destaging of the frozen TT log B 2202b at time N+1 in at least one embodiment, the TT log manager 2204f can process updates of the TT log 2202b related to mapping entries of region 1 by reading the current persistently stored version of region 1 2208a, applying the relevant updates of the frozen TT log B 2202b to mapping entries of region 1 2208a to generate an updated version of region 1, and then outputting or writing the updated version of region 1 to a corresponding target location 2206a. In a similar manner, subsequently sequential regions of 2208 can be processed consecutively in accordance with their logically consecutive ordering within TT 2208.

In at least one embodiment, the updated regions 1-M can be written out in sequential consecutive logical order to their respective corresponding target regions 2206a-M.

In at least one embodiment, when an updated version of a TT replaces the older/oldest persisted version of the TT in the MD tier, storage currently allocated for the replaced older/oldest persisted version of the TT can be unmapped and thus deallocated. When storing the updated version of the TT in at least one embodiment, storage can be allocated and mapped. In this manner in at least one embodiment, the updated version of the TT may not overwrite the same physical storage location of the replaced older/oldest version of the TT to thereby avoid continuously overwriting the same underlying physical storage.

In at least one embodiment consistent with other discussion herein, the VLB TT and the MD TT can each be managed and maintained separately or in the aggregate. The example 2200 generally refers to generic instances of TTs. However in at least one embodiment, the processing and components described in the example 2200 can be performed separately for the VLB TT and MD TT where, for example, the processing of the example 2220 can be performed with respect to the VLB TT (e.g., where each reference to TT can refer to VLB TT) and can also be independently performed with respect to the MD TT (e.g., where each reference to TT can refer to MD TT). As a variation in at least one embodiment, the VLB TT and MD TT can be managed and maintained in the aggregate where the example 2200 processing can be performed with respect to the VLB TT and the MD TT maintained and managed as a single TT.

Figure 16A:
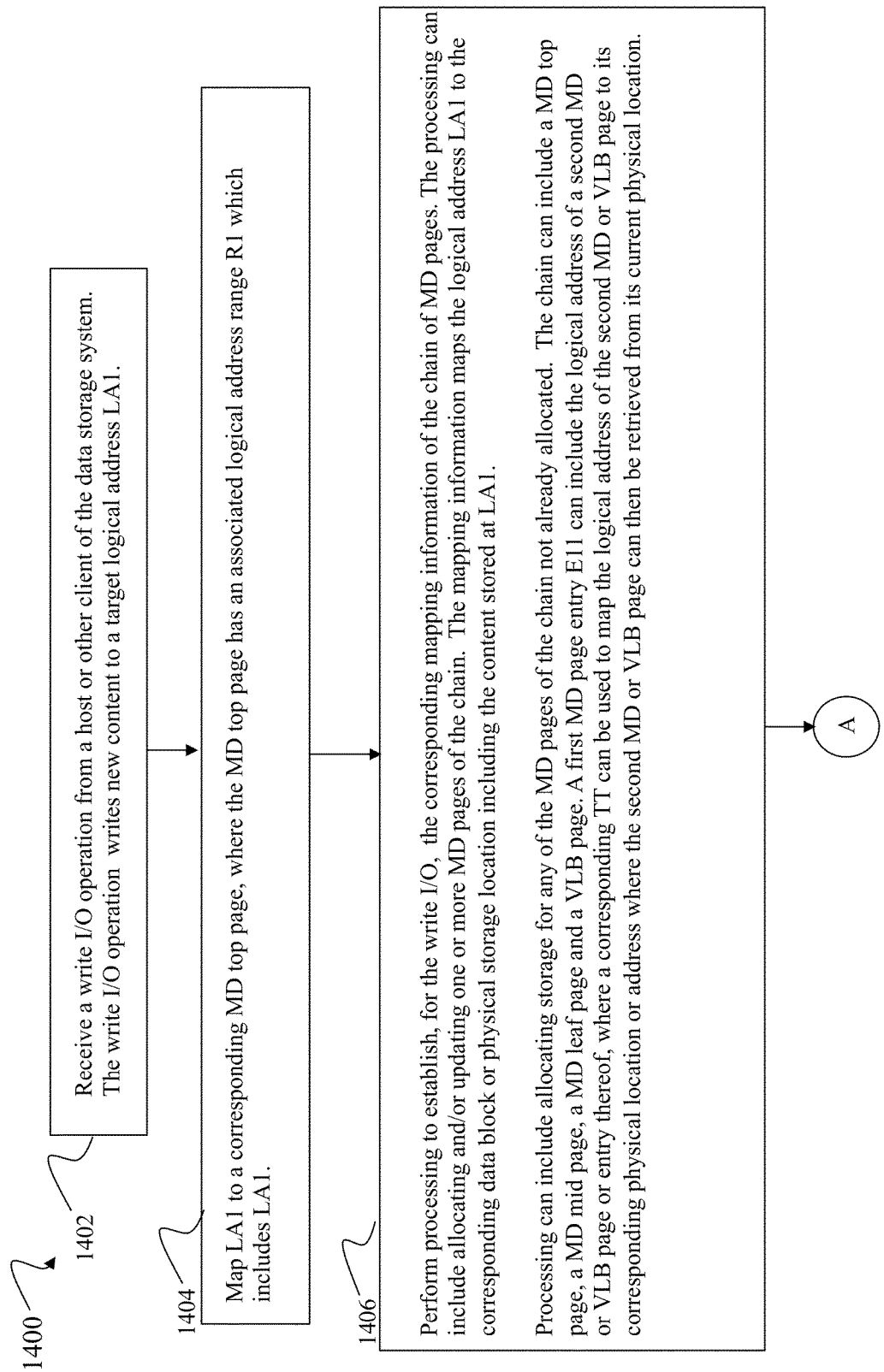
FIGS. 16A-16B are flowcharts of processing steps that can be performed in at least one embodiment in accordance with the techniques of the present disclosure.
Figure 16B:
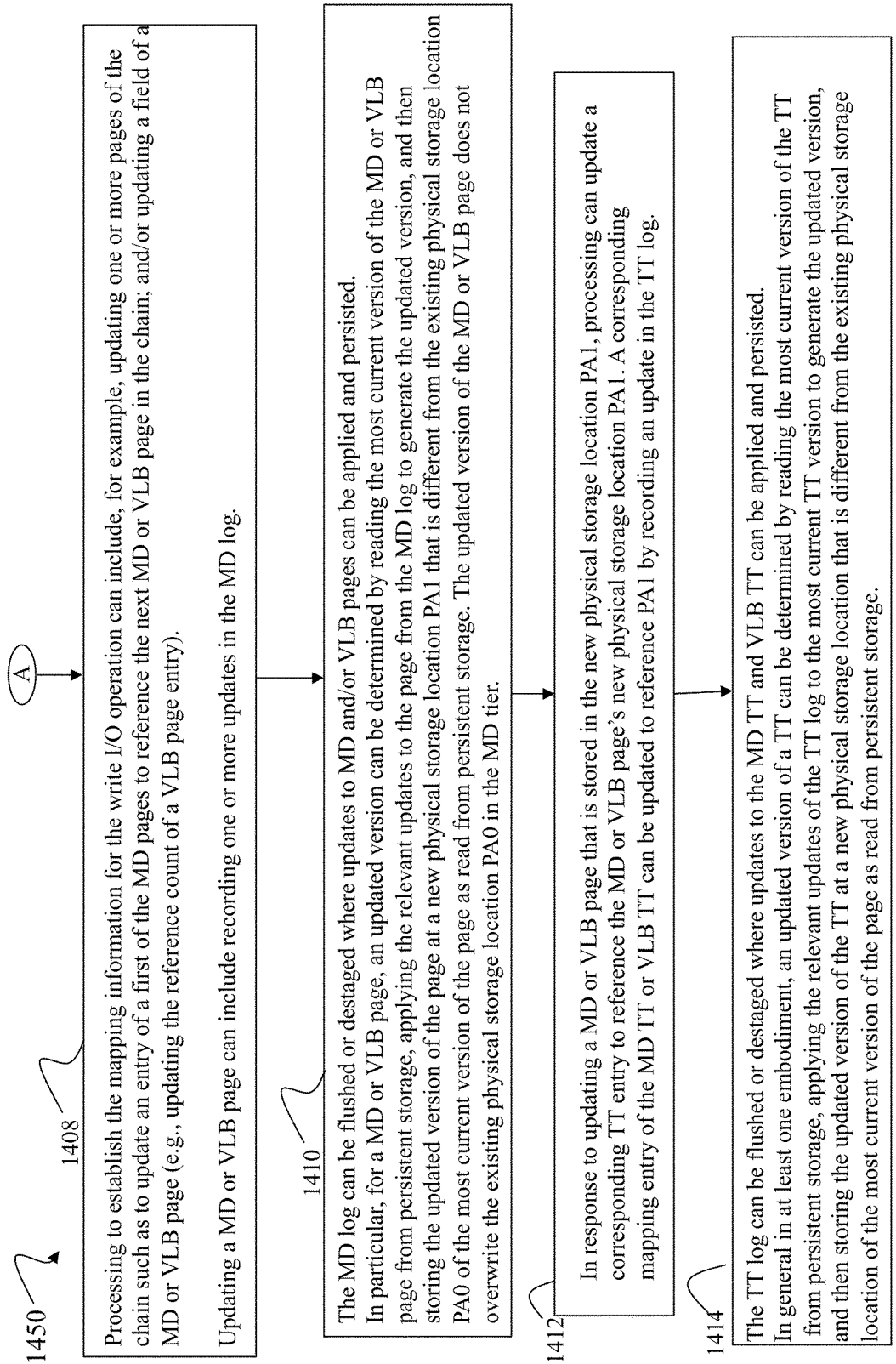

Referring to FIGS. 16A and 16B, shown is a flowchart 1400, 1450 of processing steps that can be performed in at least one embodiment in accordance with the techniques of the present disclosure. The steps of the flowchart 1400, 1450 summarize processing described above.

At the step 1402, a write I/O operation can be received from a host or other client of the data storage system. The write I/O operation can write new content to a target logical address LA1. From the step 1402, control proceeds to the step 1404.

At the step 1404, processing map LA1 to a corresponding MD top page, where the MD top page has an associated logical address range R1 which includes LA1. From the step 1404, control proceeds to the step 1406.

At the step 1406, processing can be performed to establish, for the write I/O, the corresponding mapping information of the chain of MD pages. The processing can include allocating and/or updating one or more MD pages of the chain. The mapping information maps the logical address LA1 to the corresponding data block or physical storage location including the content stored at LA1.

In the step 1406, processing can include allocating storage for any of the MD pages of the chain not already allocated. The chain can include a MD top page, a MD mid page, a MD leaf page and a VLB page. A first MD page entry E11 can include the logical address of a second MD or VLB page or entry thereof, where a corresponding TT can be used to map the logical address of the second MD or VLB page to its corresponding physical location or address, and where the second MD or VLB page can then be retrieved from its current physical location. From the step 1406, processing can proceed to the step 1408.

At the step 1408, processing to establish the mapping information for the write I/O operation can include, for example, updating one or more pages of the chain such as to update an entry of a first of the MD pages to reference the next MD or VLB page in the chain; and/or updating a field of a MD or VLB page (e.g., updating the reference count of a VLB page entry). Updating a MD or VLB page can include recording one or more updates in the MD log. From the step 1408, control proceeds to the step 1410.

At the step 1410, the MD log can be flushed or destaged where updates to MD and/or VLB pages can be applied and persisted. In particular, for a MD or VLB page, an updated version can be determined by reading the most current version of the MD or VLB page from persistent storage, applying the relevant updates to the page from the MD log to generate the updated version, and then storing the updated version of the page at a new physical storage location PA1 that is different from the existing physical storage location PA0 of the most current version of the page as read from persistent storage. The updated version of the MD or VLB page does not overwrite the existing physical storage location PA0 in the MD tier. From the step 1410, control proceeds to the step 1412.

At the step 1412, in response to updating a MD or VLB page that is stored in the new physical storage location PA1, processing can update a corresponding TT entry to reference the MD or VLB page's new physical storage location PA1. A mapping entry of the MD TT or VLB TT can be updated to reference PA1 by recording a corresponding update in the TT log. From the step 1412, control proceeds to the step 1414.

At the step 1414, the TT log can be flushed or destaged where updates to the MD TT and VLB TT can be applied and persisted. In general in at least one embodiment, an updated version of a TT can be determined by reading the most current version of the TT from persistent storage, applying the relevant updates of the TT log to the most current TT version to generate the updated version, and then storing the updated version of the TT at a new physical storage location that is different from the existing physical storage location of the most current version of the page as read from persistent storage.

With reference back to FIGS. 10 and 12 in at least one embodiment, each PLB of UD stored in the UD log structure 1108 can have an associated PLB descriptor that generally describes that particular PLB. The PLB descriptor describing a UD PLB can sometimes be referred to as a UD PLB descriptor. In at least one embodiment, PLB descriptors such as UD PLB descriptors can be characterized as another type of metadata. In at least one embodiment, the UD PLB descriptors can be stored in the MD tier and can have corresponding logical addresses in the MDAS 902. In such an embodiment, changes or updates to UD PLB descriptors can be recorded as entries in the MD log. The UD PLB descriptor updates of the MD log can be flushed or destaged in a manner similar to other recorded MD updates of the MD log. In at least one embodiment, pages of UD PLB descriptors can be stored in the MD tier 920 where such pages can be mapped and translated by corresponding mapping entries of the MD TT 904 to their current corresponding physical storage locations in the MD tier. As with other pages of metadata stored in the MD tier, the pages of UD PLB descriptors can be stored in the MD log structure (e.g., stored in a log-structure manner) such that updates to a UD PLB descriptor can be recorded in the MD log and when flushed, result in an updated UD PLB descriptor written to a new physical location in the MD log structure of the MD tier rather than perform in-place updates.

In at least one embodiment in accordance with the techniques of the present disclosure, each PLB stored in the MD tier can generally be referred to as a MD PLB (e.g., thus different types of metadata such as pages of top, mid and leaf MD pages as well as VLB pages and TTs can be stored in MD PLBs). Each MD PLB of the MD tier can have a corresponding PLB descriptor that can be referred to herein as a MD PLB descriptor. Each PLB descriptor associated with a corresponding PLB can generally describe the corresponding PLB. For example, a PLB descriptor can include information describing the content or data stored in the PLB (e.g., locations and sizes of the various stored content stored in the PLB), indicate when the PLB was most recently updated, include a physical address or location of storage mapped to the PLB, track a reference count of the total number of pages stored in the PLB, and the like.

In at least one embodiment in accordance with the techniques of the present disclosure, it can be desirable and advantageous to store and manage the MD PLB descriptors in accordance with techniques of a LSS. In at least one embodiment, the MD PLB descriptors themselves cannot be included in the MD tier, and changes or updates to such MD PLB descriptors cannot be made using the MD log as used with recording changes to the content stored in PLBs of the MD tier. Put another way, the MD PLB descriptors in at least one embodiment are located external to the MD tier and can have their updates recorded in a different log than the MD log of updates for the MD tier. In at least one embodiment, MD PLB descriptors can be stored in a new boot tier (NBT) with its own associated NBT log, where the NBT tier and NBT log can be separate from, respectively, the MD tier and the MD log.

Figure 17:
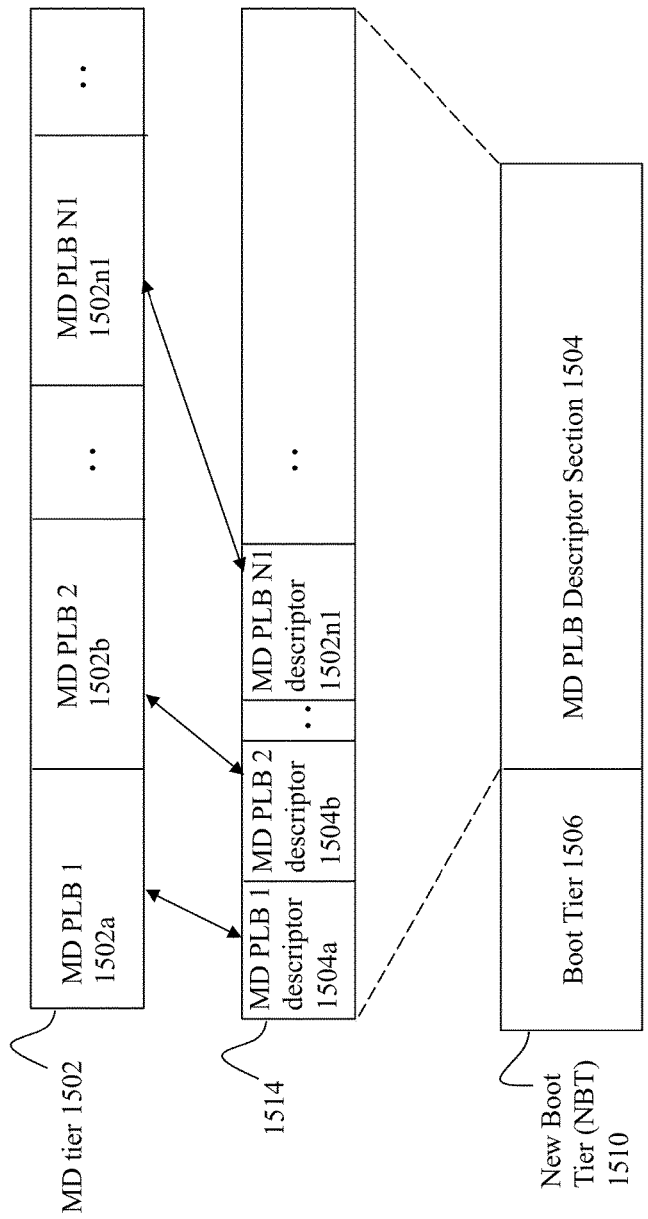

Referring to FIG. 17, shown is an example 1500 illustrating MD PLB descriptors, associated MD PLBs of the MD tier, and the NBT in at least one embodiment in accordance with the techniques of the present disclosure.

The example 1500 includes the MD tier 1502 with MD PLBs 1502a, 1502b, . . . , 1502N1, and so on. Each of the MD PLBs of 1502 can have an associated MD PLB descriptor included in a MD PLB descriptor section 1504. In at least one embodiment, the NBT 1510 of storage can be defined that includes a boot tier 1506 and the MD PLB descriptor section 1504. Element 1514 provides further details regarding the MD PLB descriptor section 1504 that includes MD PLB descriptors 1504a, 1504b, . . . 1504N1, and so on, corresponding respectively to MD PLBs 1502a, 1502b, . . . , 1502N1, and so on, of the MD tier 1502.

The NBT 1510 can be used to manage feature related boot strapping data as well as management of the MD PLB descriptors associated with MD PLBs of the MD tier. The boot tier 1506 can generally include information needed in connection with typical booting and rebooting of the system. For example, the boot tier 1506 can include fixed or well known addresses or locations denoting the starting address from where the boot process loads instructions and/or data to boot the system. The boot tier 1506 can include, for example, a copy of the operating system or otherwise a location of where the operating system can be loaded from at boot time. In at least one embodiment, the boot tier 1506 can identify locations where the TTs and metadata pages of various types are located. For example with reference to FIG. 12, the boot tier 1506 can identify locations of the TTs 906a-b, 926a-b, the MD top, mid and leaf pages 908, and the VLB pages 928 within the MD tier.

In at least one embodiment, the boot tier 1506 and the MD PLB descriptor section 1504 can share their own instance of a log referred to herein as the NBT log used to manage changes to content stored storage areas 1504 and 1506.

In at least one embodiment, the boot tier 1506 can be a fixed size section of storage for boot tier information. For example, space can be allocated for a super block at the start of the boot tier 1506. Afterwards, pages of a specified size, such as 4 KB pages, can be reserved from the boot tier 1506 for features (e.g., services, layered products) to register, where such features can utilize the storage of the pages of the boot tier 1506 as may be needed. In at least one embodiment, the pages of the boot tier can be expected to have relatively few or a small number of changes infrequently.

In at least one embodiment, changes to the boot tier 1506 can be handled using bulk write operations and a staging area described in more detail below.

In at least one embodiment, the MD PLB descriptor section 1504 can increase in size as needed as the size of the MD tier 1502 increases. Thus in at least one embodiment, the section 1506 can be a fixed predefined size that does not change over the lifetime of the system, and the section 1504 can be a variable size section. The size of section 1504 can increase as the number of MD PLBs of the MD tier increases. The size of 1504 can increase over time to store that additional MD PLB descriptors needed to describe MD PLBs added to the MD tier.

As illustrated in the example 1500, there can be a direct physical mapping between the MD PLB descriptors of the MD PLB descriptor section 1504 and the MD PLBs of the MD tier 1502. In at least one embodiment, storage can be allocated as additional storage that is mapped into the MD tier 1502. In at least one embodiment, as storage is removed and replaced in the MD tier, the replacement storage can occupy the same mapping as the original storage.

In at least one embodiment, descriptors of the section 1504 can also be stored in storage units corresponding to PLBs. Thus the PLB can also be the atomic unit of storage or granularity when writing content to the NBT 1510.

In at least one embodiment, storage for the NBT can be RAID-5 or RAID-6 configured storage.

Generally in at least one embodiment and consistent with other discussion herein, performing an update to a MD page stored in a MD PLB of the MD tier can result in a cascade of subsequent events initially summarized below and then followed by more detail in subsequent paragraphs. Updates can be recorded in the MD log. The MD log can be subsequently flushed or destaged resulting in updates recorded in the TT log and NBT log. When the TT log is flushed or destaged, further updates can be recorded in the NBT log. The NBT log can be flushed or destaged to apply updates to PLBs of the NBT tier. When the NBT log is flushed or destaged, no further updates are generated or recorded to thus end the cascade of recording changes in logs and flushing such logs in at least one embodiment.

In further detail in at least one embodiment, if there is an update U1 to a page P1 stored in a first MD PLB1 (e.g., PLB of the MD tier), U1 can be recorded in the MD log. Subsequently, the MD log can be flushed where U1 is applied to an existing version of P1 to generate an updated version of P1, and the updated version of P1 can be written to a new physical storage location in a new second MD PLB2 that is different from the first MD PLB1. As a result of flushing the MD log and storing the new updated version of P1 in the second MD PLB2, the corresponding MD PLB descriptor, DESC2, for MD PLB2 can also be accordingly updated. In at least one embodiment, update(s) to DESC2 can include updating information of DESC2 to: identify a particular location of MD PLB2 where the updated version of P1 is stored; identify a size of the updated version of P1 stored in MD PLB2; identify a date/time when the updated version of P1 is stored in MD PLB2; and increment a reference count tracking the total number of MD pages stored in MD PLB2. In at least one embodiment, the foregoing reference count can be used to track per PLB utilization or consumption of PLB storage for storing valid current content.

In at least one embodiment, each MD PLB descriptor describing a corresponding MD PLB can also include size information regarding the amount of storage of the MD PLB consumed for each page of content stored in the MD PLB. In at least one embodiment supporting compression at a per page level of granularity, such size information for each page stored in the MD PLB can vary and can denote the size of the compressed page stored in the MD PLB. For example, in at least one embodiment, pages of MD can be uniform in size and can be 4K bytes in uncompressed original form. Each of the foregoing pages of MD stored in a MD PLB can be stored in a compressed form where each individual 4K page is compressed and then stored in its corresponding compressed form. The size information of the MD PLB descriptor can include a size of each compressed page stored in the MD PLB. Thus, for example, as pages of content are added to MD PLB, its corresponding MD PLB descriptor's size information can be updated to reflect the size of compressed added pages stored in the MD PLB.

As a result of flushing the MD log and storing the new updated version of P1 in the second MD PLB2, a mapping entry E1 of a TT used to map P1 can be updated by an update U2 to now reference the new physical storage location of the updated version of P1. The update U2 to E1 of the TT (where TT can be either the VLB TT or MD TT depending on the type of MD of P1) can be recorded in the TT log. At a later point in time, the TT log can be flushed resulting in applying U2 to the TT where an updated version of the TT can be stored in a new MD PLB3 of the MD tier and where MD PLB3's corresponding MD PLB descriptor, DESC3, can also be accordingly updated.

As a result of updating E1 of TT such as when recording U2 in the TT log, the MD PLB descriptor DESC1 that is associated with MD PLB1 (storing the prior version of P1 before updating) can be updated to indicate that storage of MD PLB1 is no longer used for storing P1. For example in at least one embodiment, DESC1 can include a reference count that is decremented by 1. The foregoing reference count can track the number of current pages stored in MD PLB1. The reference count can be used, for example, for tracking utilization of portions of MD PLB1 that are consumed storing valid current content.

In at least one embodiment in accordance with the techniques of the present disclosure, updates to pages of MD PLBs can include updates to top, mid and leaf MD pages; updates to VLB pages; updates to the VLB TT; and/or updates to the MD TT. The foregoing updates to pages of the MD PLBs can be recorded in the MD log. Subsequently flushing the MD log results in applying updates to a first set of MD pages that are rewritten to new MD PLBs of the MD tier. Additionally, responsive to rewriting the first set of MD pages to the new MD PLBs of the MD tier, corresponding MD PLB descriptors of the new MD PLBs can also be accordingly updated. Additionally, rewriting the first set of MD pages to the new PLBs of the MD tier can also result in updates to mapping entries of a TT, where such TT updates can be recorded in a TT log. Subsequently, the TT log is flushed with TT updates applied to generate an updated version of the TT stored in a new MD PLB of the MD tier and also resulting in updating a corresponding MD PLB descriptor for the new PLB now storing the updated TT.

In at least one embodiment, updates to MD PLB descriptors can be recorded as entries in the NBT log. In at least one embodiment, as a result of storing updated MD pages and updated TTs in new MD PLBs of the MD tier, MD PLB descriptors that correspond to the new MD PLBs are also accordingly updated. Additionally, other MD PLB descriptors are also accordingly updated, where the other MD PLB descriptors correspond to old MD PLBs storing the prior version of the MD pages before updating. Such other MD PLB descriptors that use a reference count to track the total number of MD pages stored therein can be updated, for example, to decrement the total number of MD pages. In at least one embodiment, the foregoing decrement can be performed as a result of updating an entry of a TT for a MD page to reference a new physical storage address or location of an updated MD page rather than the prior physical storage address or location of a prior version of the MD page.

In at least one embodiment, the NBT log can be generally flushed or destaged in a manner similar to that as described herein, for example, with the TT log. Flushing or destaging the NBT log can include applying updates to MD PLB descriptors and writing the updated MD PLB descriptors to new physical storage locations. Each updated version of a MD PLB descriptor can be determined by applying relevant updates of the NBT log to a most recent persisted version of the MD PLB descriptor. The updated version of the MD PLB descriptor can be written to a new physical storage location or address (e.g., new PLB) of the section 1504 of the NBT 1510 in a log-based manner. Thus the new physical storage location can be different from the existing physical storage location of the most recent persisted version of the MD PLB descriptor in the section 1504. Additionally in at least one embodiment, the updated version of the MD PLB descriptor can be written out in logically sequential and consecutive regions in a manner similar to that as described in connection with the TT logs.

The foregoing description regarding a cascading of events resulting from flushing or destaging the MD log, along with other items, in at least one embodiment is further described in more detail in the following paragraphs.

In at least one embodiment, both an in-memory (e.g., volatile or cache memory) instance and a non-volatile persisted instance of the NBT log can be managed, maintained and used in connection with the techniques of the present disclosure. In at least one embodiment, the non-volatile NBT log can be an RDL as discussed elsewhere herein in a manner similar to the non-volatile persisted instance of the MD log and TT log. As with other logs discussed herein, the changes tracked in the RDL instances of the NBT log can be used primarily for recovery purposes and can mirror the changes or updates tracked in the in-memory instance of the NBT log. In at least one embodiment, the in-memory or volatile instance of the NBT log can track recorded updates in an in-memory table discussed in more detail below.

Figure 18A:
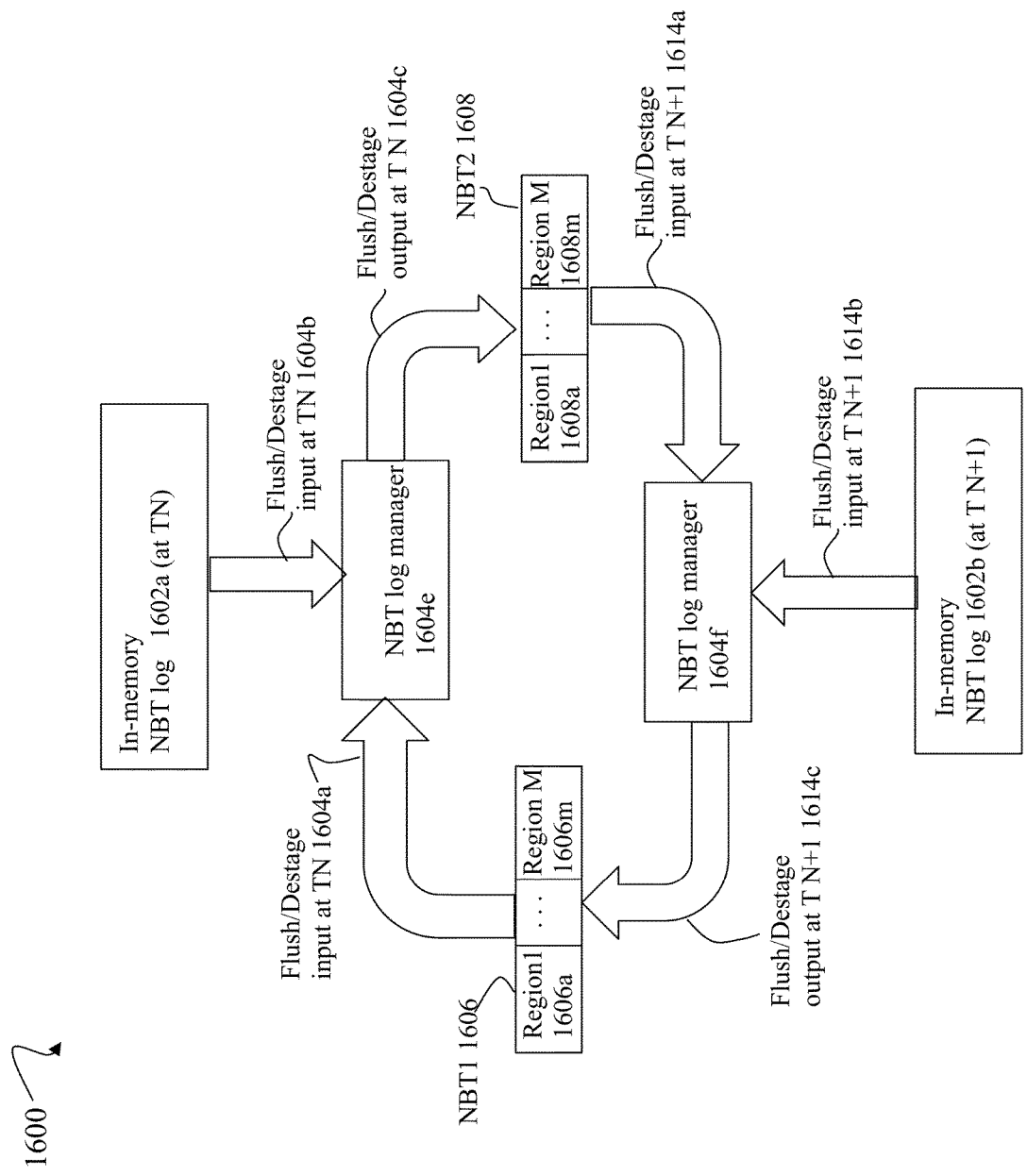

Referring to FIG. 18A, shown is an example 1600 illustrating in more detail management, layout and destaging or flushing in connection with the NBT log in at least one embodiment in accordance with the techniques of the present disclosure.

In at least one embodiment as noted above, corresponding instances of the NBT log can be stored both in-memory (e.g., in a volatile memory) and on persistent non-volatile storage (e.g., NVRAM such as an RDL). The NBTs 1606, 1608 in the example 2200 can generally denote two persisted consecutive versions of the complete NBT 1510.

The example 1600 also includes two persisted instances of two versions of the NBT 1606, 1608. At a point in time N, NBT1 1606 can denote the most recent persisted version with respect to 1606 and 1608, and NBT2 2208 can denote the oldest persisted version with respect to 1606 and 1608.

In the example 1600, NBT log manager 1604e and NBT log manager 1604f can both denote the same instance of the NBT log manager but at two different respective points in time, N and N+1, discussed below. In particular, NBT log manager 1604e can denote the NBT log manager described below in connection with processing performed when flushing the NBT log 1602a at time N; and NBT log manager 1604f can denote the NBT log manager described below in connection with processing performed when flushing the NBT log 1602b at time N+1.

At the point in time N, the NBT log manager 1604e can receive as a first input 1604a the current most recent persisted version NBT1 1606 and as a second input 1604b updates as stored in the NBT log 1602a. Generally, NBT log 1602a can denote the current in-memory NBT log at the point in time N, and NBT log 1602b discussed below can denote the current in-memory NBT log as the next subsequent point in time N+1 when the NBT log is flushed or destaged. As an output 1604c at time N, the NBT log manager 1604e can generate an updated version of the NBT that is stored at the target location 1608. In at least one embodiment, the NBT log manager 1604e can process NBT updates recorded in NBT log 1602a in a sequential consecutive region by region basis. In at least one embodiment, the NBT1 1606 can be partitioned into logically sequentially consecutively stored regions 1-M. Each of the foregoing M regions of 1606 can include a particular sequential consecutively stored portion of mapping entries used for mapping corresponding metadata pages. During flushing or destaging of the NBT log 1602a at time N in at least one embodiment, the NBT log manager 1604e can process updates of the NBT log 1602a related to mapping entries of region 1 1606a by reading the current persistently stored version of region 1 1606a, applying the relevant updates of the NBT log 1602a to mapping entries of region 1 1606a to generate an updated version of region 1, and then outputting or writing the updated version of region 1 to a corresponding target location 1608a. In a similar manner, subsequently sequential regions of 1606 can be processed consecutively in accordance with their logically consecutive ordering within 1606. In at least one embodiment, the updated regions 1-M can be written out in sequential consecutive logical order to their respective corresponding target regions 1608a-M.

In the example 1600 at the time N+1, the in-memory NBT log 1602b is flushed. At time N+1, the NBT version stored in 1608 is now considered the most recent persisted NBT version with respect to 1606 and 1608; and the NBT version stored in 1606 is now considered the older/oldest version with respect to 1606 and 1608.

At the time N+1, the NBT log manager 1604f can receive as a first input 1614a the current most recent persisted version NBT2 1608 and as a second input 1614b updates as stored in the NBT log 1602b. As an output 1614c at time N+1, the NBT log manager 1604f can generate an updated version of the NBT that is stored at the target location 1606 thereby replacing the current oldest/older persisted 1606 version for time N+1 as stored in NBT1 1606. At time N+1, NBT log 1602b can be flushed or destaged. In at least one embodiment, the NBT log manager 1604f can process NBT updates recorded in 1602b in a sequential consecutive region by region basis as discussed above in connection with time N with respect to the NBT1 1606.

In at least one embodiment, the NBT1 1608 can be partitioned into logically sequentially consecutively stored regions 1-M. Each of the foregoing M regions of 1608 can include a particular sequential consecutively stored portion of mapping entries used for mapping corresponding metadata pages. During flushing or destaging of the NBT log 1602b at time N+1 in at least one embodiment, the NBT log manager 1604f can process updates of the NBT log 1602b related to mapping entries of region 1 by reading the current persistently stored version of region 1 1608a, applying the relevant updates of the NBT log 1602b to mapping entries of region 1 1608a to generate an updated version of region 1, and then outputting or writing the updated version of region 1 to a corresponding target location 1606a. In a similar manner, subsequently sequential regions of 1608 can be processed consecutively in accordance with their logically consecutive ordering within the NBT2 1608. In at least one embodiment, the updated regions 1-M can be written out in sequential consecutive logical order to their respective corresponding target regions 1606a-M.

In at least one embodiment, when an updated version of the NBT replaces the older/oldest persisted version of the NBT in the MD tier, storage currently allocated for the replaced older/oldest persisted version of the NBT can be unmapped and thus deallocated. When storing the updated version of the NBT in at least one embodiment, storage can be allocated and mapped/remapped. In this manner in at least one embodiment, the updated version of the NBT may not overwrite the exact same mapped physical storage of the replaced older/oldest version of the NBT to thereby avoid continuously overwriting the same underlying physical storage.

Thus in at least one embodiment as illustrated in the example 1600, each time the NBT log is flushed or destaged, recorded updates of the NBT log can be applied to the most recent persisted version of the NBT to generate an updated version of the NBT that is then also persistently stored in a sequential manner by storing logical regions consecutively. The updated version of the NBT can replace the older/oldest of the two currently persisted copies of the NBT. In this manner in at least one embodiment, each flush of the NBT log can result in generating and storing a complete updated version of the NBT.

The example 1600 illustrates an embodiment with aggregated management of updates for both the boot tier 1506 and MD PLB descriptor section (MPDS) 1504 of the NBT 1510 including rewriting the entire NBT. Alternatively in at least one embodiment, the processing described in connection with the example 1600 can be used in connection with separately managing updates of the boot tier 1506 and the MD PLB descriptor section 1504.

Figure 18B:
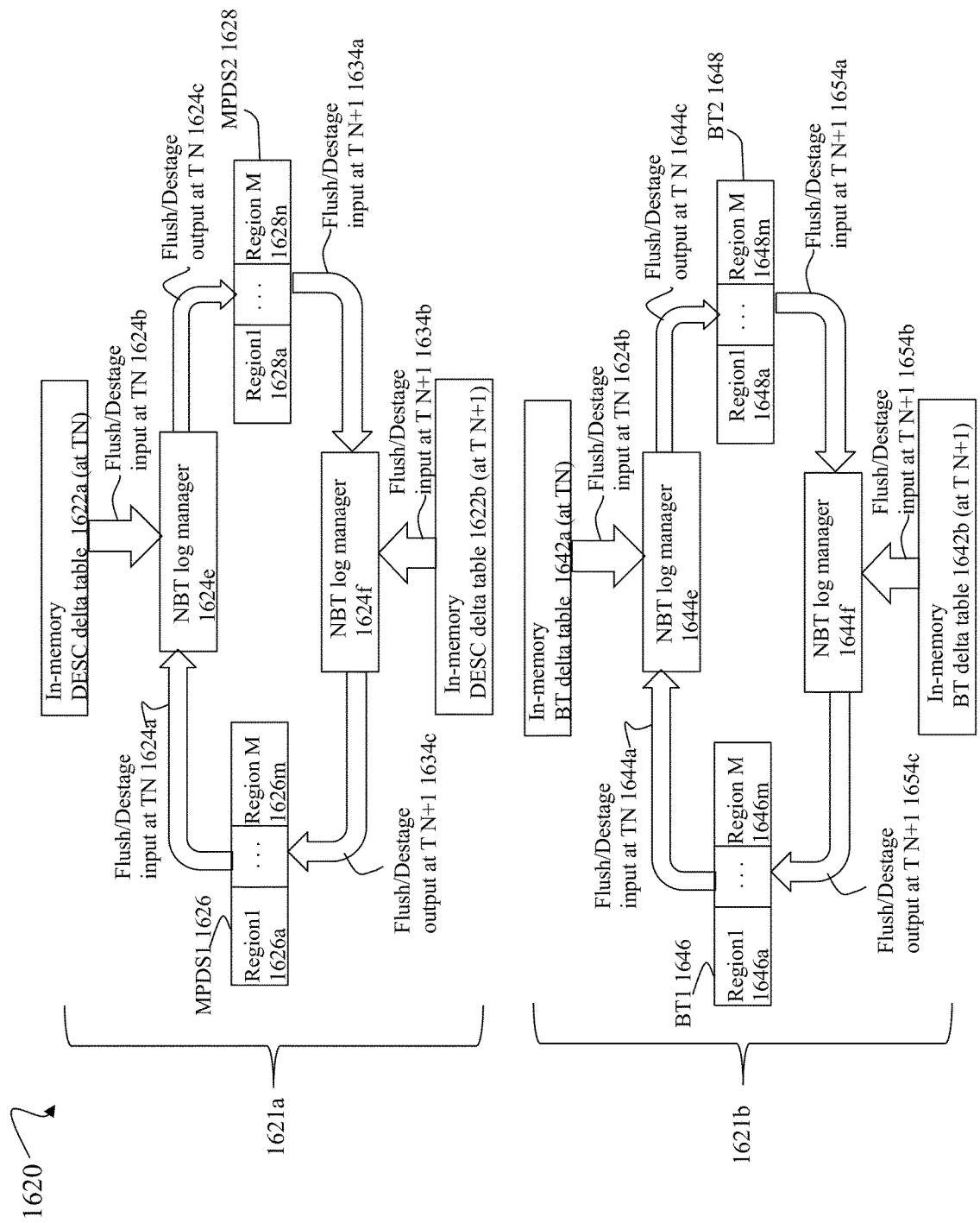

For example, reference is made to the example 1620 of FIG. 18B. The example 1620 includes element 1621a illustrating processing and components that can be used in connection with updates to the MD PLB descriptor section 1504 in at least one embodiment; and element 1621b illustrating processing and components that can be used in connection with updates to the boot tier 1506 in at least one embodiment.

The example 1621a includes elements 1624a-c, 1624e-f, and 1634a-c that are respectively similar to elements 1604a-c, 1604e-f, and 1614a-c of the example 1600 with the difference that the processing in 1621a is performed with respect to the in-memory DESC delta tables 1622a-b and two persisted versions of the MPDS stored in 1626, 1628 rather than, respectively, the in-memory NBT log 1602a-b and persisted NBTs 1606, 1608.

The in-memory DESC delta tables 1622a-b can denote the state of an in-memory DESC delta table, respectively, at times N and N+1 as in the example 1600. In at least one embodiment, changes or updates to the MDPS 1504 can be recorded in the in-memory DESC delta tables 1622a-b flushed, respectively, at times N and N+1 as described in the example 1600. In at least one embodiment, the tables 1622a-b can have a format or layout of entries or rows with an update to the MDPS 1504 recorded in each table entry. In at least one embodiment, a persistently stored RDL as discussed elsewhere herein can be used to also persistently store updates to the MDPS 1504 and can be used, for example, primarily for recovery purposes in at least one embodiment. In at least one embodiment, the tables 1622a-b can have a tabular format or layout that is different, for example, than the HBSB structure as described herein that can be used for the in-memory TT logs and in-memory MD log.

In at least one embodiment, a common RDL can be used to persistently store updates made to both the sections 1504 and 1506 of the NBT 1510. In such an embodiment, the common RDL can be used to recover the contents of the in-memory DESC delta table, for example, in the case of a reboot, failure, or other event in which the system may be rebooted or restarted.

The example 1621b includes elements 1644a-c, 1644e-f, and 1654a-c that are respectively similar to elements 1604a- c, 1604e-f, and 1614a-c of the example 1600 with the difference that the processing in 1621b is performed with respect to the in-memory BT (boot tier) delta tables 1642a-b and two persisted versions of the BT stored in 1646, 1648 rather than, respectively, the in-memory NBT log 1602a-b and persisted NBTs 1606, 1608.

The in-memory BT delta tables 1642a-b can denote the state of an in-memory BT delta table, respectively, at times N and N+1 as in the example 1600. In at least one embodiment, changes or updates to the BT 1506 can be recorded in the in-memory BT delta tables 1642a-b flushed, respectively, at time N and N+1 as described in the example 1600. In at least one embodiment, each of the tables 1642a-b can be implemented using a reserved portion of memory M1 having a size corresponding to the total size of the two persisted BTs 1646, 1648. In at least one embodiment, pages of the reserved portion of memory M1 can correspond to pages of the BT as stored in 1646 and 1648 where BT updates to a particular page of the BT can be recorded in a full page as stored in M1. Thus M1 in at least one embodiment can be a map with an element for each page in 1646 and 1648 where the map can track the most current persisted version of each page in the map. Flushing or destaging the in-memory BT delta table 1642a at time N can including merging content from the most recent persisted version of the BT from 1646 with the updates or changes of the BT delta table 1642a to determine an updated version of the BT, where the updated version of the BT can then be written to the target 1648. Flushing or destaging the in-memory BT delta table 1642b at time N+1 can including merging content from the most recent persisted version of the BT from 1648 with the updates or changes of the BT delta table 1642b to determine an updated version of the BT, where the updated version of the BT can then be written to the target 1646.

In at least one embodiment, changes to BT pages can be stored in the in-memory BT delta table via a bulk operation. With a bulk operation in at least one embodiment, multiple updates to one or more pages of the BT can be committed and stored in the in-memory BT delta table in a single transaction.

In at least one embodiment, the elements 1642a-b can be implemented using a dedicated section of software-defined persisted memory (SDPM) reserved to manage the current state of each page as collectively stored in 1646, 1648. In such an embodiment using SDPM, use of the RDL can be omitted since the SDPM itself is persistent and can be used as needed to restore the in-memory BT delta table.

Figure 19:
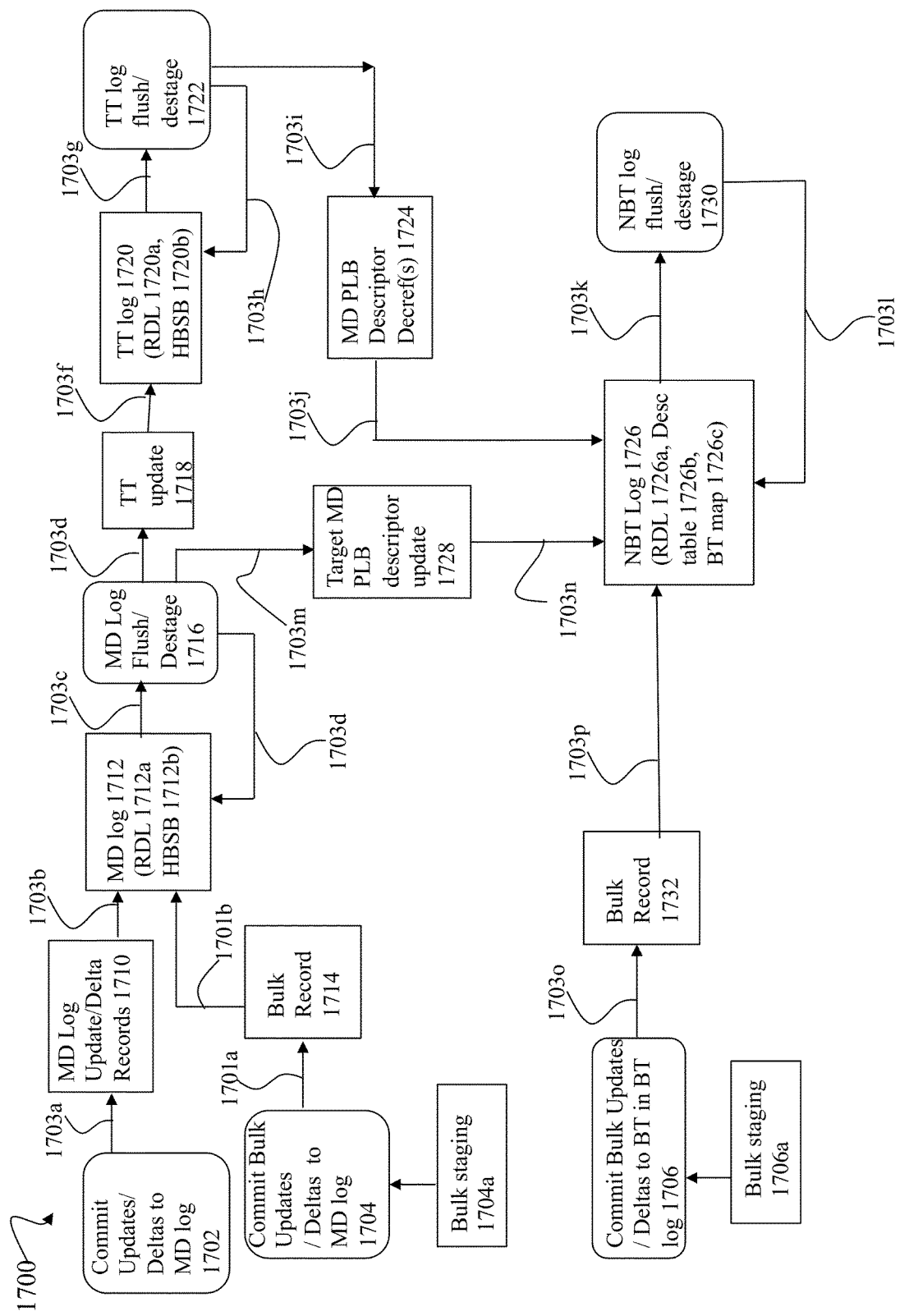

Referring to FIG. 19, shown is an example 1700 illustrating processing flows in at least one embodiment in accordance with the techniques of the present disclosure.

The example 1700 illustrates the cascades of flushing or destaging among the various logs described herein in at least one embodiment in accordance with the techniques of the present disclosure. The example 1700 summarizes processing flows described above in at least one embodiment in accordance with the techniques of the present disclosure.

Processing can be performed to commit updates or deltas to the MD log 1702 of a single transaction to the MD log 1712. As a result, MD log update or delta records 1710 can be generated (1703a) and recorded (1703b) in the MD log 1712. In at least one embodiment, the MD log 1712 can be used for recording updates to top, mid and leaf MD pages and also VLB pages. In at least one embodiment, the MD Log 1712 can include a persisted version RDL 1712a (e.g., stored in non-volatile storage such as NVMRAM) and an in-memory version HBSB 1712b (e.g., storage in volatile memory such as volatile cache memory). Records of updates from the MD log 1712 can be provided as input (1703c) to MD log flush or destage processing 1716. Records of updates flushed or destaged the MD log 1712 can be dropped or removed (1703d) from the MD log 1712.

As a result of flushing or destaging 1716 the MD log, updates can be made to a page P1 where the updated version of page P1 is stored in a new physical address or storage location PA1 of a target MD PLB5 of the MD log structure. The target MD PLB descriptor corresponding to the target MD PLB5 is updated (1728) to reflect the fact that the target MD PLB5 now stores the updated version of page P1, where the target PLB descriptor update 1728 is generated (1703m) as a result of flushing or destaging the MD log 1716. The update 1728 is recorded (1703n) in the NBT log 1726. In at least one embodiment, the NBT log 1726 can include a common RDL 1726a used to persistently store updates to both the BT 1506 and the MPDS 1504. In at least one embodiment, the NBT log 1726 can also store updates to the MPDS 1504 in volatile memory in the Desc (descriptor) table 1726b, and updates to BT 1506 in volatile memory in the BT map 1726c. The BT map 1726c can represent, for example, the in-memory BT delta tables 1642a-b such as described in connection with the example 1621b. The Desc table 1726b can represent, for example, the in-memory DESC delta table 1622a-b such as described in connection with the example 1621b. In at least one embodiment, the target MD PLB descriptor update 1728 can be recorded in the RDL 1726c and the Desc table 1726b.

Also as a result of flushing or destaging 1716 the MD log, a TT update 1718 can be made to a mapping entry E1 of a TT (e.g., the MD TT and/or VLB TT). Consistent with discussion herein, the updated mapping entry E1 can identify the current physical address or storage location PA1 in the target MD PLB storing the updated version of page P1. The TT updated 1718 can be generated (1703d) and recorded (1703f) in the TT log 1720. In at least one embodiment, the TT log 1720 can include a corresponding persisted RDL 1720a (e.g., stored in non-volatile storage such as NVRAM) and an in-memory HBSB 1720b (e.g., stored in volatile memory such as a volatile cache). The TT log 1720 can be flushed or destaged 1722. As records of the TT log 1722 are flushed or destaged, they can be dropped or removed (1703h) from the TT log 1722.

Flushing or destaging the TT log 1722 results in updating the TT and storing the updated version of the TT in a new physical address or storage location PA2 in a MD PLBX. Also as a result of 1722 in at least one embodiment, a MD PLB DESC Y can be updated (1724). The MD PLB DESC Y can correspond to the MD PLB Y that stored the prior version of the page P1 (noted above) prior to updating (e.g., where the mapping entry E1 was updated to indicate that the updated version of P1 is stored at the current physical address or storage location of PA1). In particular, the update 1724 to the MD PLB DESC Y can be a "decref" operation that decrements the reference count of the MD PLB DESC Y to reflect the fact that P1 is no longer stored in the MD PLB Y.

The MD PLB descriptor update 1724 that is a decref can be generated (1703i) as a result of TT log flushing or destaging 1722, where the updated 1724 can be recorded (1703j) in the NBT log 1726.

In at least one embodiment, bulk updates can also be performed in connection with the MD log 1712. Element 1704a denotes the bulk update staging area, for example, where updates to one or more pages of metadata can be collected and then committed in a single transaction 1704.

The committed bulk updates 1704 to the MD log result in generating (1701*a*) the bulk record 1714 that is recorded (1701*b*) in the MD log 1712.

In at least one embodiment, bulk updates can be performed in connection with updates to the BT 1506. Element 1706*a* denotes the bulk staging area, for example, where updates to one or more pages of the BT can be collected and then committed in a single transaction 1706. The committed bulk updates 1706 to the BT result in generating (17030) the bulk record 1732 that is recorded (1703*p*) in the NBT log 1726. In at least one embodiment, the BT updates of 1732 can be recorded in the RDL 1726*b* and the BT map 1726*c*).

The NBT log 1726 can be flushed or destaged 1730 resulting in updates to the BT 1506 and/or MPDS 1504. As updates are flushed or destaged from the NBT log 1726, such updates can be dropped or removed (17031) from the NBT log 1726.

In summary, the example 1700 indicates that flushing or destaging the MD log 1712 can result in updates recorded in the TT log as well as the NBT log. Flushing or destaging the TT log can result in updates recorded in the NBT log. When the NBT log is flushed or destaged, no update or delta records are generated.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
    recording a first metadata (MD) update in a MD log, wherein the first MD update updates a first MD page having a first logical address LA1 in a first address space, wherein a translation table (TT) maps logical addresses of MD pages to corresponding current physical addresses or storage locations on non-volatile storage where current versions of MD pages are stored;
    flushing a first set of one or more MD updates, including the first MD update, from the MD log;
    responsive to said flushing the first set of one or more MD updates from the MD log, performing first processing including:
        applying at least the first MD update to a first version of the first MD page to generate a second version of the first MD page, wherein the first version of the first MD page is stored at a first physical address or storage location PA1 on non-volatile storage;
        storing the second version of the first MD page at a second physical address or storage location PA2 on non-volatile storage, wherein PA1 is different from PA2;
    recording, in a TT log, a first TT update to a first mapping entry E1 of the TT, wherein the first TT update updates E1 of the TT to map a first logical address LA1 of the first MD page to PA2 rather than PA1;
    flushing a second set of one or more TT updates, including the first TT update, from the TT log; and
    responsive to said flushing the second set of one or more TT updates from the TT log, performing second processing including:
        applying at least the first TT update to a first version of the TT to generate a second version of the TT, wherein the first version of the TT is stored at a third physical address or storage location PA3; and
        storing the second version of the TT at a fourth physical address or storage location PA4 that is different from PA3.

2. The computer-implemented method of claim 1, wherein PA1 is included in a first physical large block (PLB) of non-volatile storage and PA2 is included in a second PLB of non-volatile storage, wherein a first PLB descriptor DESC1 describes content stored in the first PLB and a second PLB descriptor DESC2 describes content stored in the second PLB.

3. The computer-implemented method of claim 2, wherein DESC1 and DESC2 are included in a descriptor section of a first storage tier, and wherein the first processing includes:
    recording a first descriptor update in a first log associated with the first tier, wherein the first descriptor update specifies to update DESC2 to indicate that the second version of the first MD page is stored at PA2 of PLB2.

4. The computer-implemented method of claim 3, wherein the first storage tier further includes a boot tier, wherein the boot tier includes information used in connection with booting a system.

5. The computer-implemented method of claim 4, wherein the boot tier includes first information identifying physical storage locations in a MD tier of non-volatile storage where one or more types of metadata are stored.

6. The computer-implemented method of claim 5, further comprising:
    recording a boot tier update in the first log, wherein the boot tier update indicates to update a first item stored in the boot tier;
    flushing a plurality of boot tier updates from the first log and applying the plurality of boot tier updates to a first version of the boot tier to generate a second version of the boot tier; and
    storing the second version of the boot tier at a new physical address or storage location that is different from a corresponding physical address or storage location of the first version of the boot tier.

7. The computer-implemented method of claim 3, further comprising:
    flushing a third set of one or more descriptor updates, including the first descriptor update, from the first log; and
    responsive to said flushing the third set of one or more descriptor updates from the first log, performing third processing including:
        applying the first descriptor update to a first version of DESC2 to generate a second version of DESC2, wherein the first version of DESC2 is stored at a fifth physical address or storage location PA5; and
        storing the second version of DESC2 at a sixth physical address or storage location PA6 that is different from PA5.

8. The computer-implemented method of claim 7, wherein said second processing further includes:
   recording a second descriptor update in the first log associated with the first tier, wherein the second descriptor update specifies to update DESC1 to indicate that the first PLB corresponding to DESC1 no longer stores a current version of the first MD page.

9. The computer-implemented method of claim 8, wherein the second descriptor update of the first log indicates to decrement a reference count of the second descriptor to reflect that the first version of the first MD page as stored in the first PLB is no longer valid content.

10. The computer-implemented method of claim 9, wherein the third set of descriptor updates further includes the second descriptor update, and wherein said third processing performed responsive to said flushing the third set of descriptor updates further includes:
   applying the second descriptor update to a first version of DESC1 to generate a second version of DESC1, wherein the first version of DESC1 is stored at a seventh physical address or storage location PA7; and
   storing the second version of DESC1 at an eighth physical address or storage location PA8 that is different from PA7.

11. The computer-implemented method of claim 1, wherein the first MD page is included in a chain of MD pages of mapping information used to map a first user logical address to a corresponding storage location where current content C1 of the first user logical address is stored on non-volatile storage, wherein the first user logical address denotes a target logical address identifying a storage object and an offset in the storage object.

12. The computer-implemented method of claim 11, wherein the chain of MD pages includes a top MD page, a mid MD page, a leaf MD page, and a VLB (virtual layer block) page.

13. The computer-implemented method of claim 12, wherein the first MD page is any of a top MD page, a mid MD page, and a leaf MD page, and wherein the TT is a MD TT used for mapping logical addresses of top, mid and leaf MD pages to corresponding physical addresses or storage locations on non-volatile storage where current versions of top, mid and leaf MD pages are stored.

14. The computer-implemented method of claim 12, wherein the first MD page is a VLB page, and wherein the TT is a VLB TT used for mapping logical addresses of VLB pages to corresponding current physical addresses or storage locations on non-volatile storage where current versions of VLB pages are stored.

15. The computer-implemented method of claim 11, further comprising:
   receiving a write operation that writes the current content C1 to the first user logical address; and
   determining, in accordance with the write operation, one or more MD updates to one or more MD pages included in the chain of MD pages, wherein the one or more MD updates determined in accordance with the write operation includes the first MD update to the first MD page.

16. The computer-implemented method of claim 1, wherein said flushing the first set of one or more MD updates from the MD log is performed in response to an occurrence of a first trigger condition, wherein the first trigger condition is any one of a defined set of trigger conditions, wherein the defined set of trigger conditions includes one or more of: a time-based trigger condition that indicates to flush the MD log responsive to a specified amount of time elapsing since a most recent prior time that the MD log was flushed, and a trigger condition that indicates flush the MD log responsive to the MD log having at least a threshold number of recorded updates.

17. The computer-implemented method of claim 1, wherein said flushing the second set of one or more TT updates from the TT log is performed in response to an occurrence of a first trigger condition, wherein the first trigger condition is any one of a defined set of trigger conditions, wherein the defined set of trigger conditions includes one or more of: a time-based trigger condition that indicates to flush the TT log responsive to a specified amount of time elapsing since a most recent prior time that the TT log was flushed, and a trigger condition that indicates flush the TT log responsive to the TT log having at least a threshold number of recorded updates.

18. A system comprising:
   one or more processors; and
   a memory comprising code stored thereon that, when executed, performs a method comprising:
      recording a first metadata (MD) update in a MD log, wherein the first MD update updates a first MD page having a first logical address LA1 in a first address space, wherein a translation table (TT) maps logical addresses of MD pages to corresponding current physical addresses or storage locations on non-volatile storage where current versions of MD pages are stored;
      flushing a first set of one or more MD updates, including the first MD update, from the MD log;
      responsive to said flushing the first set of one or more MD updates from the MD log, performing first processing including:
         applying at least the first MD update to a first version of the first MD page to generate a second version of the first MD page, wherein the first version of the first MD page is stored at a first physical address or storage location PA1 on non-volatile storage;
         storing the second version of the first MD page at a second physical address or storage location PA2 on non-volatile storage, wherein PA1 is different from PA2;
         recording, in a TT log, a first TT update to a first mapping entry E1 of the TT, wherein the first TT update updates E1 of the TT to map a first logical address LA1 of the first MD page to PA2 rather than PA1;
      flushing a second set of one or more TT updates, including the first TT update, from the TT log; and
      responsive to said flushing the second set of one or more TT updates from the TT log, performing second processing including:
         applying at least the first TT update to a first version of the TT to generate a second version of the TT, wherein the first version of the TT is stored at a third physical address or storage location PA3; and
         storing the second version of the TT at a fourth physical address or storage location PA4 that is different from PA3.

19. A non-transitory computer readable medium comprising code stored thereon that, when executed, performs a method comprising:
   recording a first metadata (MD) update in a MD log, wherein the first MD update updates a first MD page having a first logical address LA1 in a first address space, wherein a translation table (TT) maps logical addresses of MD pages to corresponding current physical addresses or storage locations on non-volatile storage where current versions of MD pages are stored;

flushing a first set of one or more MD updates, including the first MD update, from the MD log;

responsive to said flushing the first set of one or more MD updates from the MD log, performing first processing including:

applying at least the first MD update to a first version of the first MD page to generate a second version of the first MD page, wherein the first version of the first MD page is stored at a first physical address or storage location PA1 on non-volatile storage;

storing the second version of the first MD page at a second physical address or storage location PA2 on non-volatile storage, wherein PA1 is different from PA2;

recording, in a TT log, a first TT update to a first mapping entry E1 of the TT, wherein the first TT update updates E1 of the TT to map a first logical address LA1 of the first MD page to PA2 rather than PA1;

flushing a second set of one or more TT updates, including the first TT update, from the TT log; and responsive to said flushing the second set of one or more TT updates from the TT log, performing second processing including:

applying at least the first TT update to a first version of the TT to generate a second version of the TT, wherein the first version of the TT is stored at a third physical address or storage location PA3; and storing the second version of the TT at a fourth physical address or storage location PA4 that is different from PA3.

* * * * *